United States Patent
Schindler et al.

(10) Patent No.: US 8,631,588 B2
(45) Date of Patent: *Jan. 21, 2014

(54) FOOTWEAR WITH A SOLE STRUCTURE INCORPORATING A LOBED FLUID-FILLED CHAMBER

(75) Inventors: Eric S. Schindler, Portland, OR (US); Sebastien Mermet, Creteil (FR); Troy C. Lindner, Portland, OR (US); Andrew Caine, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/723,937

(22) Filed: Mar. 15, 2010

(65) Prior Publication Data
US 2010/0170108 A1 Jul. 8, 2010

Related U.S. Application Data

(63) Continuation of application No. 11/618,035, filed on Dec. 29, 2006, now Pat. No. 7,707,745, which is a continuation-in-part of application No. 11/508,113, filed on Aug. 22, 2006, now Pat. No. 7,707,744, which is a continuation-in-part of application No. 10/620,843, filed on Jul. 16, 2003, now Pat. No. 7,128,796.

(51) Int. Cl.
  *A43B 13/20* (2006.01)
  *A43B 21/28* (2006.01)

(52) U.S. Cl.
  USPC ............................................. 36/29; 36/35 B

(58) Field of Classification Search
  USPC ............ 36/28, 29, 35 B, 35 R; 428/178, 137, 428/187, 212, 155, 192, 72, 76; 5/644, 654, 5/655.3, 706, 655.5
  See application file for complete search history.

(56) References Cited

U.S. PATENT DOCUMENTS

| | | |
|---|---|---|
| 2,677,906 A | 5/1954 | Reed |
| 2,703,770 A | 3/1955 | Melzer |
| 3,030,640 A | 4/1962 | Gosman |
| 3,608,215 A | 9/1971 | Fukuoka |
| 3,685,176 A | 8/1972 | Rudy |

(Continued)

FOREIGN PATENT DOCUMENTS

FR  1011213  6/1952

OTHER PUBLICATIONS

Office Action mailed Nov. 9, 2009 for U.S. Appl. No. 11/618,035.

(Continued)

*Primary Examiner* — Jila M Mohandesi
(74) *Attorney, Agent, or Firm* — Plumsea Law Group, LLC

(57) ABSTRACT

A fluid-filled chamber for an article of footwear and a method for manufacturing the chamber are disclosed. The chamber may be incorporated into a sole structure of the footwear and includes a central area and a plurality of lobes extending outward from the central area. The lobes are in fluid communication with the central area and are formed from a first surface, a second surface, and a sidewall. The sidewall joins with the first surface with the second surface to seal the fluid within the chamber, but no internal connections are generally utilized to join interior portions of the first surface with interior portions of the second surface. The fluid within the chamber may be air at a pressure that is approximately equal to an ambient pressure.

18 Claims, 50 Drawing Sheets

(56) References Cited

U.S. PATENT DOCUMENTS

| | | |
|---|---|---|
| 3,758,964 A | 9/1973 | Nishimura |
| 4,187,620 A | 2/1980 | Selner |
| 4,217,705 A | 8/1980 | Donzis |
| 4,358,902 A | 11/1982 | Cole et al. |
| 4,506,460 A | 3/1985 | Rudy |
| 4,547,919 A | 10/1985 | Wang |
| 4,698,864 A | 10/1987 | Graebe |
| 4,722,131 A | 2/1988 | Huang |
| 4,779,359 A | 10/1988 | Famolare, Jr. |
| 4,782,602 A | 11/1988 | Lakic |
| 4,803,029 A | 2/1989 | Iversen et al. |
| 4,817,304 A | 4/1989 | Parker et al. |
| 4,823,482 A | 4/1989 | Lakic |
| 4,845,861 A | 7/1989 | Moumdjian |
| 4,874,640 A | 10/1989 | Donzis |
| 4,891,855 A | 1/1990 | Cheng-Chung |
| 4,906,502 A | 3/1990 | Rudy |
| 4,912,861 A | 4/1990 | Huang |
| 4,991,317 A | 2/1991 | Lakic |
| 4,999,931 A | 3/1991 | Vermeulen |
| 5,022,109 A | 6/1991 | Pekar |
| 5,025,575 A | 6/1991 | Lakic |
| 5,042,176 A | 8/1991 | Rudy |
| 5,044,030 A | 9/1991 | Balaton |
| 5,131,174 A * | 7/1992 | Drew et al. ............... 36/35 B |
| 5,158,767 A | 10/1992 | Cohen et al. |
| 5,179,792 A | 1/1993 | Brantingham |
| 5,193,246 A | 3/1993 | Huang |
| 5,199,191 A | 4/1993 | Moumdjian |
| 5,224,277 A | 7/1993 | Sang Do |
| 5,224,278 A | 7/1993 | Jeon |
| 5,228,156 A | 7/1993 | Wang |
| 5,235,715 A | 8/1993 | Donzis |
| 5,245,766 A | 9/1993 | Warren |
| 5,253,435 A | 10/1993 | Auger et al. |
| 5,257,470 A | 11/1993 | Auger et al. |
| 5,335,382 A | 8/1994 | Huang |
| 5,337,492 A | 8/1994 | Anderie et al. |
| 5,353,459 A | 10/1994 | Potter et al. |
| 5,367,791 A | 11/1994 | Gross et al. |
| 5,406,719 A | 4/1995 | Potter |
| 5,493,792 A | 2/1996 | Bates et al. |
| 5,545,463 A | 8/1996 | Schmidt et al. |
| 5,572,804 A | 11/1996 | Skaja et al. |
| 5,592,706 A | 1/1997 | Pearce |
| 5,595,004 A | 1/1997 | Lyden et al. |
| 5,669,161 A | 9/1997 | Huang |
| 5,686,167 A | 11/1997 | Rudy |
| 5,704,137 A | 1/1998 | Dean et al. |
| 5,741,568 A | 4/1998 | Rudy |
| 5,771,606 A | 6/1998 | Litchfield et al. |
| 5,832,630 A | 11/1998 | Potter |
| 5,846,063 A | 12/1998 | Lakic |
| 5,894,683 A | 4/1999 | Lin |
| 5,907,911 A | 6/1999 | Huang |
| 5,916,664 A | 6/1999 | Rudy |
| 5,925,306 A | 7/1999 | Huang |
| 5,933,983 A | 8/1999 | Jeon |
| 5,952,065 A | 9/1999 | Mitchell et al. |
| 5,976,451 A | 11/1999 | Skaja et al. |
| 5,979,078 A | 11/1999 | McLaughlin |
| 5,993,585 A | 11/1999 | Goodwin et al. |
| 6,009,637 A | 1/2000 | Pavone |
| 6,013,340 A | 1/2000 | Bonk et al. |
| 6,027,683 A | 2/2000 | Huang |
| 6,029,962 A | 2/2000 | Shorten et al. |
| 6,065,150 A | 5/2000 | Huang |
| 6,098,313 A | 8/2000 | Skaja |
| 6,127,010 A | 10/2000 | Rudy |
| 6,128,837 A | 10/2000 | Huang |
| 6,192,606 B1 | 2/2001 | Pavone |
| 6,253,466 B1 | 7/2001 | Harmon-Weiss et al. |
| 6,258,421 B1 | 7/2001 | Potter |
| 6,266,897 B1 * | 7/2001 | Seydel et al. ............... 36/29 |
| 6,374,514 B1 | 4/2002 | Swigart |
| 6,385,864 B1 | 5/2002 | Sell, Jr. et al. |
| 6,402,879 B1 | 6/2002 | Tawney et al. |
| 6,430,843 B1 | 8/2002 | Potter et al. |
| 6,457,262 B1 | 10/2002 | Swigart |
| 6,463,612 B1 | 10/2002 | Potter |
| 6,550,085 B2 | 4/2003 | Roux |
| 6,571,490 B2 | 6/2003 | Tawney et al. |
| 6,665,958 B2 | 12/2003 | Goodwin |
| 6,783,184 B2 | 8/2004 | DiBattista et al. |
| 6,796,056 B2 | 9/2004 | Swigart |
| 6,837,951 B2 | 1/2005 | Rapaport |
| 6,871,421 B2 | 3/2005 | Potter et al. |
| 6,892,477 B2 | 5/2005 | Potter et al. |
| 6,918,198 B2 | 7/2005 | Chi |
| 6,931,764 B2 | 8/2005 | Swigart et al. |
| 6,971,193 B1 | 12/2005 | Potter et al. |
| 7,000,335 B2 | 2/2006 | Swigart et al. |
| 7,051,456 B2 | 5/2006 | Swigart et al. |
| 7,070,845 B2 | 7/2006 | Thomas et al. |
| 7,076,891 B2 | 7/2006 | Goodwin |
| 7,086,179 B2 | 8/2006 | Dojan et al. |
| 7,128,796 B2 | 10/2006 | Hensley et al. |
| 7,131,218 B2 | 11/2006 | Schindler |
| 7,141,131 B2 | 11/2006 | Foxen et al. |
| 7,200,957 B2 | 4/2007 | Hubbard et al. |
| 7,244,483 B2 | 7/2007 | Tawney et al. |
| 7,434,339 B2 | 10/2008 | Swigart et al. |
| 7,451,554 B2 | 11/2008 | Hazenberg et al. |
| 7,555,848 B2 | 7/2009 | Aveni et al. |
| 7,555,851 B2 | 7/2009 | Hazenberg et al. |
| 7,707,744 B2 | 5/2010 | Schindler et al. |
| 2003/0150132 A1 | 8/2003 | Lin |

OTHER PUBLICATIONS

Notice of Allowance mailed Dec. 17, 2009 for U.S. Appl. No. 11/618,035.

International Preliminary Report on Patentability and Written Opinion of the International Searching Authority in PCT Application No. PCT/US2007/088554, mailed Jul. 9, 2009.

Office Action mailed Dec. 1, 2010 for Chinese Patent Application No. 200780044587.4.

Notice of Allowance mailed Apr. 25, 2011 for U.S. Appl. No. 12/724,248.

* cited by examiner

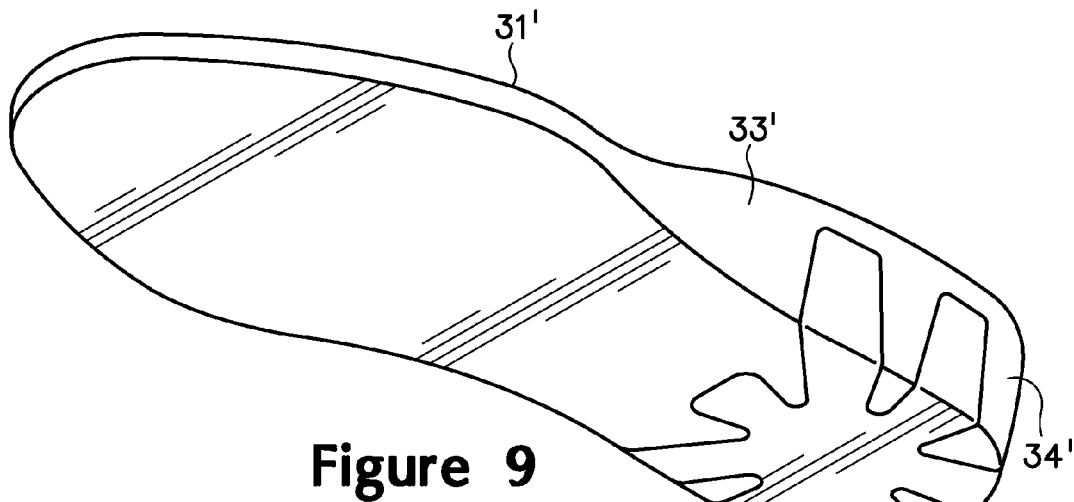
Figure 9
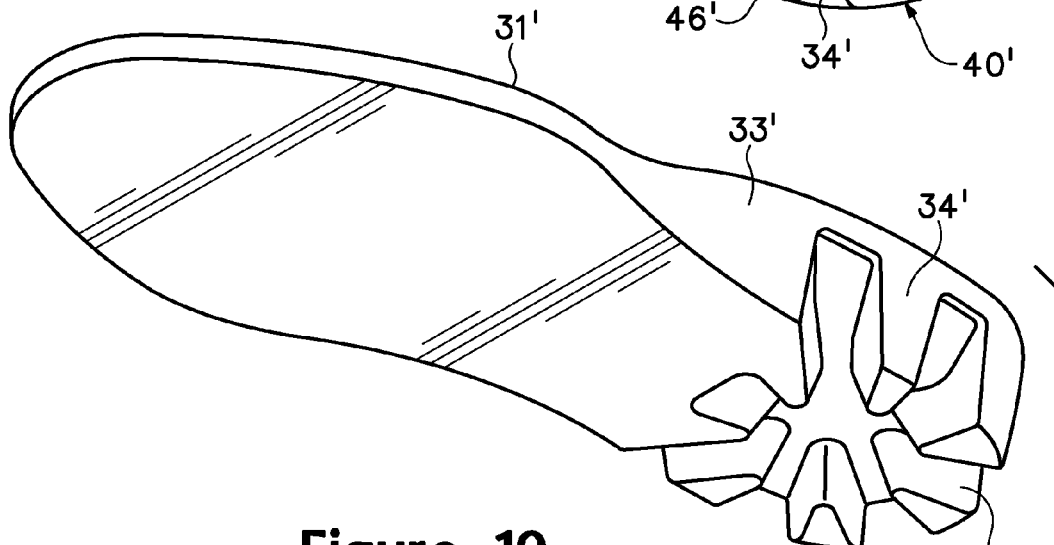
Figure 10
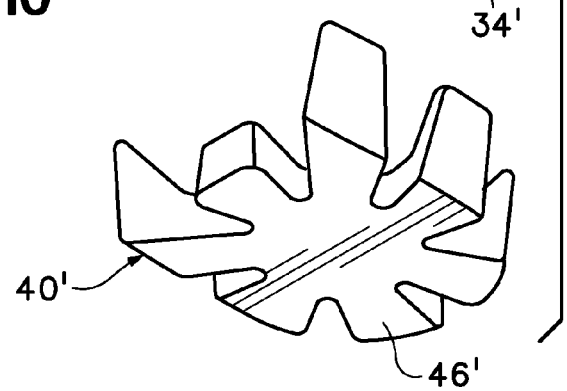

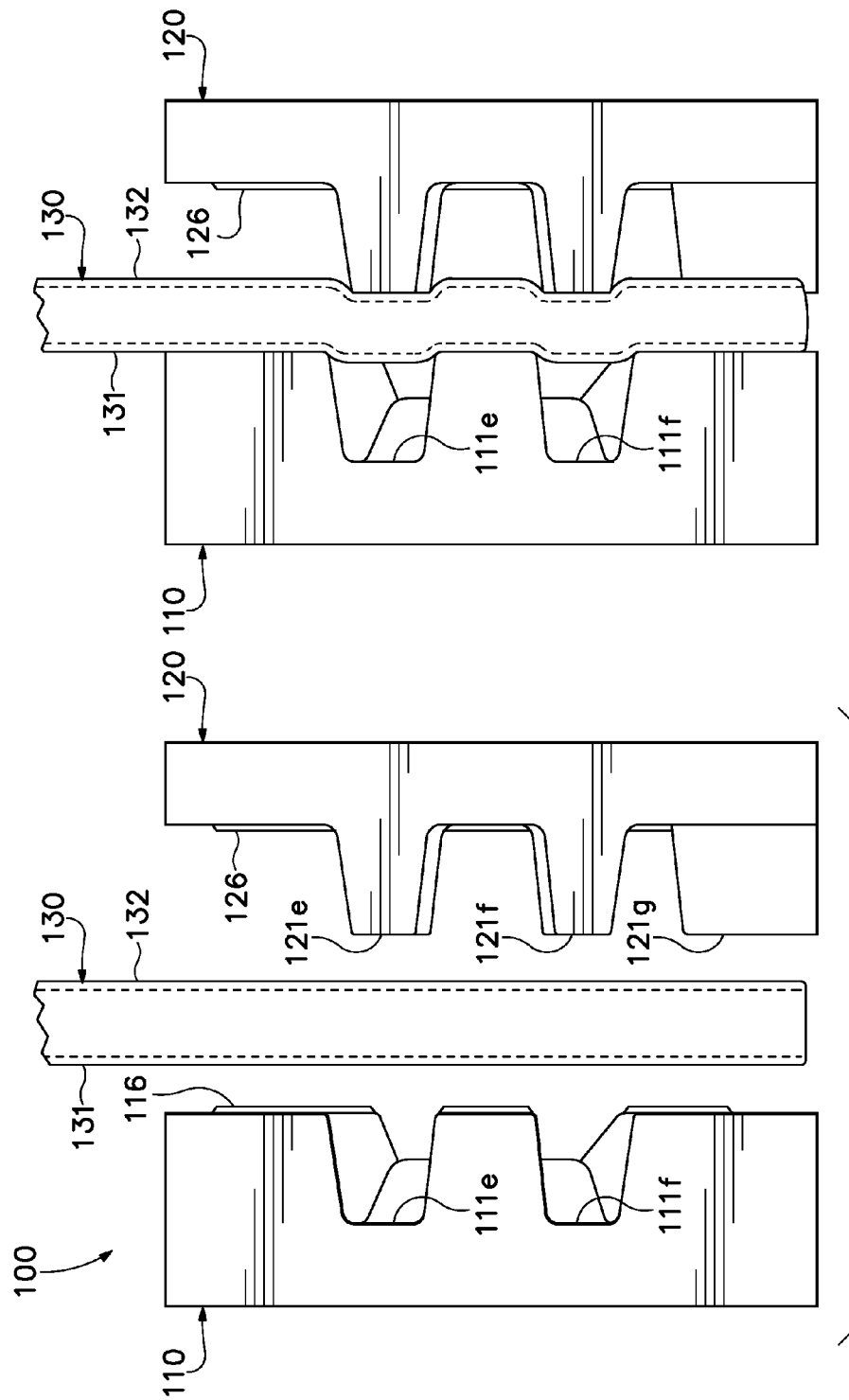

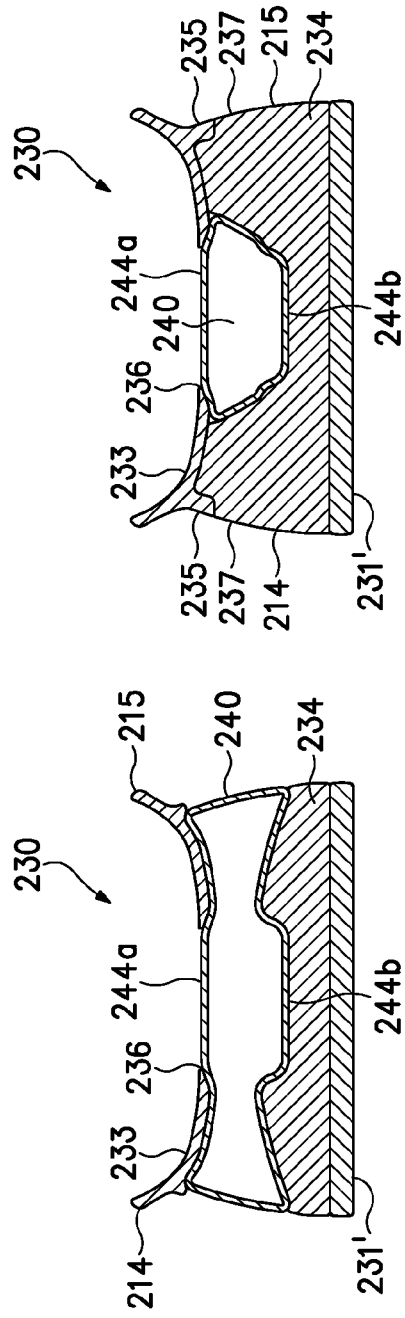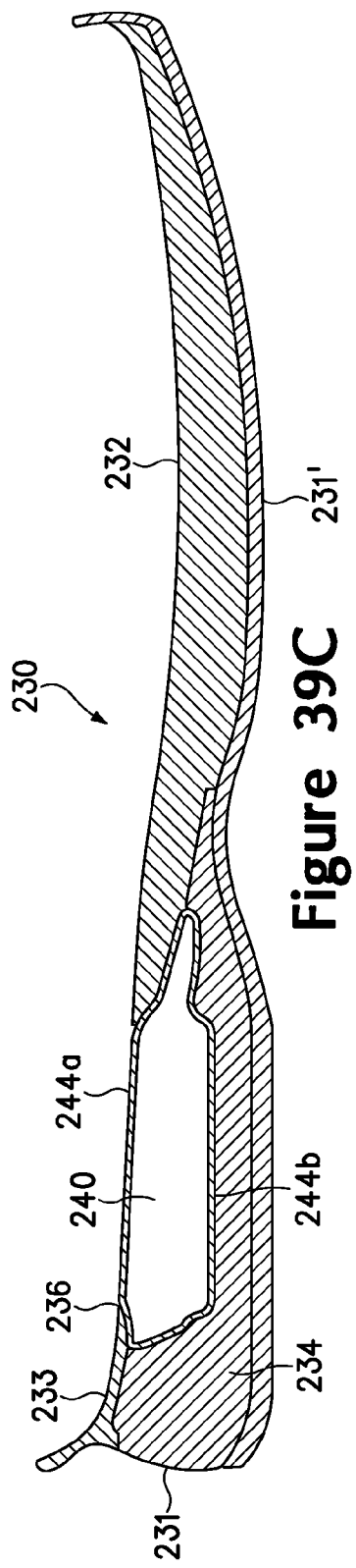

FOOTWEAR WITH A SOLE STRUCTURE INCORPORATING A LOBED FLUID-FILLED CHAMBER

CROSS-REFERENCE TO RELATED APPLICATIONS

This U.S. patent application is a continuation of and claims priority to U.S. patent application Ser. No. 11/618,035, which was filed in the U.S. Patent and Trademark Office on 29 Dec. 2006 and entitled Footwear With A Sole Structure Incorporating A Lobed Fluid-Filled Chamber, such prior U.S. patent application being entirely incorporated herein by reference. U.S. patent application Ser. No. 11/618,035 is, in turn, a continuation-in-part application of and claims priority to U.S. patent application Ser. No. 11/508,113, which was filed in the U.S. Patent and Trademark Office on Aug. 22, 2006 and entitled Footwear With A Sole Structure Incorporating A Lobed Fluid-Filled Chamber, such prior U.S. patent application being entirely incorporated herein by reference. U.S. patent application Ser. No. 11/508,113 is, in turn, a continuation-in-part application of and claims priority to U.S. Pat. No. 7,128,796 issued Oct. 31, 2006, which was filed in the U.S. Patent and Trademark Office as U.S. patent application Ser. No. 10/620,843 on Jul. 16, 2003 and entitled Footwear With A Sole Structure Incorporating A Lobed Fluid-Filled Chamber, such prior U.S. patent application being entirely incorporated herein by reference.

BACKGROUND

A conventional article of footwear includes two primary elements, an upper and a sole structure. With respect to athletic footwear, for example, the upper generally includes multiple material layers, such as textiles, foam, and leather, that are stitched or adhesively bonded together to form a void on the interior of the footwear for securely and comfortably receiving a foot. The sole structure has a layered configuration that includes an insole, a midsole, and an outsole. The insole is a thin cushioning member positioned within the void and adjacent the foot to enhance footwear comfort. The midsole forms a middle layer of the sole structure and is often formed of a foam material, such as polyurethane or ethylvinylacetate. The outsole is secured to a lower surface of the midsole and provides a durable, wear-resistant surface for engaging the ground.

Midsoles formed of conventional foam materials compress resiliently under an applied load, thereby attenuating forces and absorbing energy associated with walking or running, for example. The resilient compression of the foam materials is due, in part, to the inclusion of cells within the foam structure that define an inner volume substantially displaced by gas. That is, the foam materials include a plurality of pockets that enclose air. After repeated compressions, however, the cell structures may begin to permanently collapse, which results in decreased compressibility of the foam. Accordingly, the overall ability of the midsole to attenuate forces and absorb energy deteriorates over the life of the midsole.

One manner of minimizing the effects of the cell structure collapse in conventional foam materials involves the use of a structure having the configuration of a fluid-filled chamber, as disclosed in U.S. Pat. No. 4,183,156 to Rudy, hereby incorporated by reference. The fluid-filled chamber has the structure of a bladder that includes an outer enclosing member formed of an elastomeric material that defines a plurality of tubular members extending longitudinally throughout the length of an article of footwear. The tubular members are in fluid communication with each other and jointly extend across the width of the footwear. U.S. Pat. No. 4,219,945 to Rudy, also incorporated by reference, discloses a similar fluid-filled chamber encapsulated in a foam material, wherein the combination of the fluid-filled chamber and the encapsulating foam material functions as a midsole.

U.S. Pat. No. 4,817,304 to Parker, et al., hereby incorporated by reference, discloses a foam-encapsulated, fluid-filled chamber in which apertures are formed in the foam and along side portions of the chamber. When the midsole is compressed, the chamber expands into the apertures. Accordingly, the apertures provide decreased stiffness during compression of the midsole, while reducing the overall weight of the footwear. Further, by appropriately locating the apertures in the foam material, the overall impact response characteristics may be adjusted in specific areas of the footwear.

The fluid-filled chambers described above may be manufactured by a two-film technique, wherein two separate layers of elastomeric film are formed to have the overall shape of the chamber. The layers are then welded together along their respective peripheries to form an upper surface, a lower surface, and sidewalls of the chamber, and the layers are welded together at predetermined interior locations to impart a desired configuration to the chamber. That is, interior portions of the layers are connected to form chambers of a predetermined shape and size at desired locations. The chambers are subsequently pressurized above ambient pressure by inserting a nozzle or needle, which is connected to a fluid pressure source, into a fill inlet formed in the chamber. After the chambers are pressurized, the nozzle is removed and the fill inlet is sealed, by welding for example.

Another manufacturing technique for manufacturing fluid-filled chambers of the type described above is through a blow molding process, wherein a liquefied elastomeric material is placed in a mold having the desired overall shape and configuration of the chamber. The mold has an opening at one location through which pressurized air is provided. The pressurized air forces the liquefied elastomeric material against the inner surfaces of the mold and causes the material to harden in the mold, thereby forming the chamber to have the desired configuration.

Another type of chamber utilized in footwear midsoles is disclosed in U.S. Pat. Nos. 4,906,502 and 5,083,361, both to Rudy, and both hereby incorporated by reference. The chambers comprise a hermetically sealed outer barrier layer that is securely bonded over a double-walled fabric core. The double-walled fabric core has upper and lower outer fabric layers normally spaced apart from each another at a predetermined distance, and may be manufactured through a double needle bar Raschel knitting process. Connecting yarns, potentially in the form of multi-filament yarns with many individual fibers, extend internally between the facing surfaces of the fabric layers and are anchored to the fabric layers. The individual filaments of the connecting yarns form tensile restraining members that limit outward movement of the barrier layers to a desired distance.

U.S. Pat. Nos. 5,993,585 and 6,119,371, both issued to Goodwin et al., and both hereby incorporated by reference, also disclose chambers incorporating a double-walled fabric core, but without a peripheral seam located midway between the upper and lower surfaces of the chamber. Instead, the seam is located adjacent to the upper surface of the chamber. Advantages in this design include removal of the seam from the area of maximum sidewall flexing and increased visibility of the interior of the chamber, including the connecting yarns. The process used to manufacture a chamber of this type, involves the formation of a shell, which includes a lower surface and a sidewall, with a mold. The double-walled fabric core is placed on top of a covering layer, and the shell is placed over the covering layer and core. The assembled shell, covering layer, and core are then moved to a lamination station where radio frequency energy bonds opposite sides of the core to the shell and covering layer, and bonds a periphery of the shell to the covering layer. The chamber is then pressurized by inserting a fluid so as to place the connecting yarns in tension.

A process for thermoforming a chamber is disclosed in U.S. Pat. No. 5,976,451 to Skaja et al., hereby incorporated by reference, wherein a pair of flexible thermoplastic resin layers are heated and placed against a pair of molds, with a vacuum drawing the layers into the mold. The layers are then pressed together to form the chamber.

The material forming outer layers of the chambers discussed above may be formed of a polymer material, such as a thermoplastic elastomer, that is substantially impermeable to the fluid within the chamber. More specifically, one suitable material is a film formed of alternating layers of thermoplastic polyurethane and ethylene-vinyl alcohol copolymer, as disclosed in U.S. Pat. Nos. 5,713,141 and 5,952,065 to Mitchell et al, hereby incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized. Another suitable material is a flexible microlayer membrane that includes alternating layers of a gas barrier material and an elastomeric material, as disclosed in U.S. Pat. Nos. 6,082,025 and 6,127,026 to Bonk et al., both hereby incorporated by reference. Other suitable thermoplastic elastomer materials or films include polyurethane, polyester, polyester polyurethane, polyether polyurethane, such as cast or extruded ester-based polyurethane film. Additional suitable materials are disclosed in the '156 and '945 patents to Rudy, which were discussed above. In addition, numerous thermoplastic urethanes may be utilized, such as PELLETHANE, a product of the Dow Chemical Company; ELASTOLLAN, a product of the BASF Corporation; and ESTANE, a product of the B.F. Goodrich Company, all of which are either ester or ether based. Still other thermoplastic urethanes based on polyesters, polyethers, polycaprolactone, and polycarbonate macrogels may be employed, and various nitrogen blocking materials may also be utilized. Further suitable materials include thermoplastic films containing a crystalline material, as disclosed in U.S. Pat. Nos. 4,936,029 and 5,042,176 to Rudy, hereby incorporated by reference, and polyurethane including a polyester polyol, as disclosed in U.S. Pat. Nos. 6,013,340; 6,203,868; and 6,321,465 to Bonk et al., also hereby incorporated by reference.

The fluid contained within the chamber may include any of the gasses disclosed in U.S. Pat. No. 4,340,626 to Rudy, such as hexafluoroethane and sulfur hexafluoride, for example. In addition, some chambers enclose pressurized nitrogen gas or air.

SUMMARY

A chamber for an article of footwear may include a first surface, an opposite second surface, and a sidewall extending between edges of the first surface and the second surface. The sidewall is joined with the first surface and the second surface such that no internal connections secure interior portions of the first surface to interior portions of the second surface. A fluid is sealed within the chamber at a pressure between an ambient pressure and five pounds per square inch of the ambient pressure. Furthermore, a plurality of lobes extend outward from a central area of the chamber. The lobes are defined by the first surface, second surface, and sidewall, and the lobes are in fluid communication with the central area.

The first surface and the second surface may have a planar configuration. Alternately, one of the surfaces may be curved. In addition, portions of the sidewall positioned between the lobes may have a sloped configuration, and the portions of the sidewall adjacent distal ends of the lobes may have a substantially vertical slope.

The lobes may be configured to extend radially outward from the central area. Accordingly, the lobes may extend outward in different directions from the periphery of the central area. The number of lobes may vary significantly within the scope of the invention. The lobes define spaces located between adjacent lobes. When incorporated into an article of footwear, the chamber will be at least partially encapsulated within a polymer foam material. Accordingly, the polymer foam will extend between the lobes to form columns. In general, the surface of the columns will contact the sidewall and have the shape of the spaces between the adjacent lobes. Accordingly, the columns will have a sloped configuration that corresponds with the sidewall slope.

The material that forms the chamber will generally be a polymer, such as a thermoplastic elastomer, thereby providing the structure of a bladder. Alternately, the chamber may be formed as a void within a midsole of the footwear. Although a plurality of fluids may be utilized within the chamber, air generally provides properties that are suitable for the invention.

Another aspect relates to a method of manufacturing a fluid-filled chamber for an article of footwear. The method involves positioning a parison between a first portion and a corresponding second portion of a mold. The parison is then bent with contours of the mold as the first portion and the second portion translate toward each other, the contours of the mold being positioned separate from a cavity within the mold, the cavity having a shape of the chamber. Opposite sides of the parison are then shaped to form the chamber within the cavity, and the opposite sides of the parison are bonded together.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary, as well as the following Detailed Description, will be better understood when read in conjunction with the accompanying drawings.

FIG. 9 is a perspective view of the midsole depicted in FIG. 8.

FIG. 10 is an exploded perspective view of the midsole depicted in FIG. 8.

FIG. 19 is a side elevational view of a parison positioned between the first and second portions of the mold prior to molding.

FIG. 20 is a side elevational view of the parison positioned between the first and second portions of the mold during an intermediate portion of molding.

FIGS. 39A-39C are cross-sectional views of the sole structure, as defined by section lines 39A-39C in FIG. 38.

DETAILED DESCRIPTION

The following discussion and accompanying figures disclose articles of athletic footwear incorporating fluid-filled chambers in accordance with the present invention. Concepts related to the footwear, and more particularly the fluid-filled chambers, are disclosed with reference to footwear having a configuration that is suitable for running. The invention is not solely limited to footwear designed for running, however, and may be applied to a wide range of athletic footwear styles, including basketball shoes, cross-training shoes, walking shoes, tennis shoes, soccer shoes, and hiking boots, for example. In addition, the invention may also be applied to non-athletic footwear styles, including dress shoes, loafers, sandals, and work boots. Accordingly, one skilled in the relevant art will appreciate that the concepts disclosed herein apply to a wide variety of footwear styles, in addition to the specific style discussed in the following material and depicted in the accompanying figures.

First Chamber

Figure 1:
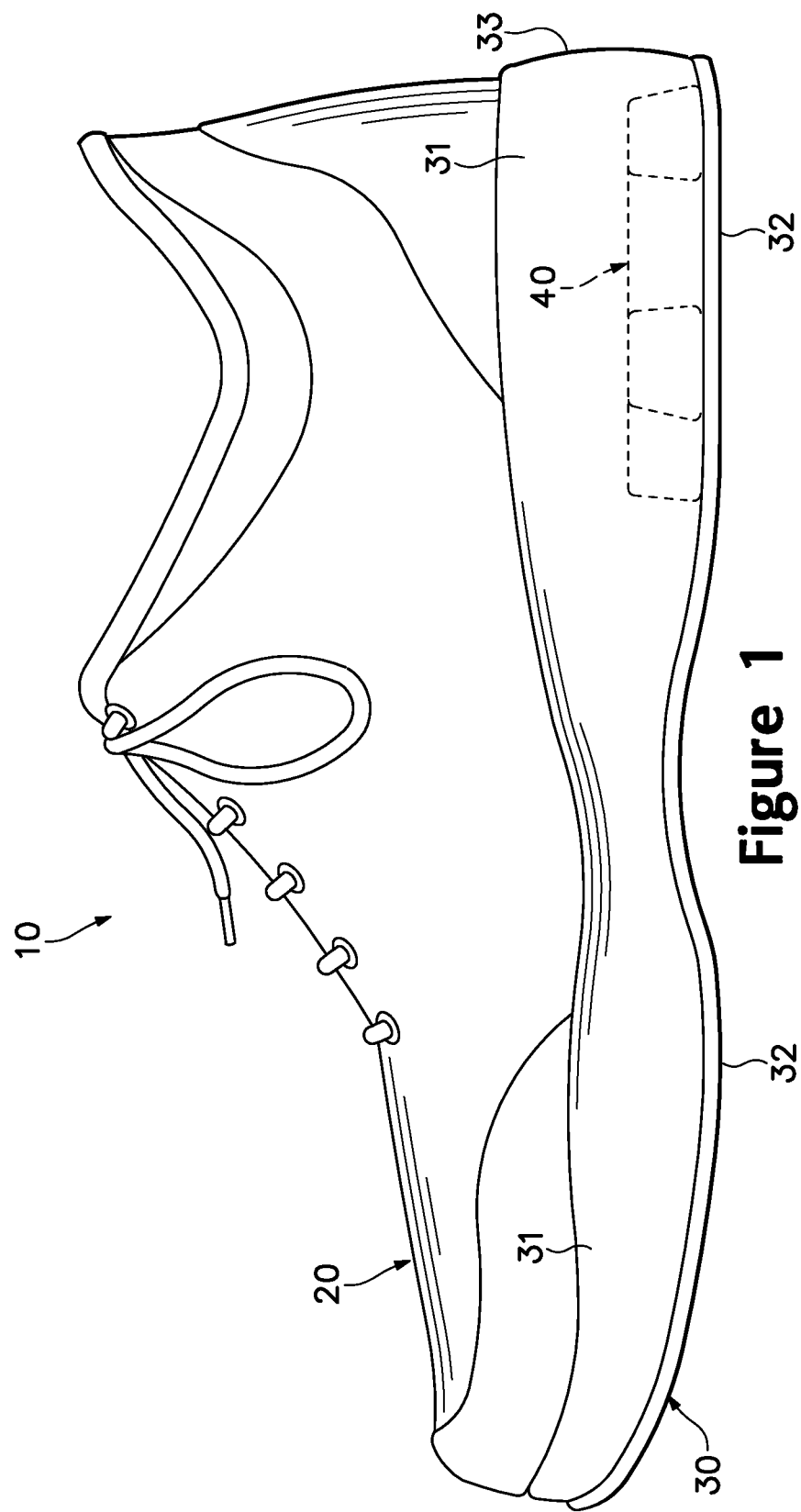
FIG. 1 is a side elevational view of an article of footwear having a midsole that incorporates a first chamber in accordance with the present invention.

An article of footwear 10 is depicted in FIG. 1 and includes an upper 20 and a sole structure 30. Upper 20 has a substantially conventional configuration and includes a plurality elements, such as textiles, foam, and leather materials, that are stitched or adhesively bonded together to form an interior void for securely and comfortably receiving the foot. Sole structure 30 is positioned below upper 20 and includes two primary elements, a midsole 31 and an outsole 32. Midsole 31 is secured to a lower surface of upper 20, through stitching or adhesive bonding for example, and operates to attenuate forces and absorb energy as sole structure 30 contacts the ground. That is, midsole 31 is structured to provide the foot with cushioning during walking or running, for example. Outsole 32 is secured to a lower surface of midsole 31 and is formed of a durable, wear-resistant material that engages the ground. In addition, sole structure 30 may include an insole, which is a thin cushioning member, located within the void and adjacent to the foot to enhance the comfort of footwear 10.

Figure 2:
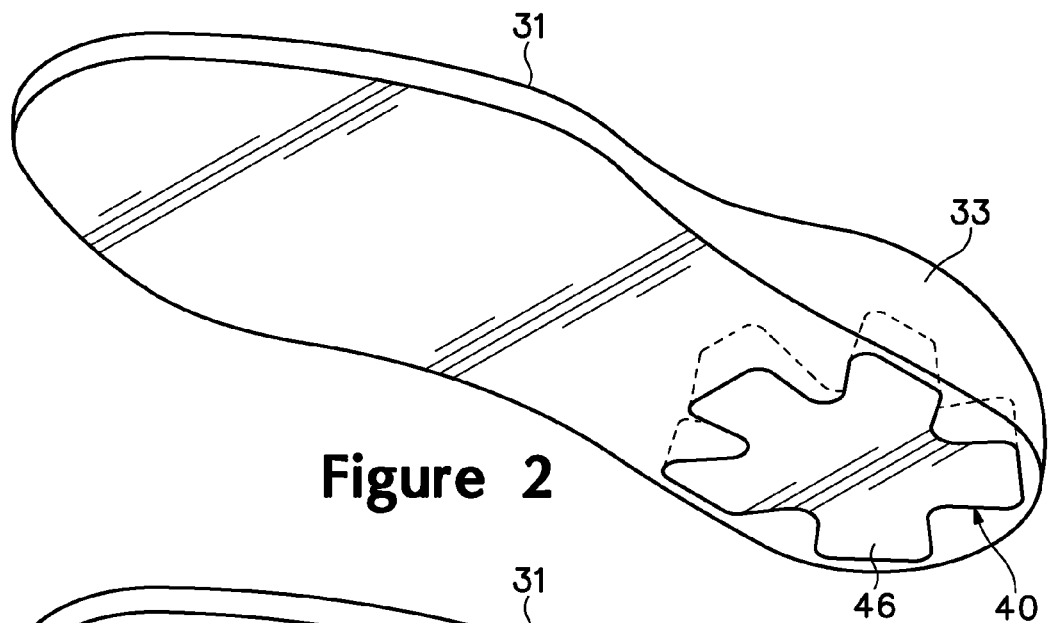
FIG. 2 is a perspective view of the midsole depicted in FIG. 1.
Figure 3:
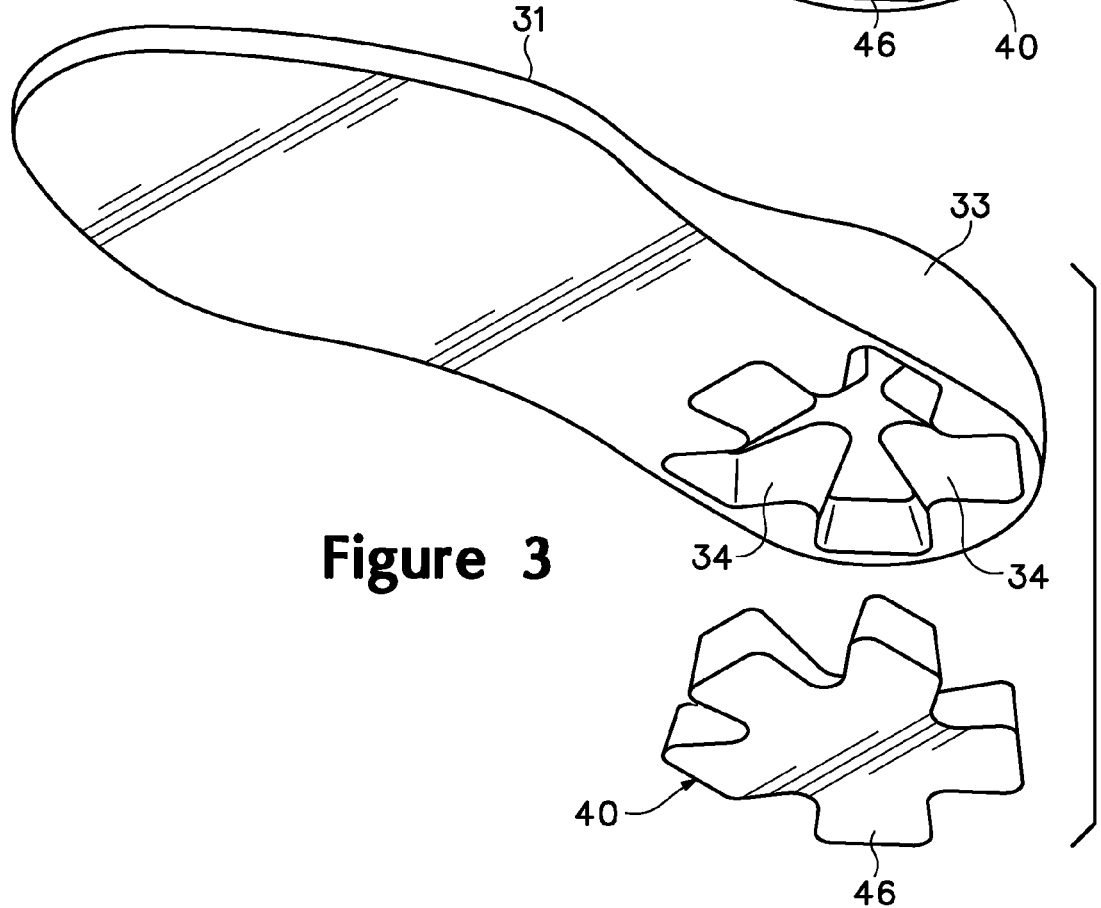
FIG. 3 is a exploded perspective view of the midsole depicted in FIG. 1.
Figure 4:
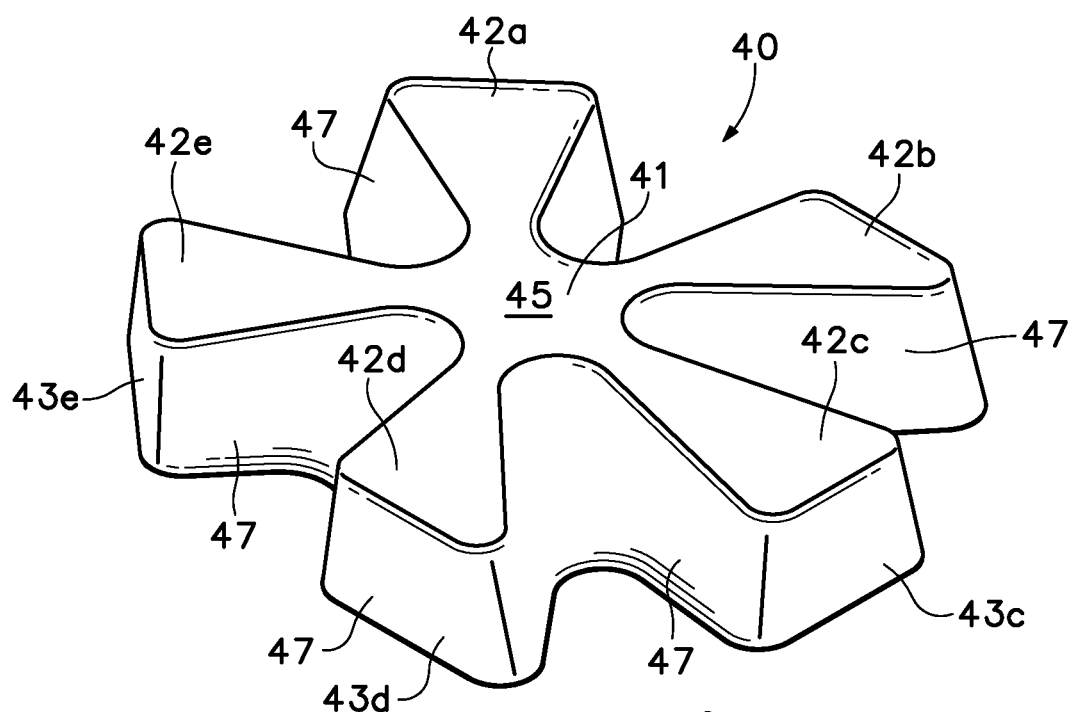
FIG. 4 is a perspective view of the first chamber.
Figure 5:
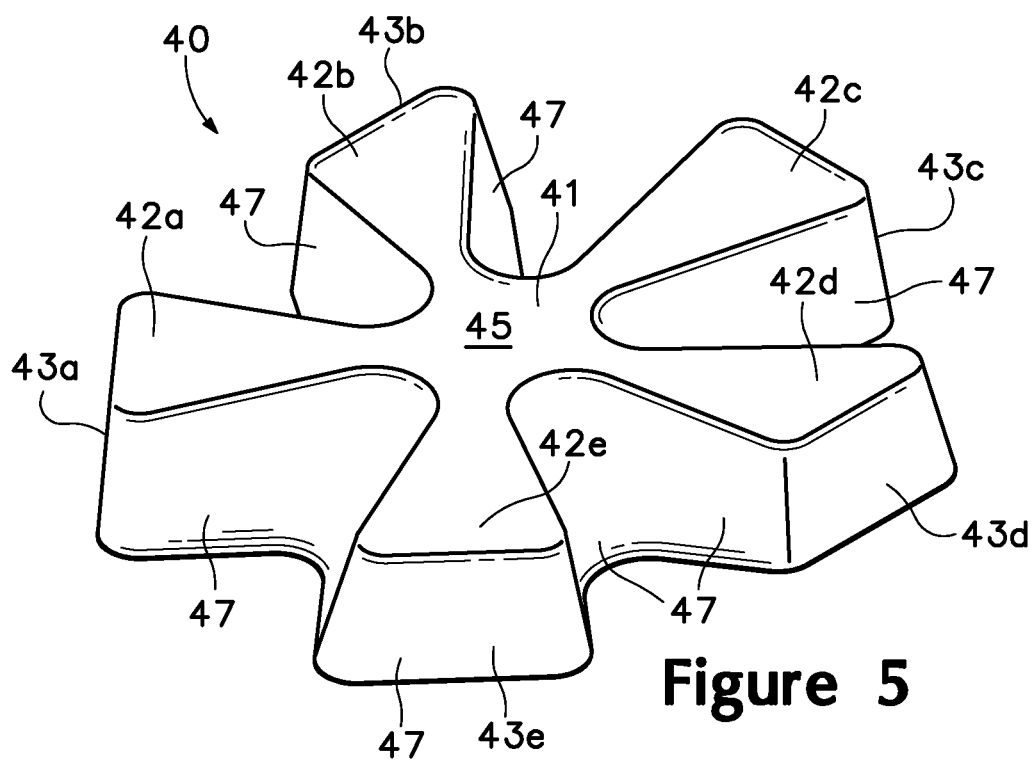
FIG. 5 is another perspective view of the first chamber.

Midsole 31 is primarily formed of a polymer foam material, such as polyurethane or ethylvinylacetate, that encapsulates a fluid-filled chamber 40. As depicted in FIGS. 2 and 3, chamber 40 is positioned in a heel region of midsole 31, which corresponds with the area of highest initial load during footstrike. Chamber 40 may, however, be positioned in any region of midsole 31 to obtain a desired degree of cushioning response. Furthermore, midsole 31 may include multiple fluid-filled chambers having the general configuration of chamber 40.

Chamber 40 is depicted as having the structure of a bladder, wherein sealed layers of polymeric material enclose a fluid. Alternately, chamber 40 may be formed as a void within midsole 31. That is, material having the shape of chamber 40 may be absent from midsole 31, thereby forming chamber 40.

In comparison with chambers of the prior art, chamber 40 and its arrangement in the foam material of midsole 31 produces a relatively large deflection for a given load during initial stages of compression. As the compression of chamber 40 increases, however, the stiffness of chamber 40 increases in a corresponding manner. This response to compression, which will be described in greater detail in the following material, is due to the structure of chamber 40 and the manner in which chamber 40 is incorporated into midsole 31. In general, the structure of chamber 40 may be characterized as a single chamber, fluid-filled bladder. More particularly, chamber 40 has a central area 41 surrounded by five lobes 42a-42e that each have a distal end 43a-43e, respectively, as depicted in FIGS. 4-7. Lobes 42a-42e extend radially outward from central area 41. Accordingly, lobes 42a-42e may extend outward in different directions from a periphery of central area 41. In combination with the foam material of midsole 31, which fills the spaces between lobes 42a-42e, midsole 31 provides an appropriate ratio of air to foam in specific areas under the heel of the foot.

Figure 6A:
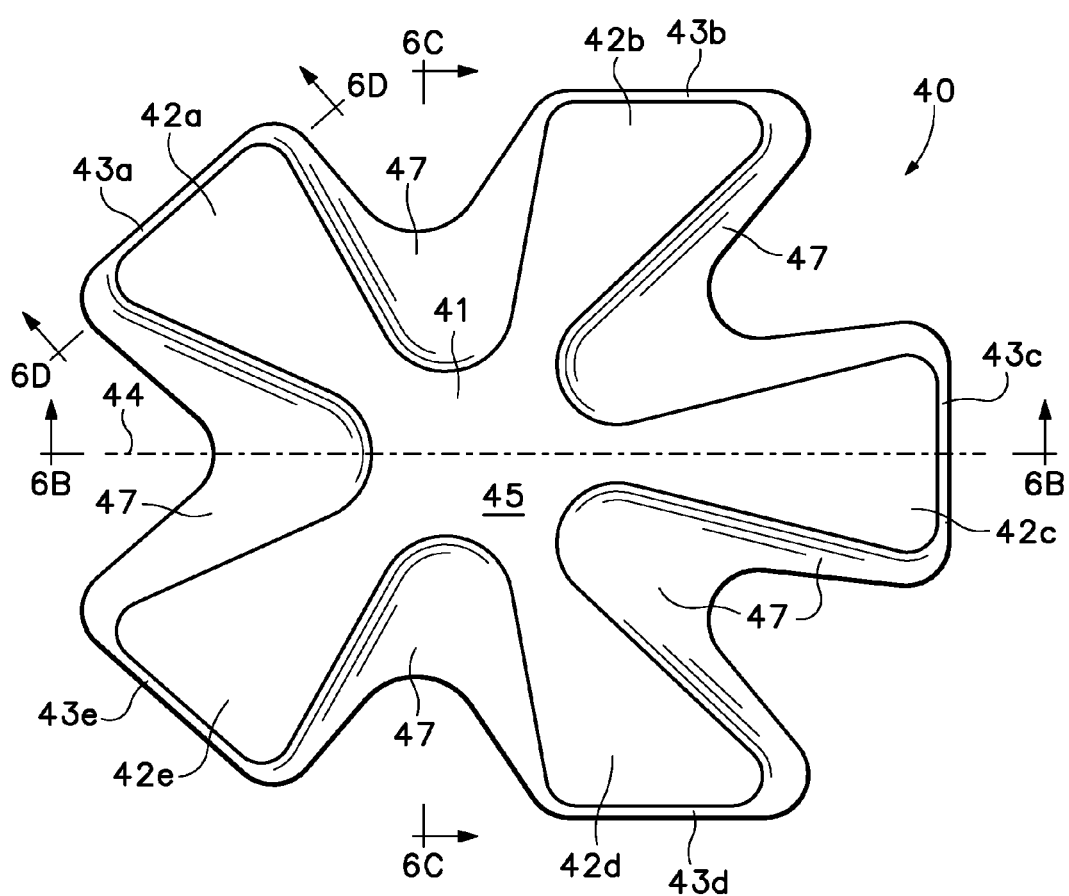
FIG. 6A is a top plan view of the first chamber.
Figure 7:
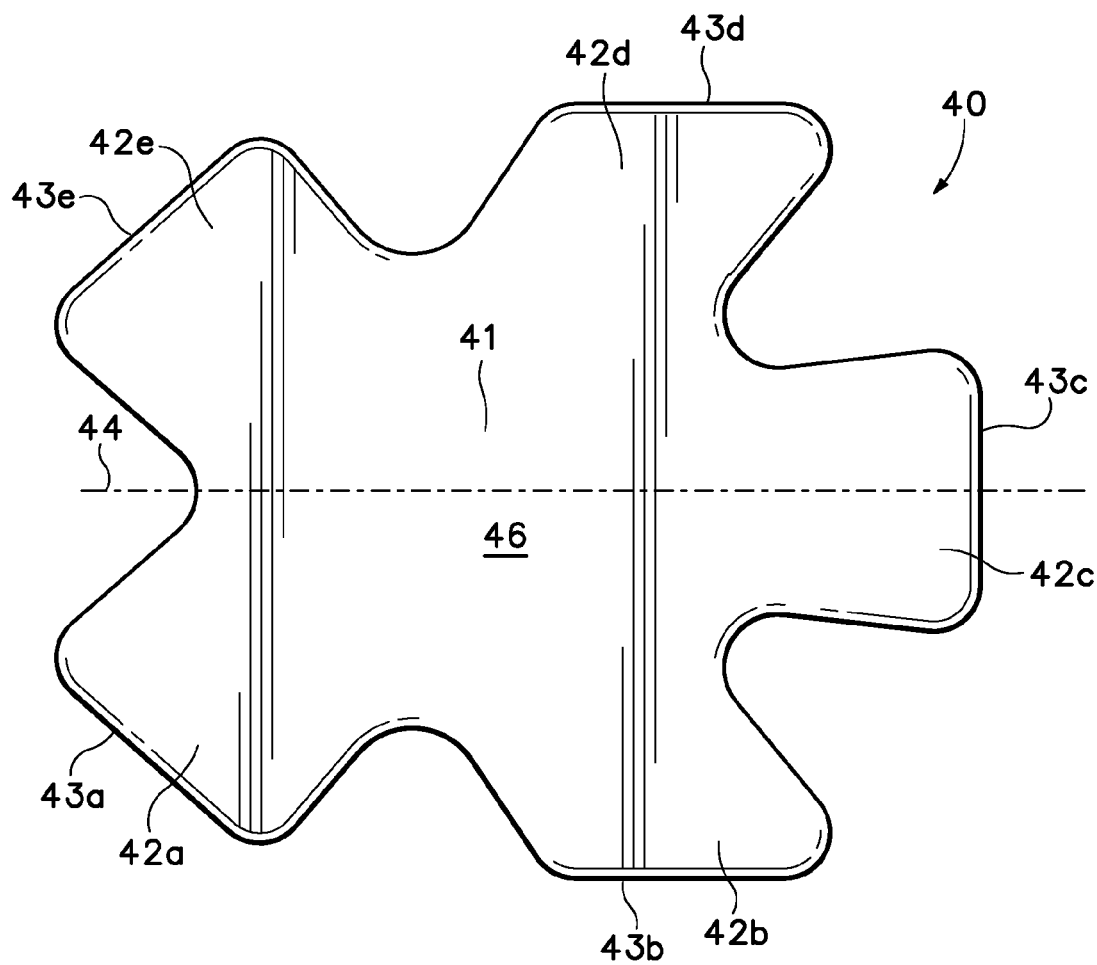
FIG. 7 is a bottom plan view of the first chamber.

For purposes of reference, a longitudinal axis 44 is depicted in FIGS. 6A and 7 as extending through central area 41 and lobe 42c. Chamber 40 is symmetrical about a plane that extends through axis 44 and is generally perpendicular to the plane of FIGS. 6A and 7, while otherwise being asymmetrical. Accordingly, the structure of chamber 40 generally resembles the shape of an oak leaf. Chamber 40 also includes a first surface 45, an opposite second surface 46, and a sidewall 47 that extends between first surfaces 45 and 46. Both first surface 45 and second surface 46 have a generally planar configuration and are uniformly spaced apart from each other. First surface 45 has the general shape of second surface 46, but with a reduced area. Accordingly, sidewall 47 slopes in the area between the individual lobes 42a-42e. For example, the slope of sidewall 47 may be approximately 40 degrees adjacent to central area 41, approximately 80 degrees adjacent to distal ends 43a-43e, and gradually changing from 40 degrees to 80 degrees in the area between. At the position of distal ends 43a-43e, however, sidewall 47 has a substantially vertical slope of 90 degrees. Sidewall 47 may have a substantially planar configuration that forms an angle with respect to first surface 45, or sidewall 47 may be curved.

The specific configuration of midsole 31 and the orientation of chamber 40 may vary within the scope of the invention. When encapsulated by the polymer foam material in midsole 31, for example, a portion of distal ends 43a-43e may extend to an edge 33 of midsole 31, and may extend through edge 33 such that they are visible from the exterior of footwear 10. Furthermore, first surface 45 may be coextensive with the plane of the upper surface of midsole 31 such that the heel engages first surface 45. Alternately, chamber 40 may be entirely embedded within the foam material of midsole 31, or may be positioned with second surface 46 being coextensive with the plane of the upper surface of midsole 31. As depicted in FIGS. 1-3, however, distal ends 43a-43e do not extend through edge 33 and second surface 46 is positioned adjacent a lower surface of midsole 31. This configuration places a portion of the foam material in midsole 31 between the foot and first surface 45.

Figure 6B:
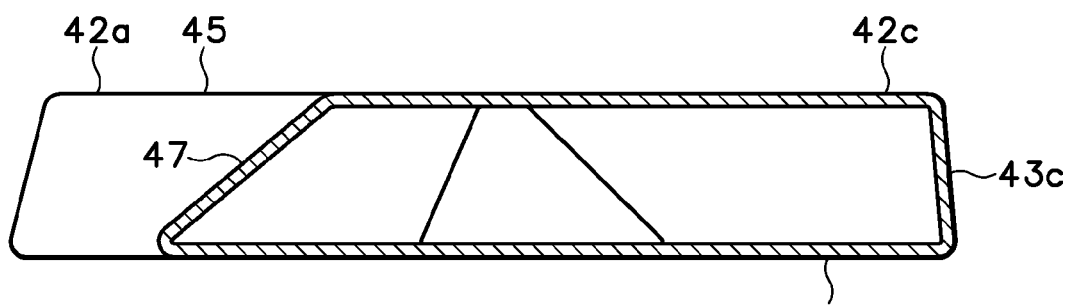
FIG. 6B is a cross-section of the first chamber, as defined by section line 6B-6B in FIG. 6A.
Figure 6C:
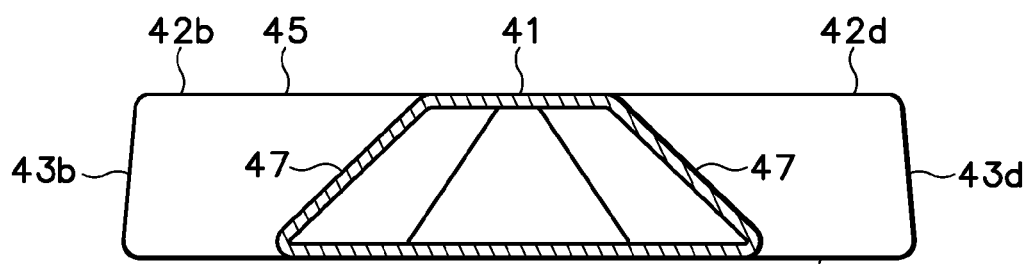
FIG. 6C is another cross-section of the first chamber, as defined by section line 6C-6C in FIG. 6A.
Figure 6D:
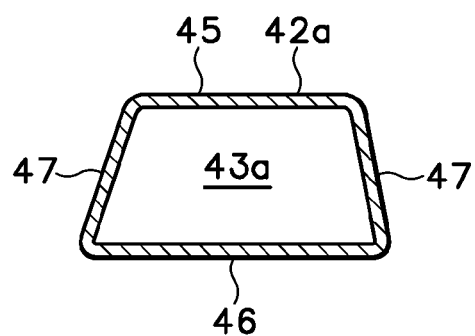
FIG. 6D is yet another cross-section of the first chamber, as defined by section line 6D-6D in FIG. 6A.

The slope of sidewall 47, which is depicted in the cross-sectional views of FIGS. 6B-6D, varies around chamber 40 to provide a smooth transition from chamber 40 to the polymer foam material of midsole 31 during compression. As discussed above, sidewall 47 slopes from approximately 40 degrees to 80 degrees between adjacent lobes 42a-42e and has a substantially vertical slope at distal ends 43a-43e. The spaces between adjacent lobes 42a-42e have a generally U-shaped configuration in plan view, which is created by a curved surface of sidewall 47. The portion of sidewall 47 positioned between adjacent lobes 42a-42e has a slope that is greater in areas adjacent to distal ends 43a-43e than in areas adjacent to central area 41. More specifically, sidewall 47 has a relatively shallow slope adjacent to central area 41, which corresponds with the rounded portion of the U-shaped configuration. As sidewall 47 extends between central area 41 and distal ends 43a-43e, the slope increases. At distal ends 43a-43e, however, the slope of sidewall 47 is substantially vertical. In other embodiments of the present invention, however, the slope of sidewall 47 may differ from the specific configuration discussed herein to provide different degrees of transition during compression.

The slopes of sidewall 47 between the various lobes 42a-42e are inversely matched by the resilient foam material of midsole 31. Accordingly, midsole 31 has a configuration with a plurality of columns 34 that are formed of the foam material and extend between lobes 42a-42e to contact the various areas of sidewall 47. The height of each column 34 increases from positions adjacent to first surface 45 to positions adjacent to second surface 46, and each column 34 slopes in a manner that corresponds with sidewall 47. Furthermore, due to the increasing spacing between lobes 42a-42e as they extend radially outward from central area 42, the width of each column 43 increases accordingly.

A variety of materials may be utilized to form first surface 45, second surface 46, and sidewall 47, including the polymeric materials that are conventionally utilized in forming the outer layers of fluid-filled chambers for footwear, as discussed in the Background of the Invention section. In contrast with a majority of the prior art chamber structures, however, the fluid within chamber 40 is at ambient pressure or at a pressure that is slightly elevated from ambient. Accordingly, the pressure of the fluid within chamber 40 may range from a gauge pressure of zero to over five pounds per square inch. Due to the relatively low pressure within chamber 40, the materials utilized to form first surface 45, second surface 46, and sidewall 47 need not provide the barrier characteristics that operate to retain the relatively high fluid pressures of prior art chambers. Accordingly, a wide range of polymeric materials such as thermoplastic urethane may be utilized to form first surface 45, second surface 46, and sidewall 47, and a variety of fluids such as air may be utilized within chamber 40. Furthermore, the wide range of polymeric materials may be selected based upon the engineering properties of the material, such as the dynamic modulus and loss tangent, rather than the ability of the material to prevent the diffusion of the fluid contained by chamber 40. When formed of thermoplastic polyurethane, first surface 45, second surface 46, and sidewall 47 may have a thickness of approximately 0.040 inches, but the thickness may range, for example, from 0.018 inches to 0.060 inches.

The relatively low pressure of the fluid within chamber 40 also provides another difference between chamber 40 and prior art chambers. The relatively high pressure in prior art chambers often requires the formation of internal connections between the polymer layers to prevent the chamber from expanding outward to a significant degree. That is, internal connections were utilized in prior art chambers to control overall thickness of the chambers. In contrast, chamber 40 does not have internal connections between first surface 45 and second surface 46.

Chamber 40 may be manufactured through a variety of manufacturing techniques, including blow molding, thermoforming, and rotational molding, for example. With regard to the blow molding technique, thermoplastic material is placed in a mold having the general shape of chamber 40 and pressurized air is utilized to induce the material to coat surfaces of the mold. In the thermoforming technique, layers of thermoplastic material are placed between corresponding portions of a mold, and the mold is utilized to compress the layers together at peripheral locations of chamber 40. A positive pressure may be applied between the layers of thermoplastic material to induce the layers into the contours of the mold. In addition, a vacuum may be induced in the area between the layers and the mold to draw the layers into the contours of the mold. In the rotational molding technique, thermoplastic material is placed in a mold that subsequently rotates to induce the thermoplastic material to coat surfaces of the mold.

Chamber 40 and its arrangement in the foam material of midsole 31 produces a relatively large deflection for a given load during initial stages of compression when compared to the fluid-filled chambers discussed in the Background of the Invention section. As the compression of chamber 40 increases, however, the stiffness of chamber 40 increases in a corresponding manner due to the structure of chamber 40 and the manner in which chamber 40 is incorporated into midsole 31. Three phenomena operate simultaneously to produce the effect described above and include pressure ramping, the properties of the foam material in midsole 31, and film tensioning. Each of these phenomena will be described in greater detail below.

Pressure ramping is the increase in pressure within chamber 40 that occurs as a result of compressing chamber 40. In effect, chamber 40 has an initial pressure and initial volume when not being compressed within midsole 31. As midsole 31 is compressed, however, the effective volume of chamber 40 decreases, thereby increasing the pressure of the fluid within chamber 40. The increase in pressure operates to provide a portion of the cushioning response of midsole 31.

The properties of the foam material also affect the cushioning response of midsole 31, and will be discussed in terms of the configuration of the foam material and the hardness of the foam material. With regard to the configuration, the foam material in midsole 31, which may have a hardness of 50-90 on the Asker C scale, for example, is concentrated adjacent edge 33 and is less prevalent in areas corresponding with the center of chamber 40. A change in the number of lobes 42a-42e may be utilized, for example, to decrease the ratio of air to foam in peripheral portions of midsole 31. This type of change in midsole 31 may be utilized to increase the overall stiffness of midsole 31 during compression. Accordingly, the geometry of the foam material and the corresponding geometry of chamber 40 have an effect upon the cushioning response.

Finally, the concept of film tensioning has an effect upon the cushioning response. This effect is best understood when compared to pressurized prior art chambers. In the prior art chambers, the pressure within the chambers places the outer layers in tension. As the prior art chambers are compressed, however, the tension in the outer layers is relieved or lessened. Accordingly, compression of the prior art chambers operates to lessen the tension in the outer layers. In contrast with the pressurized prior art chambers, the tension in first surface 45 increases in response to compression due to bending of first surface 45. This increase in tension contributes to the cushioning response discussed above. In applications where chamber 40 is rotated such that second surface 46 is positioned adjacent the foot, the tension in second surface 46 will increases in response to compression, thereby contributing to the cushioning response Pressure ramping, the properties of the foam material, and film tensioning operate together to attenuate forces. The specific effect that pressure ramping, the properties of the foam material, and film tensioning has upon the cushioning response varies based upon location with respect to chamber 40. At perimeter portions of chamber 40, which corresponds with the locations of distal ends 43a-43e, the properties of the foam material provides reduced compliance and, therefore, increases the corresponding stiffness. As the location tends toward central area 41, columns 34 taper and allow a relatively large deflection, and the dominant phenomena that attenuate forces and absorb energy are film tensioning and pressure ramping. One skilled in the relevant art will recognize, based upon the preceding discussion, that the specialized cushioning response of sole structure 30 is primarily related to the general configuration of chamber 40 and the foam material of midsole 31 disclosed herein.

Based upon the considerations of pressure ramping, the properties of the foam material, and film tensioning, the cushioning response of midsole 31 is modifiable to provide a desired degree of force attenuation and energy absorption. For example, the volume of chamber 40, the number and shape of lobes 42a-42e, the slope of sidewall 47, the thickness of surfaces 45 and 46, the material utilized to form the exterior of chamber 40, and the position and orientation of chamber 40 within midsole 31 may be varied to modify the cushioning response. In addition, the properties of the foam material, including the hardness and thickness, may also be adjusted to modify the cushioning response. By varying these and other parameters, therefore, midsole 31 may be custom tailored to a specific individual or to provide a specific cushioning response during compression.

Second Chamber

Figure 8:
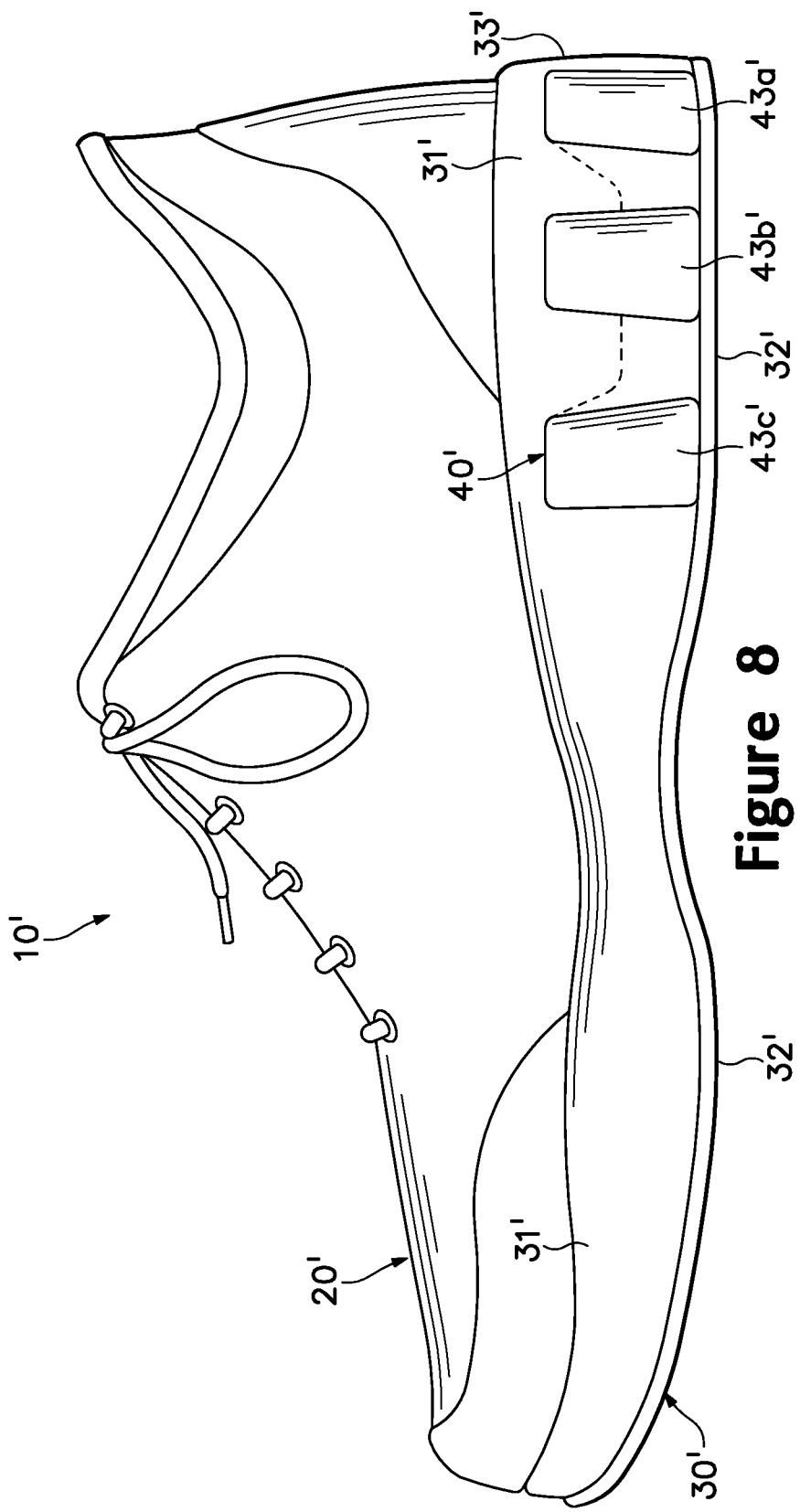
FIG. 8 is a side elevational view of another article of footwear having a midsole that incorporates a second chamber in accordance with the present invention.
Figure 11:
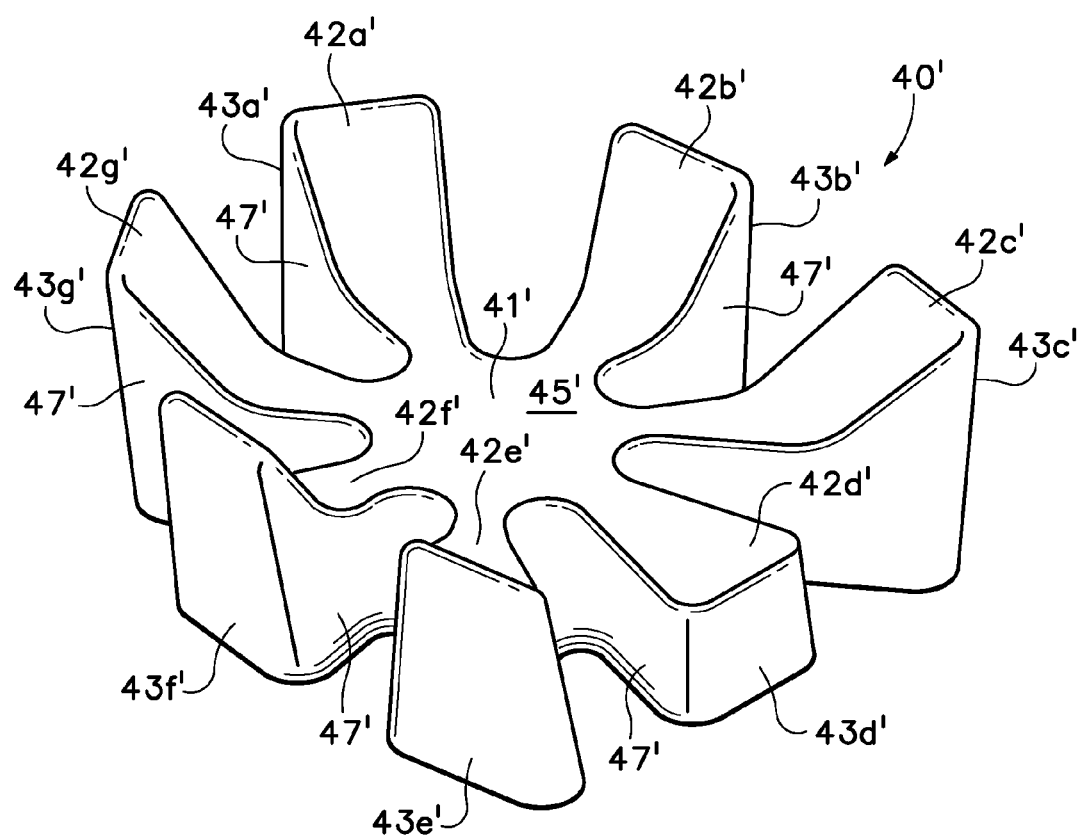
FIG. 11 is a perspective view of the second chamber.
Figure 12:
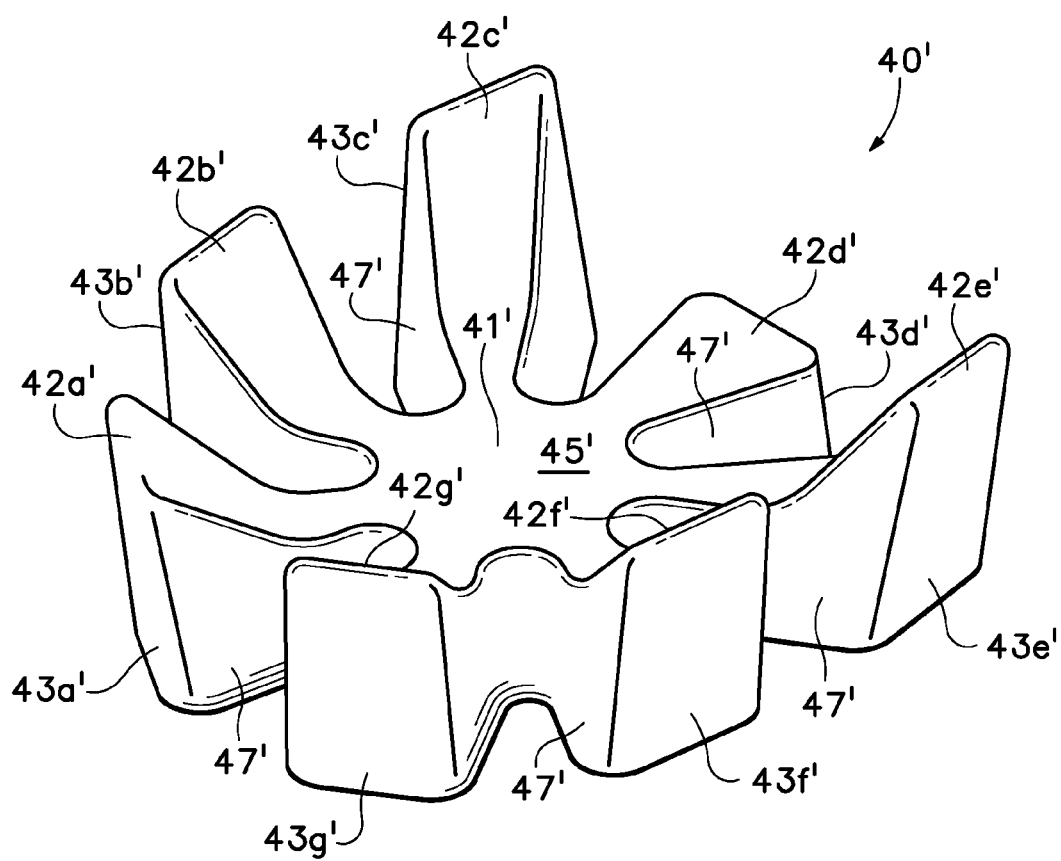
FIG. 12 is another perspective view of the second chamber.

Another embodiment of the present invention is depicted as footwear 10' in FIG. 8. Footwear 10' includes an upper 20' and a sole structure 30'. Upper 20' has a substantially conventional configuration that forms an interior void for securely and comfortably receiving the foot. Sole structure 30' is positioned below upper 20' and includes two primary elements, a midsole 31' and an outsole 32'. Midsole 31' is secured to a lower surface of upper 20' and operates to attenuate forces and absorb energy as sole structure 30' contacts the ground. Outsole 32' is secured to a lower surface of midsole 31' and is formed of a durable, wear-resistant material that engages the ground. In addition, sole structure 30' may include an insole, which is a thin cushioning member, located within the void and adjacent to the foot to enhance the comfort of footwear 10'. Accordingly, footwear 10' is generally similar in structure to footwear 10 discussed above. A primary difference of footwear 10', however, is the structure of midsole 31', and more specifically the structure of a chamber 40' that is embedded within a foam material of midsole 31'.

Midsole 31' is primarily formed of a polymer foam material, such as polyurethane or ethylvinylacetate, and chamber 40' is positioned within a heel area of midsole 31', as depicted in FIGS. 9 and 10. Chamber 40' is depicted individually in FIGS. 11-15 and includes a central area 41', seven lobes 42a'-42g', and seven corresponding distal ends 43a'-43g'. In addition, chamber 40' includes an axis 44' for purposes of reference, a first surface 45', a second surface 46', and a sidewall 47'. Chamber 40' is symmetrical about a plane that extends through axis 44' and is generally perpendicular to the plane of first surface 45' and second surface 46', while otherwise being asymmetrical. Whereas chamber 40 has surfaces 45 and 46 with a substantially planar configuration, first surface 45' of chamber 40' has a curved configuration. That is, portions of first surface 45' adjacent to distal ends 43a'-43c' and 43e'-43g' curve upward to form a rounded or concave structure. In contrast, the portion of first surface 45' on lobe 42d' has a substantially flat configuration.

With reference to FIGS. 9 and 10, the position of chamber 40' in midsole 31' is depicted. In general, chamber 40' is positioned such that second surface 46' is coextensive with a lower surface of the foam material in midsole 31'. This configuration places a portion of the foam material in midsole 31' between the foot and first surface 45'. Distal ends 43a'-43c' and 43e'-43g' are also coextensive with an edge 33' of midsole 31'. Accordingly, distal ends 43a'-43c' and 43e'-43g' are visible from an exterior of footwear 10'. Due to the curved configuration of second surface 46', lobes 42a'-42c' and 42e'-42g' increase in height and volume as they radiate outward from central area 41' to distal ends 43a'-43c' and 43e'-43g'. The increase in volume permits a greater volume of fluid to migrate from central area 41' to distal ends 43a'-43c' and 43e'-43g' during compression, thereby providing a more gradual transition from a relatively compliant cushioning response to a relatively stiff cushioning response. Furthermore, the increase in volume at the distal ends 43a'-43c' and 43e'-43g' reduces the overall fluid pressure within chamber 40' for a given degree of compression.

Figure 13A:
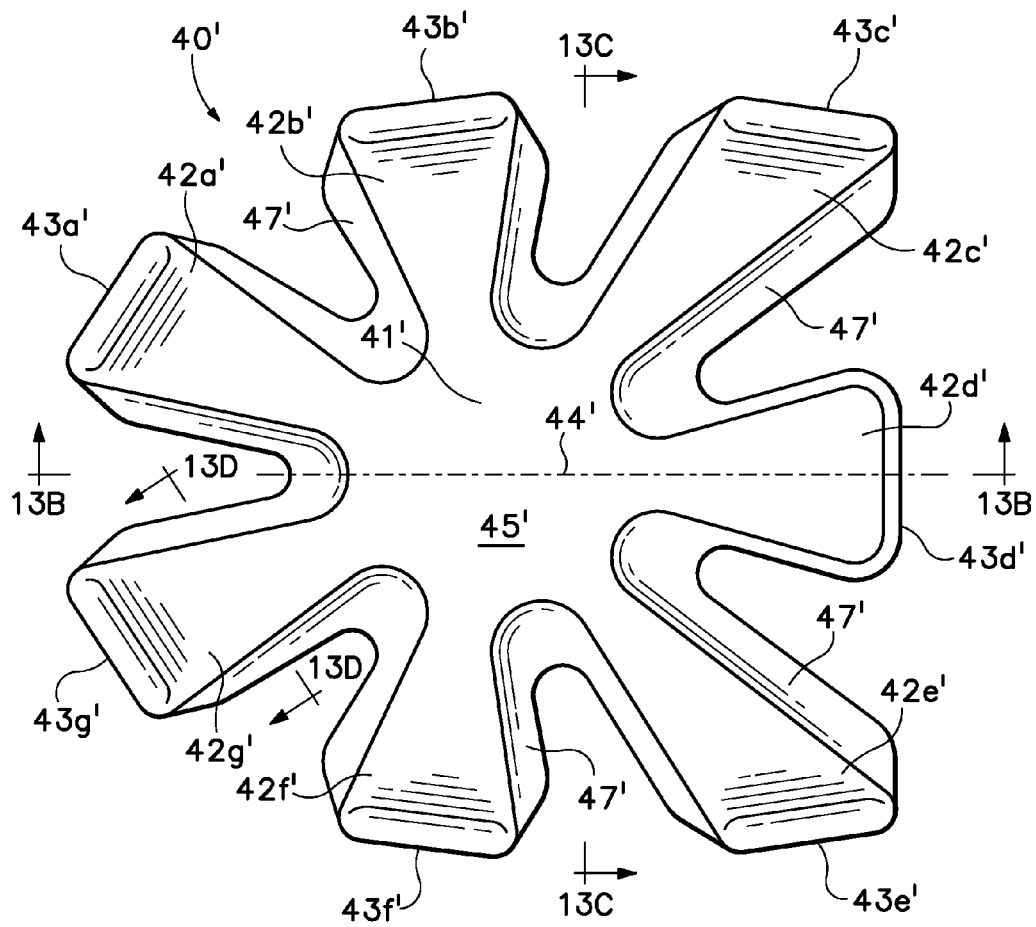
FIG. 13A is a top plan view of the second chamber.
Figure 13B:
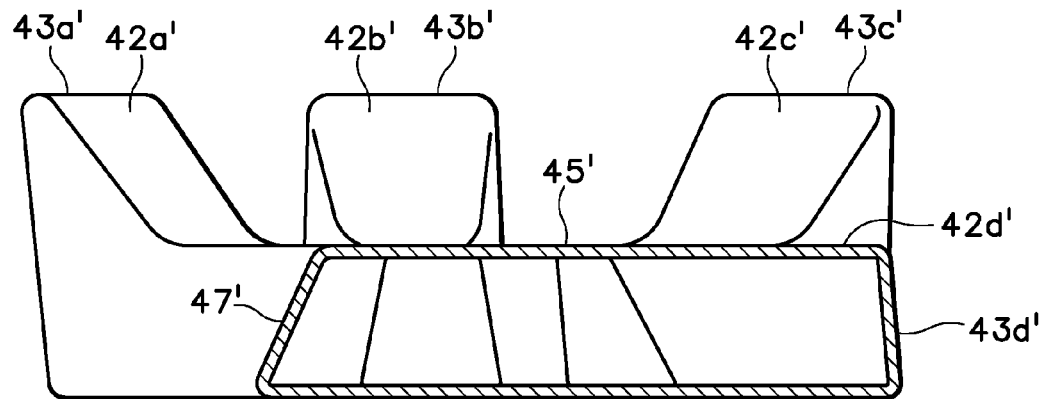
FIG. 13B is a cross-section of the second chamber, as defined by section line 13B-13B in FIG. 13A.
Figure 13C:
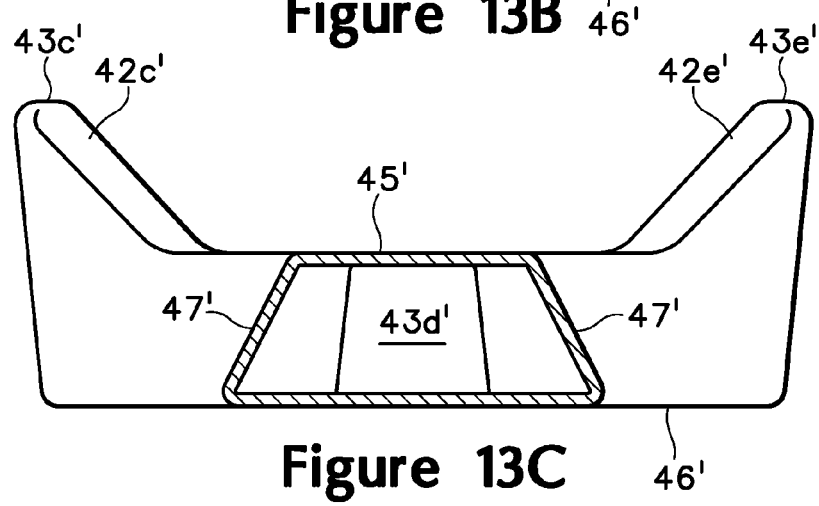
FIG. 13C is another cross-section of the second chamber, as defined by section line 13C-13C in FIG. 13A.
Figure 13D:
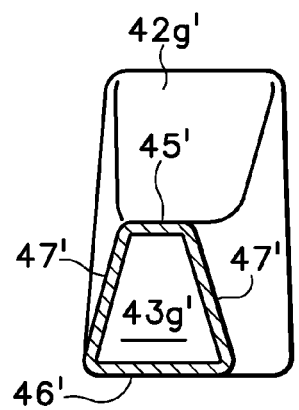
FIG. 13D is yet another cross-section of the second chamber, as defined by section line 13D-13D in FIG. 13A.
Figure 14:
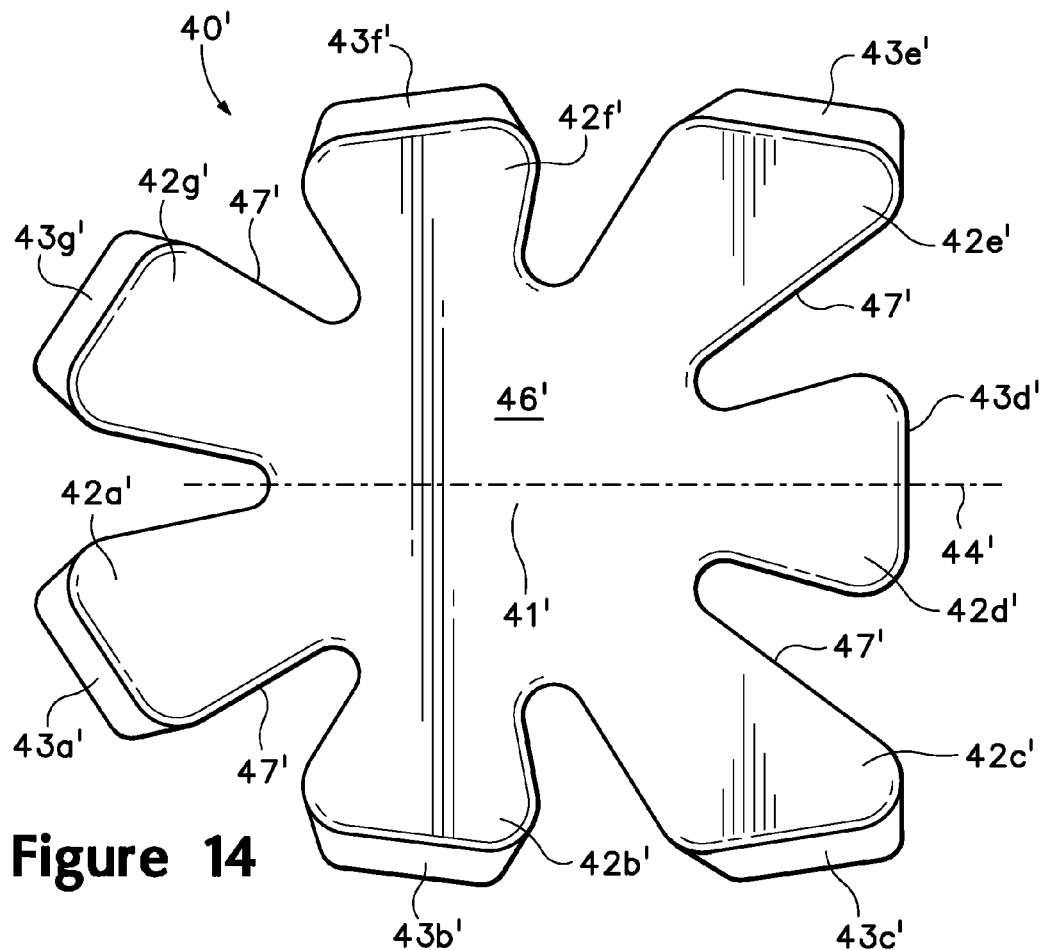
FIG. 14 is a bottom plan view of the second chamber.
Figure 15:
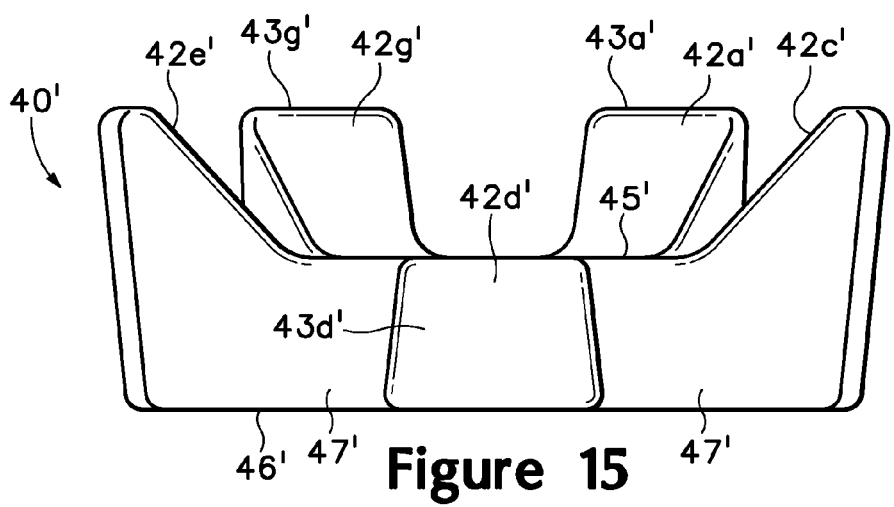
FIG. 15 is an elevational view of the second chamber.

The slope of sidewall 47', which is depicted in the cross-sectional views of FIGS. 13B-13D, varies around chamber 40' to provide a smooth transition during compression. Sidewall 47 slopes between adjacent lobes 42a'-42g' and has a substantially vertical slope at distal ends 43a'-43e'. The spaces between adjacent lobes 42a'-42g' have a generally U-shaped configuration, which is created by a curved surface of sidewall 47'. The portion of sidewall 47' positioned between adjacent lobes 42a'-42g' has a slope that is greater in areas adjacent to distal ends 43a'-43g' than in areas adjacent to central area 41'. More specifically, sidewall 47' has a relatively shallow slope adjacent to central area 41', which corresponds with the rounded portion of the U-shaped configuration. As sidewall 47' extends between central area 41' and distal ends 43a'-43e', the slope increases. At distal ends 43a'-43e', however, the slope of sidewall 47' is substantially vertical.

The typical motion of the foot during running proceeds as follows: First, the heel strikes the ground, followed by the ball of the foot. As the heel leaves the ground, the foot rolls forward so that the toes make contact, and finally the entire foot leaves the ground to begin another cycle. During the time that the foot is in contact with the ground and rolling forward, it also rolls from the outside or lateral side to the inside or medial side, a process called pronation. While the foot is air borne and preparing for another cycle the opposite process, called supination, occurs. Chamber 40 complements the motion of the foot during running by providing central area 41 with greater compliance than areas corresponding with lobes 42a-42e, thereby resisting rolling of the foot toward the medial side. In further embodiments, the size of lobes 42a-42e and the properties or quantity of the foam material may be altered to limit pronation. Similar concepts also apply to chamber 40'.

As with chamber 40, chamber 40' and its arrangement in the foam material of midsole 31' produces a relatively large deflection for a given load during initial stages of compression when compared to the fluid-filled chambers discussed in the Background of the Invention section. As the compression of chamber 40' increases, however, the stiffness of chamber 40' increases in a corresponding manner due to the structure of midsole 31. This effect is also the result of pressure ramping, the properties of the foam material in midsole 31', and film tensioning. Accordingly, the volume of chamber 40', the number and shape of lobes 42a'-42g', the slope of sidewall 47', the thickness of surfaces 45' and 46', the material utilized to form the exterior of chamber 40', and the position and orientation of chamber 40' within midsole 31' may be varied to modify the cushioning response. In addition, the properties of the foam material, including the amount of foam material and the hardness and thickness, may also be adjusted to modify the cushioning response. By varying these and other parameters, therefore, midsole 31' may be custom tailored to a specific individual or to provide a specific cushioning response during compression.

One structural difference between chamber 40 and chamber 40' relates to the curved configuration of first surface 45'. With the curved configuration, the effect that film tensioning has upon the cushioning response occurs more rapidly during compression due to the downward angle of first surface 45'. That is, for a given degree of deflection in chamber 40', the effect of film tensioning will have a greater effect upon the cushioning characteristics when first surface 45' is curved. Furthermore, the curved configuration permits chamber 40' to have a fluid volume that is greater than the fluid volume of chamber 40, but with approximately the same stiffness.

Chamber 40 and chamber 40' were discussed in the above material to provide examples of the many chamber configurations that fall within the scope of the present invention. In general, an chamber will have a pair of opposite surface that form lobes in the chamber. Chamber 40 and chamber 40' were disclosed as having five and seven lobes, respectively. In other embodiments, however, the chambers may have any number of lobes ranging from three to twenty, for example.

Manufacturing Method

A method of manufacturing chamber 40' through a blow molding process will now be discussed with reference to FIGS. 16-25. In a conventional blow molding process for forming footwear chambers, a generally hollow and tubular structure of molten polymer material, otherwise referred to as a parison, is positioned between corresponding portions of a mold. The mold is then closed upon the parison such that a portion of the molten polymer material is drawn into the mold and conforms to the shape of the mold. Finally, the mold compresses opposite sides of the parison together and forms a bond between the opposite sides. In some blow molding process, however, an inlet remains open such that a pressurized fluid may be injected at a later stage of the manufacturing process, with the inlet being subsequently sealed.

The conventional blow molding process described above commonly utilizes a mold having two corresponding mold portions. Each mold portion has a generally planar surface and a recess that is formed in the surface, with the shape of the recess corresponding to one-half of the shape of the chamber. Accordingly, closing the mold portions forms a cavity within the mold with the shape of the chamber.

One consequence of the conventional mold structure is that the parison must stretch in order to extend into the recesses, and the stretching decreases the overall thickness of the parison wall. In order to counteract the effects of stretching, the parison is generally formed with an initial wall thickness that will stretch to the desired, lesser wall thickness. This manner of counteracting the effects of stretching is appropriate when the mold geometry is such that the parison stretches in a generally uniform manner. When the mold geometry is such that the blow-up ratio of some portions of the parison stretch is more than the blow-up ratio of other portions, however, merely increasing the wall thickness of the parison may not be appropriate due the resulting variance in the wall thickness of the chamber.

Conventional mold portions with generally planar surfaces and recesses that form a cavity with the shape of chamber 40' would generally be of the type that would cause specific portions of the parison to stretch substantially more than other portions. For example, the portion of the parison forming the area of chamber 40' where distal ends 43a'-43g' join with first surface 45' would stretch substantially more than the portion of the parison forming central area 41'. Accordingly, the thickness of chamber 40' at the junction of distal ends 43a'-43g' and first surface 45' would be substantially less than the thickness of chamber 40' at central area 41'. The method of manufacturing chamber 40', however, which is described below, provides a blow molding process that forms each of first surface 45', second surface 46', and sidewall 47' to have a substantially uniform thickness.

Another consequence of the conventional mold structure is that a parting line is formed in a middle of a sidewall of the resulting chamber. As discussed above, the mold compresses opposite sides of the parison together and forms a bond between the opposite sides. The bond represents the parting line and corresponds with the area where the opposite mold portions meet. In some footwear applications, the sidewall of the chamber is visible. A parting line positioned in a middle of the sidewall would, therefore, detract from the aesthetic properties of the chamber. The method of manufacturing chamber 40', however, provides a blow molding process that positions the parting line away from the middle of sidewall 47', and particularly from areas corresponding with distal ends 43a'-43g'.

Figure 16:
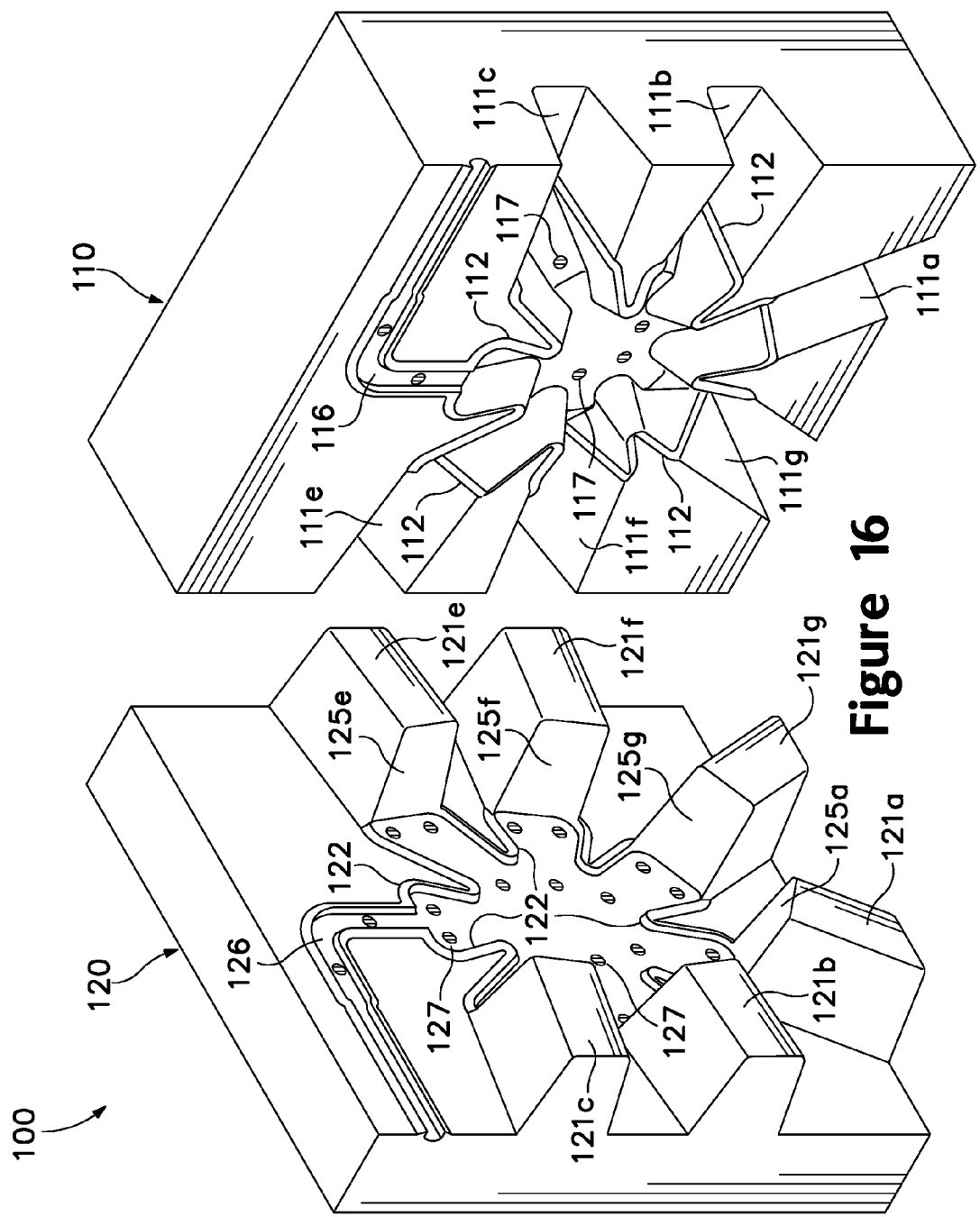
FIG. 16 is a perspective view of a mold for forming the second chamber.
Figure 17:
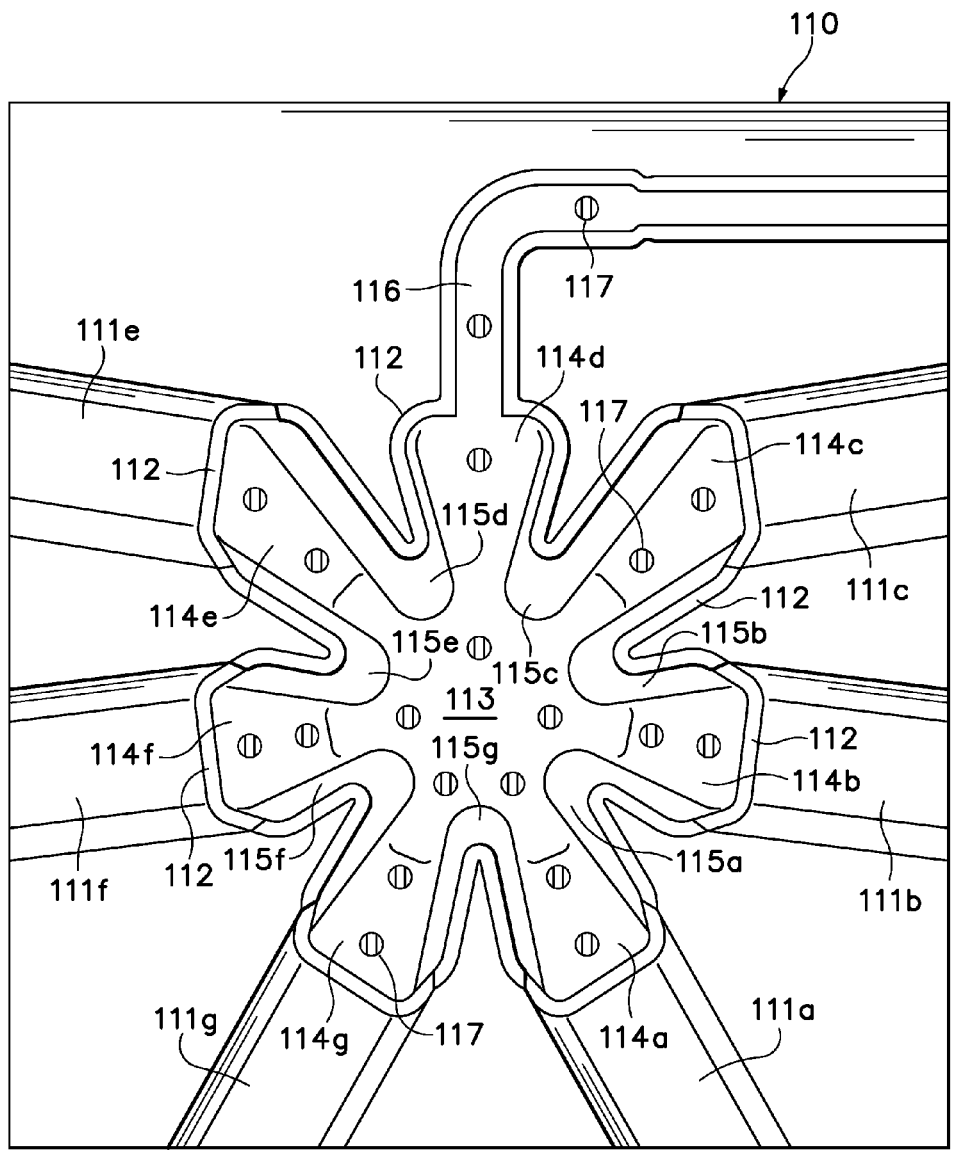
FIG. 17 is a plan view of a first portion of the mold.
Figure 18:
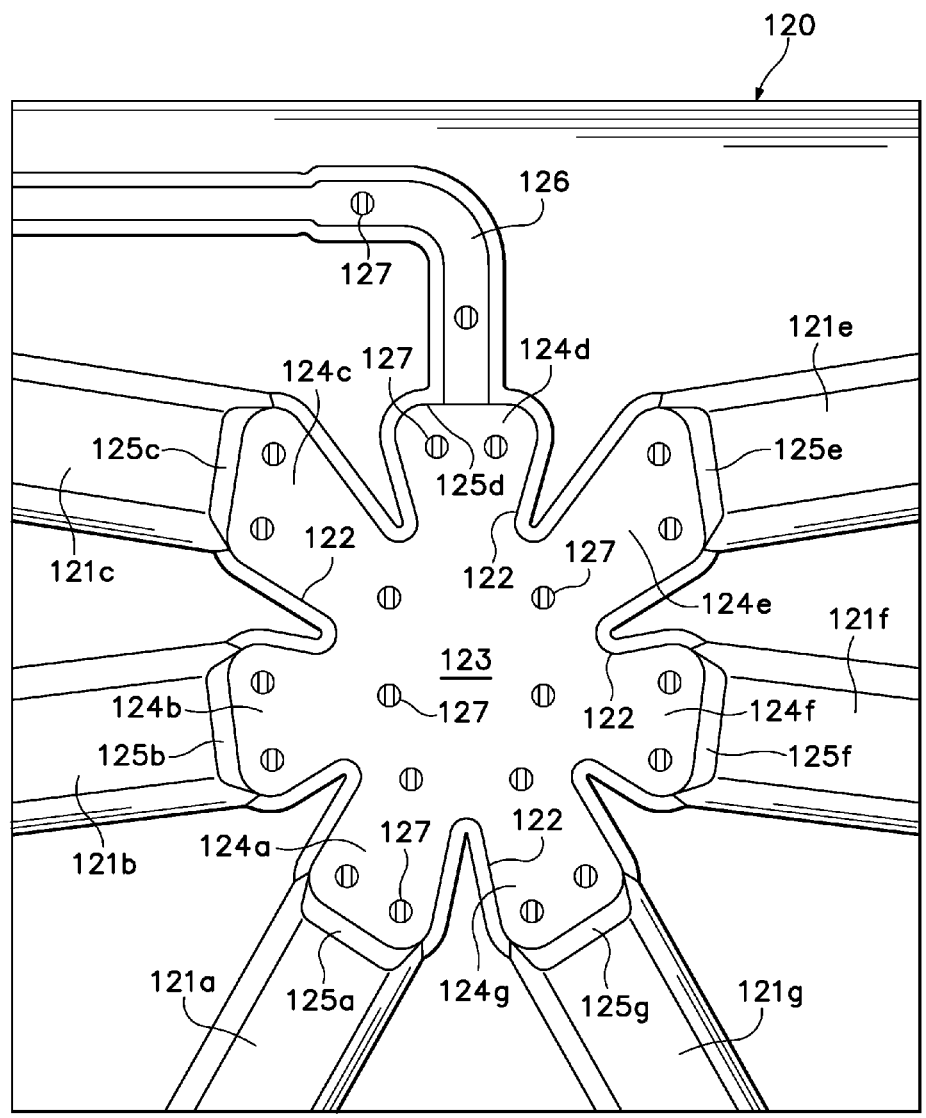
FIG. 18 is a plan view of a second portion of the mold.
Figure 22:
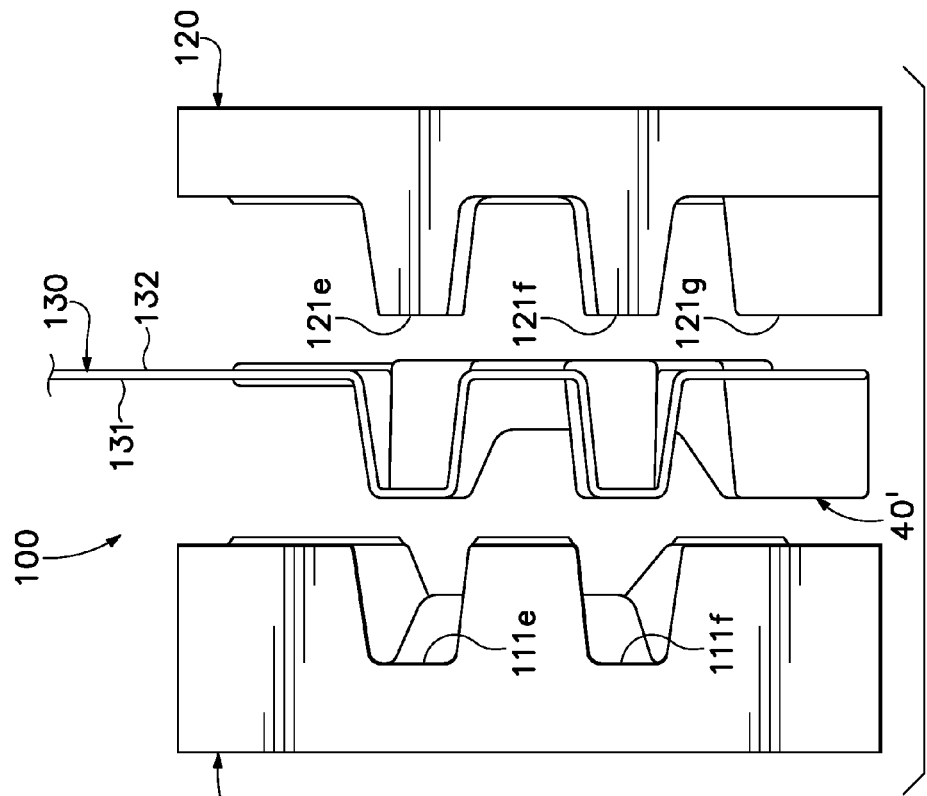
FIG. 22 is a side elevational view of a parison positioned between the first and second portions of the mold following molding.

A mold 100 that may be utilized to form chamber 40' is depicted in FIGS. 16-18. Mold 100 includes a first mold portion 110 and a corresponding second mold portion 120. When joined together, mold portions 110 and 120 form a cavity having dimensions substantially equal to the exterior dimensions of chamber 40'. Unlike the conventional mold for forming footwear chambers through a blow molding process, mold portions 110 and 120 do not have generally planar surfaces adjacent to the cavity that forms chamber 40'. Instead, first mold portion 110 defines a plurality of indentations 111a-c and 111e-g, and second mold portion 120 defines a plurality of protrusions 121a-c and 121e-g, as depicted in FIG. 16.

First mold portion 110 is depicted individually in FIG. 17 and forms the portions of chamber 40' corresponding with first surface 45' and the areas of sidewall 47' positioned adjacent to central area 41'. First mold portion 110 also forms that area of sidewall 47' corresponding with distal end 43d'. A ridge 112 extends around a centrally-located area of first mold portion 110. As will be discussed in greater detail below, ridge 112 is partially responsible for forming a parting line in chamber 40'. Accordingly, the area of first mold portion 110 located within the area bounded by ridge 112 forms first surface 45' and portions of sidewall 47'. More specifically, the surface of first mold portion 110 generally located proximal to a central area 113 forms central area 41', surfaces generally located around a plurality of lobe areas 114a-114g form the portions of lobes 42a'-42g' on first surface 45', and surfaces generally located around sidewall areas 115a-115g form the portions of sidewall 47' positioned adjacent to central area 41'.

The portions of first surface 45' adjacent to distal ends 43a'-43c' and 43e'-43g' curve upward to form a rounded or concave structure, as discussed with reference to chamber 40'. In order to form this configuration, the area of first mold portion 110 located within the area bounded by ridge 112 has a corresponding convex configuration. Accordingly, the surface of first mold portion 110 has a curved configuration from central area 113 to sidewall areas 114a-c and 114e-g.

An extension of ridge 112 extends outward from sidewall area 114d and forms an L-shaped channel 116. As discussed in greater detail below, channel 116 is utilized to form a conduit through which a fluid may be injected into chamber 40'. Another feature of first mold portion 110 is a plurality of slot vents 117 distributed throughout central area 113 and sidewall areas 114a-114g. Slot vents 117 provide outlets for air as a parison is drawn into first mold portion 110 during the formation of chamber 40'.

Second mold portion 120 is depicted individually in FIG. 18 and forms the portions of chamber 40' corresponding with second surface 46' and the areas of sidewall 47' corresponding with distal ends 43a'-43c' and 43e'-43g'. A ridge 122 extends around a centrally-located area of second mold portion 120, and ridge 122 cooperatively forms the parting line in chamber 40' with ridge 112. When first mold portion 110 is joined with second mold portion 120, therefore, ridge 112 is positioned immediately adjacent to ridge 122. The area of second mold portion 120 located within the area bounded by ridge 122 forms second surface 46' and the areas of sidewall 47' corresponding with distal ends 43a'-43c' and 43e'-43g'. More specifically, the surface of second mold portion 120 generally located proximal to a central area 123 forms central area 41', surfaces generally located around a plurality of lobe areas 124a-124g form the portions of lobes 42a'-42g' on second surface 46', and surfaces generally located around distal areas 125a-c and 125e-g form the portions of sidewall 47' corresponding with distal ends 43a'-43c' and 43e'-43g'.

With reference to chamber 40', second surface 46' has a generally planar configuration. The area of second mold portion 120 corresponding with central area 123 and lobe areas 124a-124g, which forms second surface 46', also has a generally planar configuration. Distal areas 125a-c and 125e-g extend upward from lobe areas 124a-c and 124e-g, respectively, to provide a generally planar area for forming distal ends 43a'-43c' and 43e'-43g'. An extension of ridge 122 extends outward from lobe area 124d and forms an L-shaped channel 126. In combination with channel 116, a conduit is formed through which a fluid may be injected into chamber 40'. Second mold portion 120 also includes a plurality of slot vents 127, which are distributed throughout central area 123 and lobe areas 124a-124g. As with slot vents 117, slot vents 127 provide outlets for air as the parison is drawn into second mold portion 120 during the formation of chamber 40'.

Indentations 111a-c and 111e-g and protrusions 121a-c and 121e-g extend outward from the portions of mold portions 110 and 120 that form chamber 40'. More specifically, indentations 111a-c and 111e-g extend radially outward from lobe areas 114a-c and 114e-g, respectively. Similarly, protrusions 121a-c and 121e-g extend radially outward from lobe areas 124a-c and 124e-g, respectively. Accordingly, indentations 111a-c and 111e-g and protrusions 121a-c and 121e-g are generally aligned with the portions of mold 100 that form lobes 42a'-42c' and 42e'-42g'.

The manner in which mold 100 is utilized to form chamber 40' from a parison 130 will now be discussed. Parison 130 is a generally hollow and tubular structure of molten polymer material. As utilized herein, the term tubular is not limited to a cylindrical configuration, which has a circular cross-section, but is also intended to encompass configurations having an elongated or oblong cross-section. In forming parison 130, the molten polymer material is extruded from a die. The wall thickness of parison 130 may be substantially constant, or may vary around the perimeter of parison 130. Accordingly, a cross-sectional view of parison 130 may exhibit areas of differing wall thickness. Suitable materials for parison 130 include the materials discussed above with respect to chamber 40 and chamber 40'.

Following the formation of parison 130, as described above, parison 130 is suspended between mold portions 110 and 120, as depicted in FIG. 19. For purposes of discussion, parison 130 has a first side 131 that faces first mold portion 110, and parison 130 has a second side 132 that faces second mold portion 120. Mold portions 110 and 120 are then aligned such that indentations 111*a-c* and 111*e-g* correspond with protrusions 121*a-c* and 121*e-g*, respectively. In this position, the areas of mold portions 110 and 120 that form chamber 40' are positioned on opposite sides of parison 130 and are also aligned. Mold portions 110 and 120 then translate toward each other such that mold 100 contacts parison 130, as depicted in FIG. 20. More specifically, the surfaces of first mold portion 110 in which indentations 111*a-c* and 111*e-g* are formed contact first side 131, and the surfaces of second mold portion 120 that form protrusions 121*a-c* and 121*e-g* contact second side 132.

When mold 100 contacts parison 130, portions of parison 130 bend to accommodate further movement of mold portions 110 and 120 toward each other, which is also depicted in FIG. 20. In particular, first surface 131 bends into indentations 111*a-c* and 111*e-g*, and second surface 132 bends around protrusions 121*a-c* and 121*e-g*. Accordingly, parison 130 continues to bend as mold portions 110 and 120 continue to translate toward each other.

Figure 21:
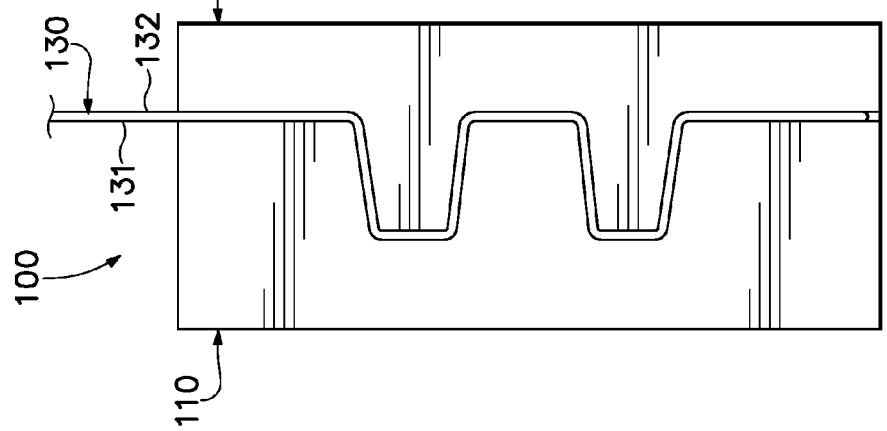
FIG. 21 is a side elevational view of the parison positioned between the first and second portions of the mold during another intermediate portion of molding.

Upon further movement of mold portions 110 and 120 toward each other, protrusions 121*a-c* and 121*e-g* extend entirely into indentations 111*a-c* and 111*e-g* and side 131 of parison 130 is compressed against side 132 of parison 130, thereby bonding portions of side 131 to side 132, as depicted in FIG. 21. A central area of parison 130, however, contacts and conforms to the surfaces of mold 100 that are intended to form chamber 40'. Accordingly, a central area of first side 131 contacts and conforms to the contours of central area 113, lobe areas 114*a*-114*g*, and sidewall areas 115*a*-115*g*. Similarly, a central area of second side 132 contacts and conforms to the contours of central area 123, areas lobe 124*a*-124*g*, and distal areas 125*a-c* and 125*e-g*. Furthermore, ridges 112 and 122 compress sides 131 and 132 together, thereby forming a bond that seals peripheral areas of chamber 40'.

As mold 100 closes, a fluid, such as air, having a positive pressure in comparison with ambient air may be injected between sides 131 and 132 to induce parison 130 to contact and conform to the contours of mold portions 110 and 120. Initially, the fluid may be delivered from the die mechanism that forms parison 130 and may be directed along the longitudinal length of parison 130, thereby preventing sides 131 and 132 from contacting each other. Once mold 100 closes upon parison 130, however, the fluid may be directed through the conduit formed by channels 116 and 126. For example, a needle may puncture parison 130 at the entrance to the conduit and deliver a fluid that travels down the conduit and into the area forming chamber 40'. Air may also be removed from the area between parison 130 and mold portions 110 and 120 through slot vents 117 and 127, thereby drawing parison 130 onto the surface of mold portions 110 and 120.

Figure 23:
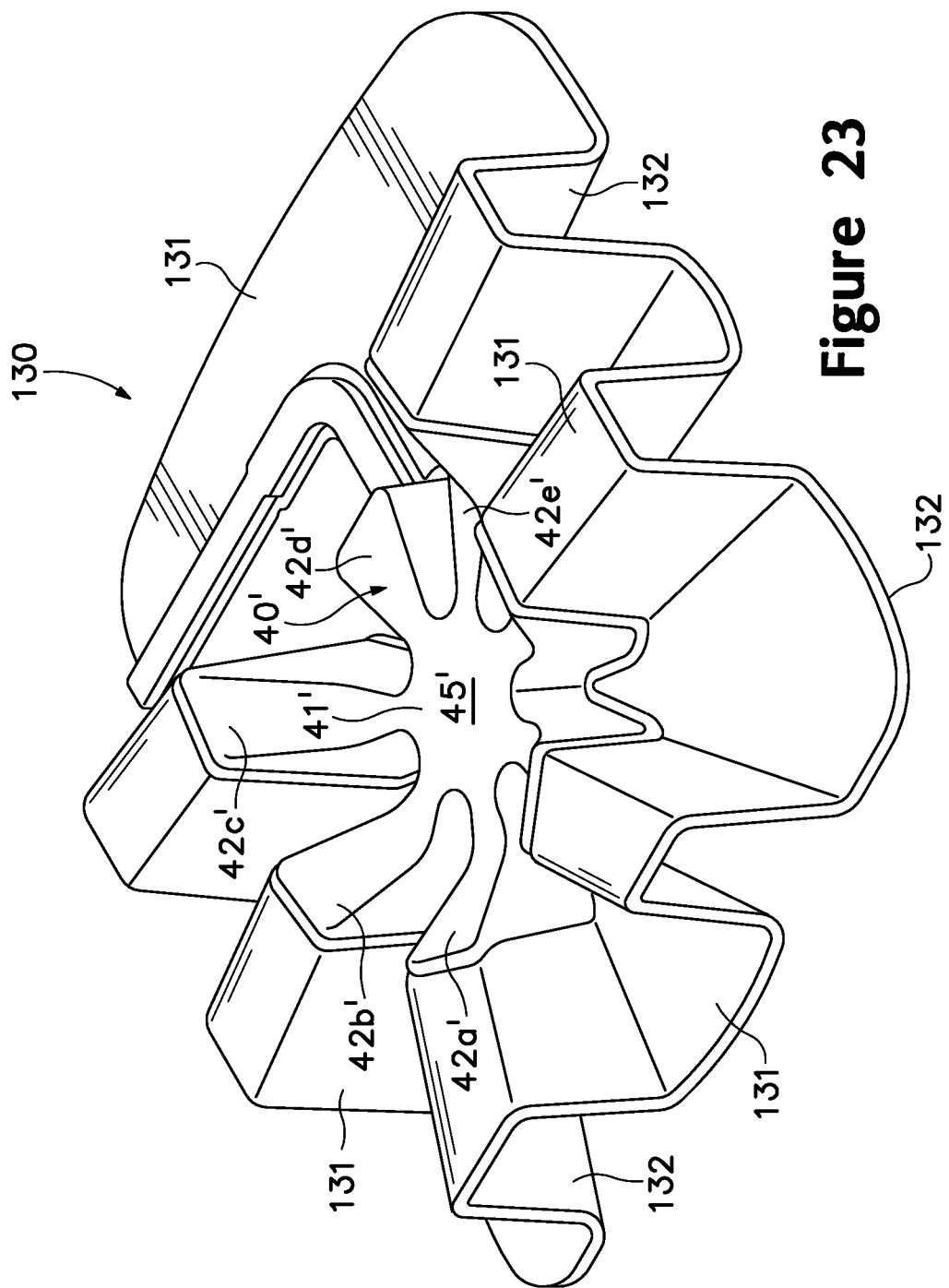
FIG. 23 is a first perspective view of the second chamber formed in the parison.
Figure 24:
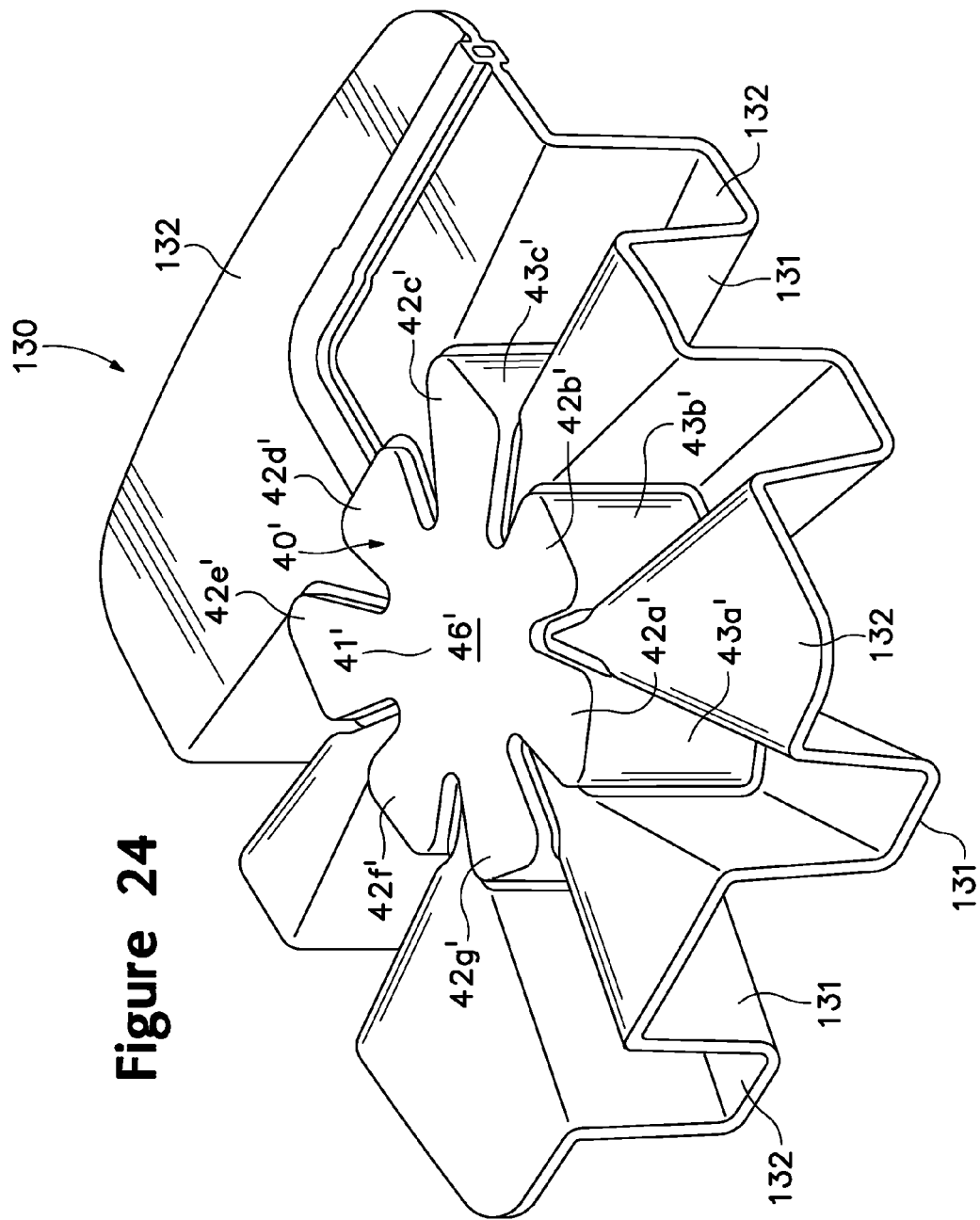
FIG. 24 is a second perspective view of the second chamber formed in the parison.
Figure 25:
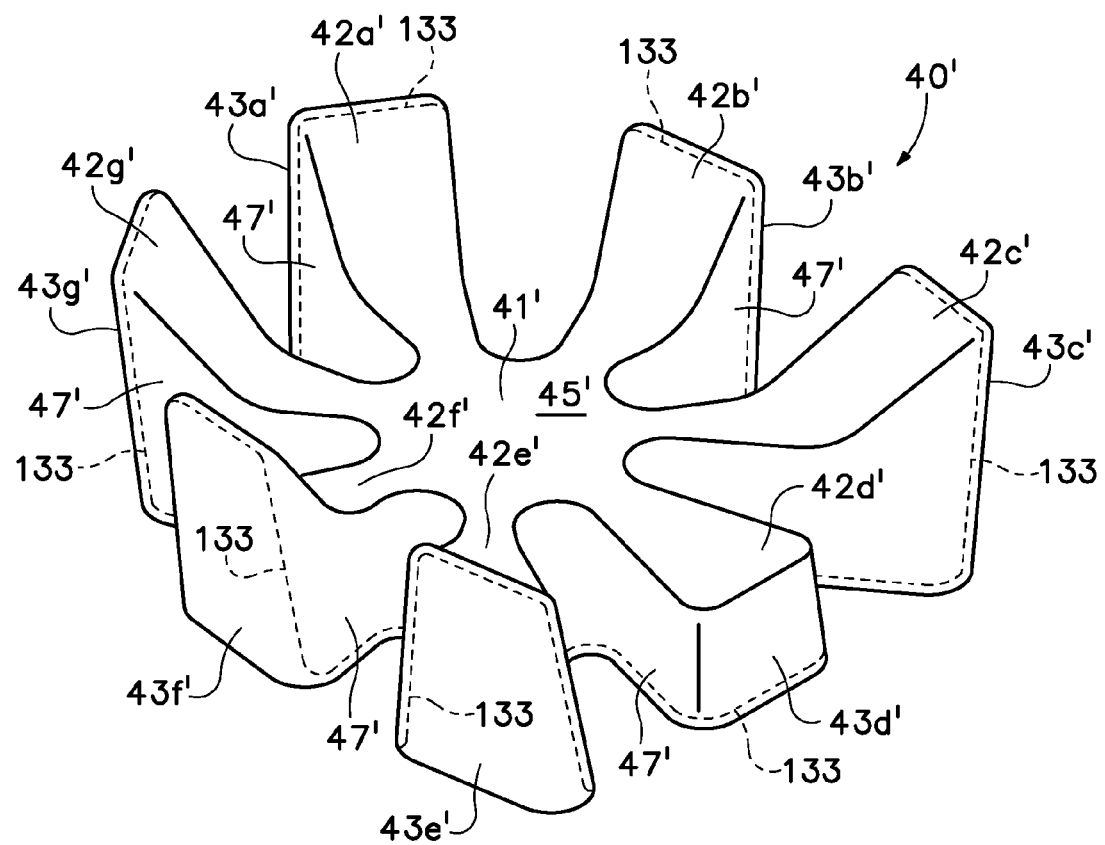
FIG. 25 is a perspective view of the second chamber that highlights a position of a parting line.

Once chamber 40' is formed within mold 100, mold portions 110 and 120 separate such that the parison may be removed from mold 100, as depicted in FIGS. 23-24. The polymer material forming parison 130 is then permitted to cool, and the conduit formed by channels 116 and 126 may be sealed to enclose the fluid within chamber 40' at ambient pressure. Alternately, a pressurized fluid may be injected through the conduit prior to sealing. In addition, excess portions of parison 130 may be trimmed or otherwise removed from chamber 40'. The excess portions may them be recycled or reutilized to form another parison.

Based upon the above discussion, mold portions 110 and 120 each generally include a bending zone and a forming zone that have different functions. With respect to first mold portion 110, the bending zone includes indentations 111*a-c* and 111*e-g*. The bending zone is responsible, therefore, for bending parison 130 prior to bonding. The forming zone includes central area 113, lobe areas 114*a*-114*g*, and sidewall areas 115*a*-115*g*. The forming zone is responsible, therefore, for imparting the actual shape of chamber 40' to the parison. That is, the forming zone actually forms first surface 45' and portions of sidewall 47' of chamber 40'. Similarly, bending zone of second mold portion 120 includes protrusions 121*a-c* and 121*e-g* and is also responsible for bending parison 130 prior to bonding. The forming zone of second mold portion 120 includes central area 123, lobe areas 124*a*-124*g*, and distal areas 125*a-c* and 125*e-g*, and the forming zone actually forms second surface 46' and other portions of sidewall 47'. Accordingly, mold portions 110 and 120 each include a bending zone that bends the parison and a forming zone that forms portions of chamber 47', the bending zone being separate from the forming zone.

Sides 131 and 132 bend when mold portions 110 and 120 initially contact parison 130, as discussed above. Some portions of parison 130 may stretch, however, in order to induce parison 130 to contact and conform to the various surfaces that form chamber 40'. The purpose of bending sides 131 and 132 when mold portions 110 and 120 initially contact parison 130 is to impart a uniformity to the stretching of parison 130. That is, the bending of parison 130 ensures that sides 131 and 132 stretch in a generally uniform manner, thereby imparting a largely uniform thickness to first surface 45', second surface 46', and sidewall 47' of chamber 40'.

Figure 26:
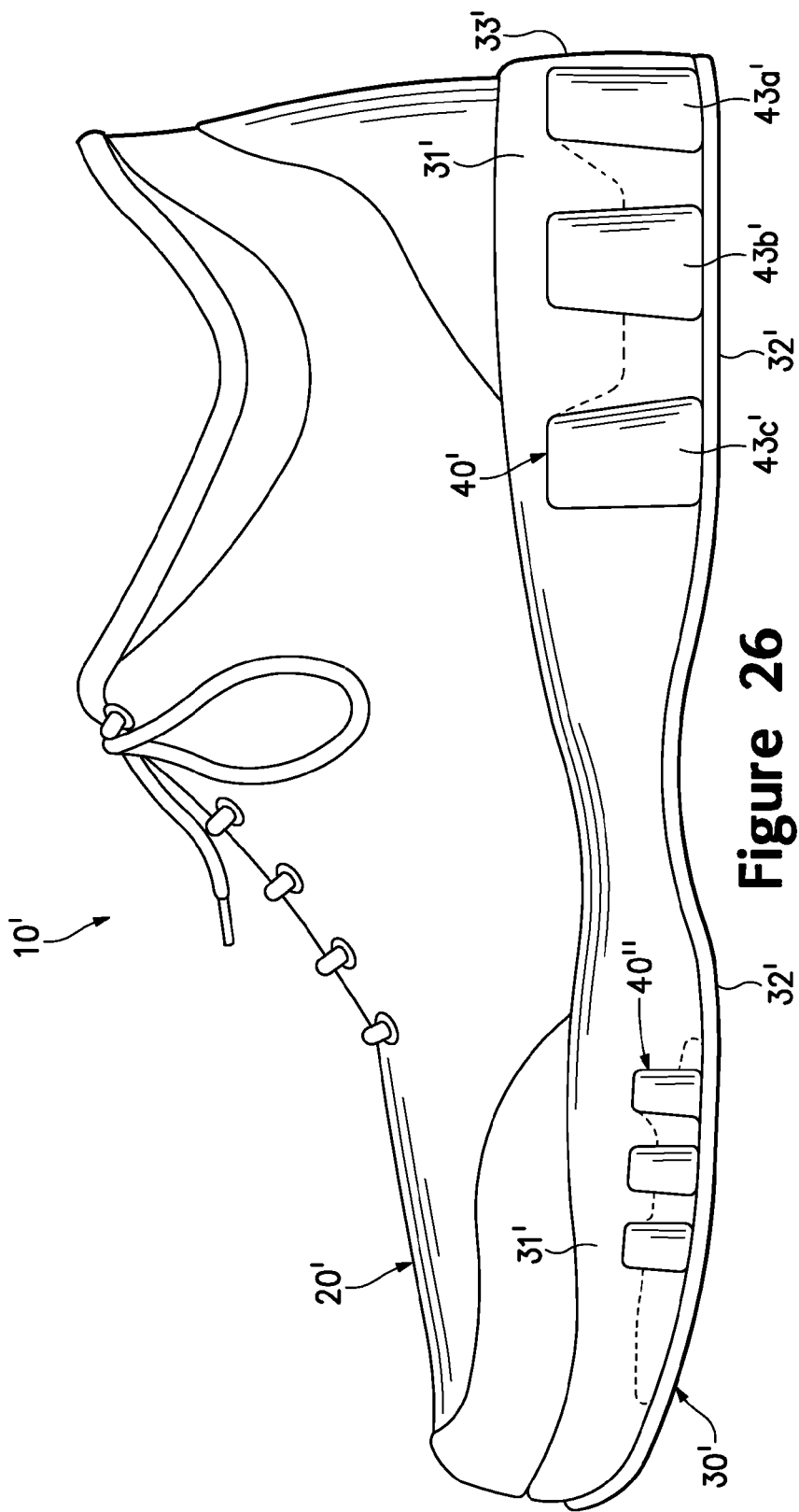
FIGS. 26 and 27 are side elevational views of another configuration of the footwear depicted in FIG. 8, wherein the midsole incorporates a third chamber in accordance with the present invention.

Another advantage of bending sides 131 and 132 relates to a position of a parting line 133, which corresponds with the area where the opposite mold portions meet adjacent to bladder 40'. That is, parting line 133 is the bond in chamber 40' between side 131 and side 132 that is formed by ridges 112 and 122. Referring to FIG. 26, the position of parting line 133 is highlighted with a dashed line for purposes of reference. In many prior art chambers formed through a conventional blow molding process, the parting line extends horizontally across the sidewall in a linear manner and obscures portions of the sidewall. With regard to chamber 40', however, parting line 133 does not merely extend vertically across sidewall 47'. Instead, parting line 133 follows a non-linear course having a wave-like pattern that extends around distal ends 43*a*'-43*g*'. More specifically, parting line 133 extends horizontally between sidewall 47' and first surface 45' at upper ends of distal ends 43*a*'-43*c*' and 43*e*'-43*g*'. Parting line 133 then extends vertically across sidewall 47' and along the sides of distal ends 43*a*'-43*c*' and 43*e*'-43*g*'. Accordingly, at least a portion of parting line 133 extends between first surface 45' and second surface 46'. Parting line 133 also extends horizontally between sidewall 47' and second surface 46' in areas between lobes 42a'-42g'. When incorporated into an article of footwear, as depicted in FIG. 8, parting line 133 will generally not be visible, and parting line 133 will not extend across distal ends 43a'-43g', which are the visible portions of chamber 40'. Parting line 133 is, therefore, not centered in sidewall 47'.

One consequence of the non-linear parting line 133 is that specific areas of sidewall 47' are formed from either first side 131 or second side 132. For example, the areas of sidewall 47' that are adjacent to central area 41', which will be referred to as first areas herein, are formed by first side 131. Accordingly, the first area of sidewall 47' extends from first surface 45' to second surface 46' and is formed from first side 131. Similarly, the areas of sidewall 47' that form distal ends 43a'-43c' and 43e'-43g', which will be referred to as second areas herein, are formed from second side 132. Accordingly, the second area of sidewall 47' also extends from first surface 45' to second surface 46' and is formed from second side 132. In general, the first area and the second area alternate such that the first side and the second side are interlaced to form sidewall 47'.

The blow molding method described above departs from the conventional blow molding process for footwear chambers. For example, mold 100 includes the plurality of indentations 111a-c and 111e-g and the plurality of protrusions 121a-c and 121e-g to bend parison 130 prior to bonding or stretching, thereby inducing uniformity in the wall thickness of chamber 40'. In addition, the bending of parison 130 forms a non-centered parting line 133 that does not extend across visible portions of sidewall 47'.

Third Chamber

Figure 27:
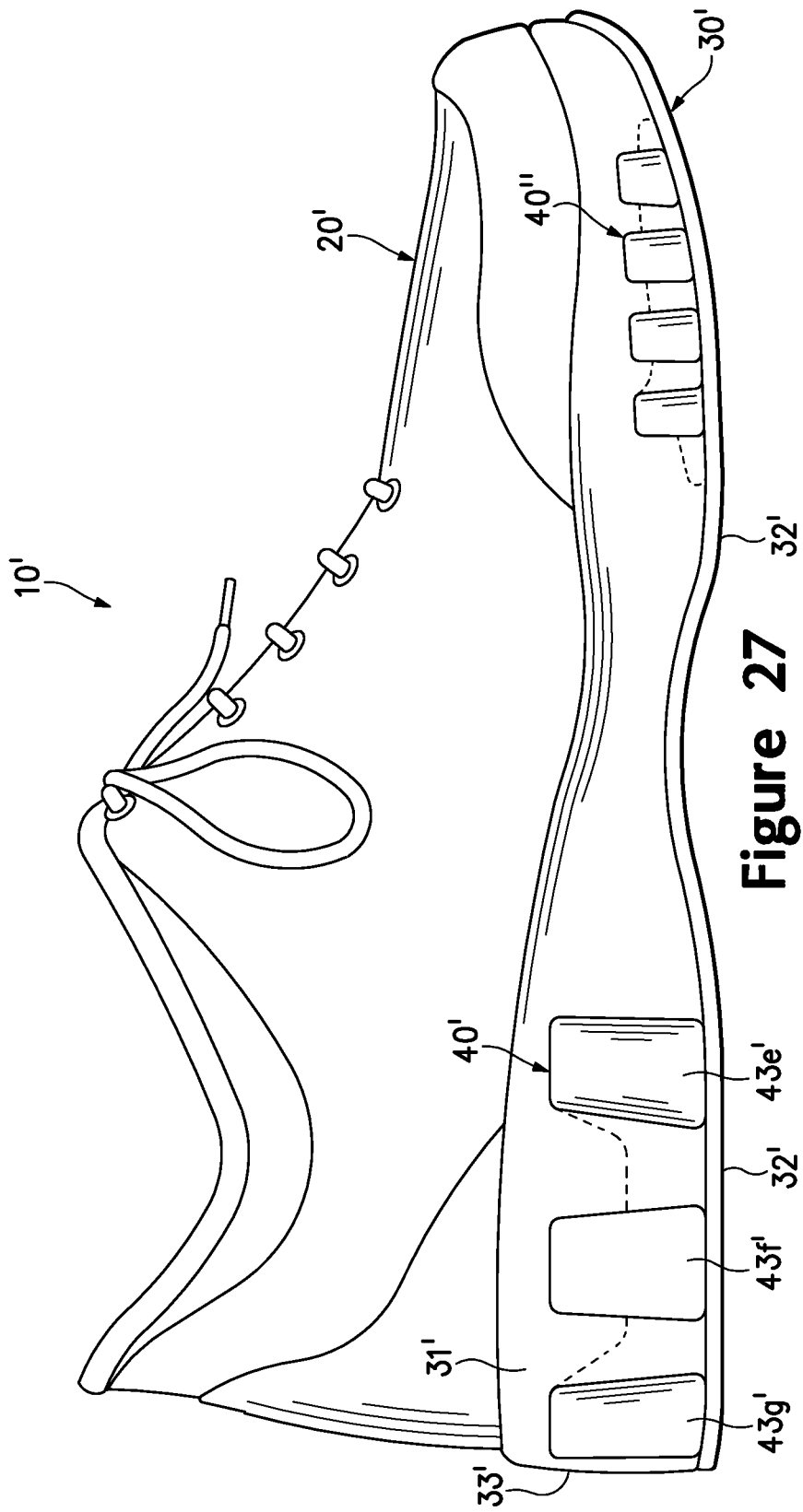

Another configuration of footwear 10' is depicted in FIGS. 26 and 27 as having both chamber 40' and an additional fluid-filled chamber 40". Whereas chamber 40' is located in the heel area of midsole 31', chamber 40" is located in a forefoot area of midsole 31'. Accordingly, chamber 40' and chamber 40" respectively provide force attenuation to the heel and forefoot of the wearer. Chamber 40" is depicted individually in FIGS. 28-33 and includes a first subchamber 41a", a second subchamber 41b", a third subchamber 41c", seven lobes 42a"-42g", and seven corresponding distal ends 43a"-43g". In addition, chamber 40" includes a pair of conduits 44a" and 44b", a first surface 45", a second surface 46", and a sidewall 47".

Figure 34:
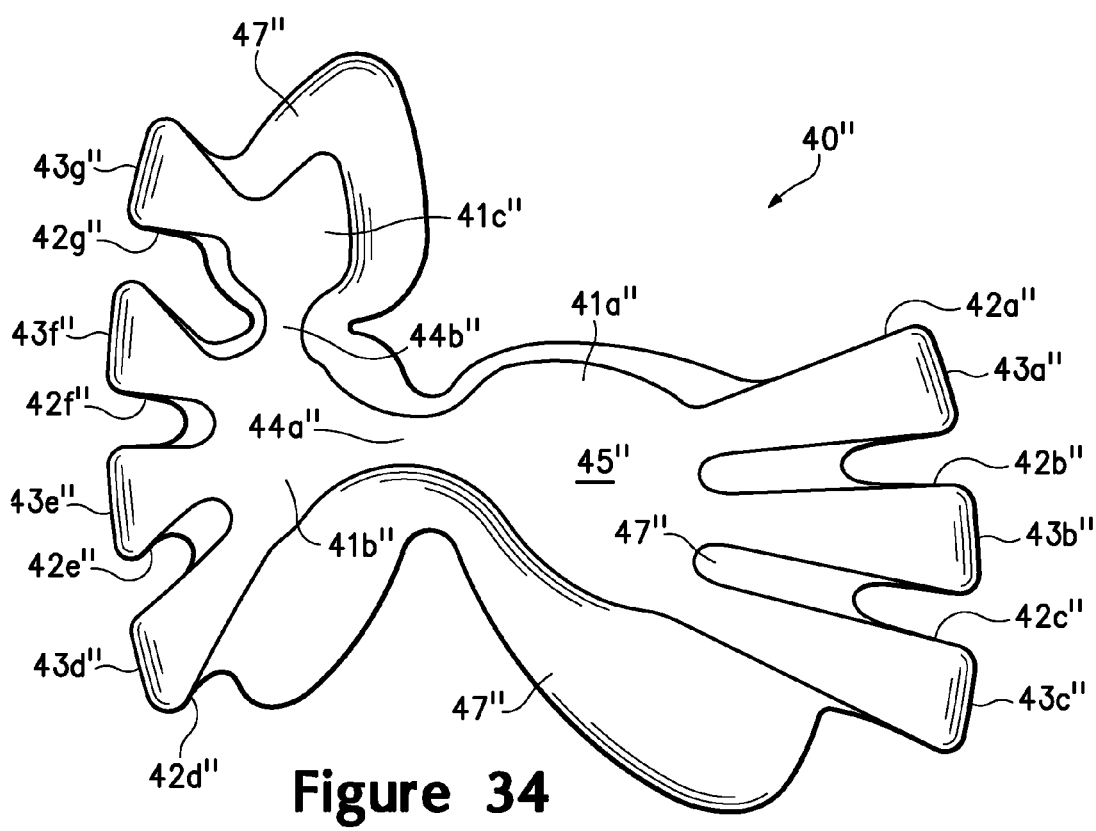
FIG. 34 is a top plan view of another configuration of the third chamber.

Whereas chambers 40 and 40' are suitable for use with either the left foot or right foot. The configuration of chamber 40" depicted in FIGS. 28-33 has an asymmetrical configuration and is most suitable for use with the left foot, as discussed in greater detail below. Accordingly, chamber 40" may be manufactured to have a substantially identical, but reversed, configuration that is most suitable for use with the right foot, as depicted in FIG. 34. Depending upon the particular style of footwear 10' and the intended use of footwear 10', either configuration of chamber 40" may be utilized in footwear 10'. That is, either configuration of chamber 40" may be utilized in footwear that is intended for either the left foot or the right foot.

Subchambers 41a"-41c" form a majority of the volume of chamber 40" and are fluidly-connected by conduits 44a" and 44b". More particularly, conduit 44a" extends between first subchamber 41a" and second subchamber 41b" to permit fluid flow between subchambers 41a" and 41b". Similarly, conduit 44b" extends between second subchamber 41b" and third subchamber 41c" to permit fluid flow between subchambers 41b" and 41c". If first subchamber 41a" is compressed, the fluid within first subchamber 41a" may pass through conduit 44a" and into second subchamber 41b", and a portion of the fluid within second subchamber 41b" may pass through conduit 44b" and into third subchamber 41c". If third subchamber 41c" is compressed, the fluid within third subchamber 41c" may pass through conduit 44b" and into second subchamber 41b", and a portion of the fluid within second subchamber 41b" may pass through conduit 44a" and into first subchamber 41a". Similarly, if second subchamber 41b" is compressed, the fluid within second subchamber 41b" may pass through both of conduits 44a" and 44b" and into each of subchambers 41a" and 41c". Accordingly, subchambers 41a"-41c" are in fluid communication with each other through conduits 44a" and 44b". In some configurations of chamber 40", valves may be located within conduits 44a" and 44b" to limit fluid flow between subchambers 41a"-41c", or one or both of conduits 44a" and 44b" may be sealed to prevent fluid flow.

Subchambers 41a"-41c" form each enclose a portion of the fluid within chamber 40". Although the relative volume of fluid within subchambers 41a"-41c" may vary significantly within the scope of the present invention, chamber 40" is depicted as having a configuration within first subchamber 41a" has a greater volume than both of subchambers 41b" and 41c", and second subchamber 41b" has a greater volume than third subchamber 41c". As a comparison, first subchamber 41a" may have, for example, a volume that is approximately twice the volume of second subchamber 41b", and second subchamber 41b" may have, for example, a volume that is approximately twice the volume of third subchamber 41c". In further configurations, chamber 40" may exhibit substantially different ratios between the volumes of subchambers 41a"-41c". Furthermore, third subchamber 41c" may be significantly reduced in size or absent from chamber 40" in some configurations.

Subchambers 41a"-41c" are arranged in a non-linear relationship, wherein second subchamber 41b" is located next to first subchamber 41a", and third subchamber 41c" is located forward of second subchamber 41b". More particularly, if an axis passed through each of subchambers 41a" and 41b", then third subchamber 41c" would be spaced from that axis. Similarly, if an axis passed through each of subchambers 41b" and 41c", then first subchamber 41a" would be spaced from that axis. In effect, therefore, subchambers 41a"-41c" form three points of a triangular pattern. As discussed in greater detail below, this arrangement for subchambers 41a"-41c" locates first subchamber 41a" in a lateral portion of footwear 10', and also locates subchambers 41b" and 41c" in a medial portion of footwear 10'.

Lobes 42a"-42c" extend outward from first subchamber 41a" and are in fluid communication with first subchamber 41a". If first subchamber 41a" is compressed, as discussed above, a portion of the fluid within first subchamber 41a" may also pass into lobes 42a"-42c". Similarly, lobes 42d"-42f" extend outward from second subchamber 41b" and are in fluid communication with second subchamber 41b", and lobe 42g" extends outward from third subchamber 41c" and is in fluid communication with third subchamber 41c". In addition to passing through conduits 44a" and 44b", fluid may pass into lobes 42d"-42g" if either of subchambers 41b" and 41c" are compressed. The number and location of lobes 42a"-42g" may vary significantly. In many configurations of chamber 40", however, each of subchambers 41a" and 41b" will generally have at least two of the lobes 42a"-42g".

Distal ends 43a"-43g" form end areas of lobes 42d"-42g" and are located opposite subchambers 41a"-41c", respectively. When chamber 40" is incorporated into footwear 10', distal ends 43a"-43g" may protrude through a sidewall of midsole 31'. More particularly, lobes 42a"-42c" may extend to a lateral side of footwear 10' such that distal ends 43a"-43c" protrude through a sidewall of midsole 31', and lobes 42d"-42g" may extend to an opposite medial side of footwear 10' such that distal ends 43d"-43g" protrude through an opposite portion of the sidewall of midsole 31'. In some configurations of footwear 10', however, distal ends 43a"-43g" may be wholly located within midsole 31', or distal ends 43a"-43g" may protrude outward and beyond the sidewall of midsole 31'. In addition, distal ends 43a"-43g" may be oriented substantially perpendicular to a plane on which the subchamber 41a"-41c".

First surface 45" forms an upper surface of chamber 40" and has a curved configuration. That is, portions of first surface 45" adjacent to distal ends 43a"-43g" curve upward to form a rounded or concave structure in the upper area of chamber 40". Second surface 46" is located opposite first surface 45" and has a generally planar configuration. In some configurations of footwear 10', second surface 46" may form the upper surface of chamber 40". In comparison with first surface 45", second surface 46" has a greater surface area. More particularly, second surface 46" is depicted as having approximately twice as much surface area as first surface 45", but may range from being substantially equal to having ten times as much surface area, for example. To account for the differences in surface area, sidewall 47" extends from a periphery of first surface 45" and slopes downward to a periphery of second surface 46". In comparison with second surface 46", which slopes downward, distal ends 43a"-43g" have a substantially vertical orientation.

As discussed above, the typical motion of the foot during running includes rolling from the outside or lateral side to the inside or medial side, which is referred to as pronation. Chamber 40" complements the motion of the foot during running through the relative locations of the various components of chamber 40". First subchamber 41a" is generally located in a lateral portion of footwear 10', and subchambers 41b" and 41c" are generally located in a medial portion of footwear 10'. In this configuration, at least a portion of first subchamber 41a" and lobes 42a"-42c" underlie the third, fourth, and fifth metatarsophalangeal joints (i.e., the joints respectively between the third, fourth, and fifth metatarsals and the third, fourth, and fifth proximal phalanges). Similarly, at least a portion of second subchamber 41b" and lobes 42d"-42f" underlie the first and second metatarsophalangeal joints (i.e., the joints respectively between the first and second metatarsals and the first and second proximal phalanges). In addition, at least a portion of third subchamber 41c" and lobe 42g" underlie the first proximal phalanx and first distal phalanx (i.e., the big toe).

Based upon the positions of the various portions of chamber 40" discussed above, the foot may initially compress first subchamber 41a", which is located in the lateral portion of footwear 10' during running. As first subchamber 41a" is compressed, the pressure of the fluid within first are 41a" increases and a portion of the fluid passes through conduit 44a" and into second subchamber 41b". This has the effect of decreasing the compressibility of second subchamber 41b" and assists with inhibiting rolling of the foot from the lateral side to the medial side. As the foot rolls from the lateral side to the medial side, however, second subchamber 41b" is compressed and the fluid within second subchamber 41b" passes through conduit 44b" and increases the pressure of the fluid within third subchamber 41c". This has the effect of decreasing the compressibility of third subchamber 41c" and assists with pushing off, which occurs as the foot rolls forward and as the foot is leaving the ground.

Figure 28:
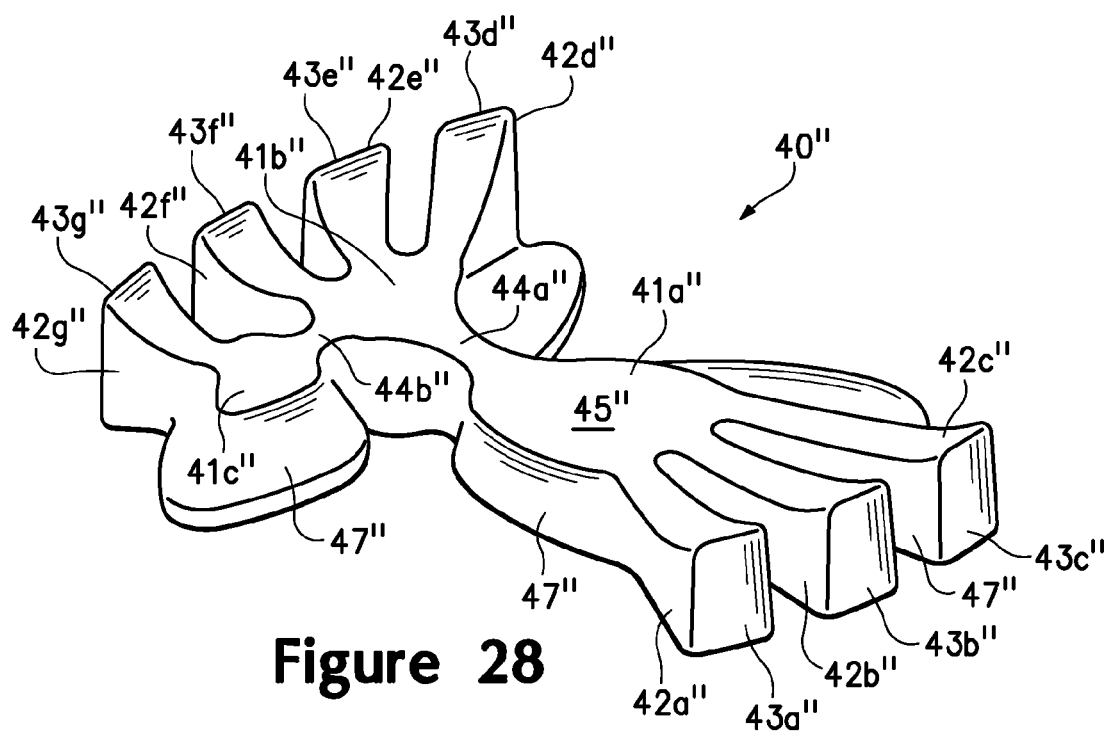
FIG. 28 is a perspective view of the third chamber.
Figure 29:
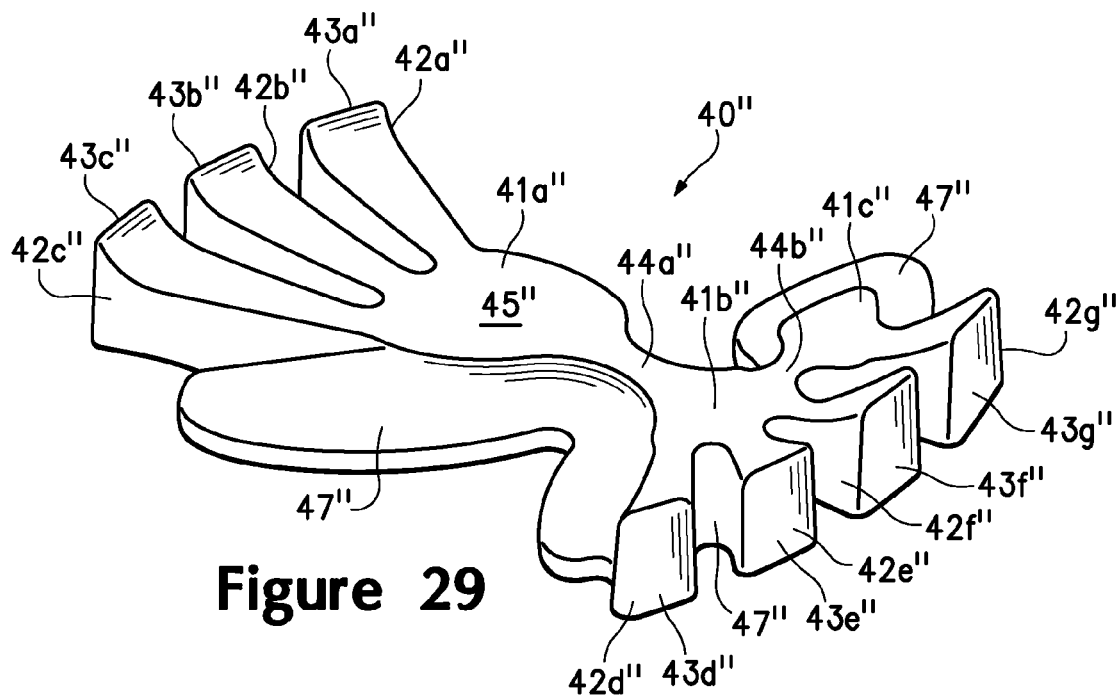
FIG. 29 is another perspective view of the third chamber.
Figure 30:
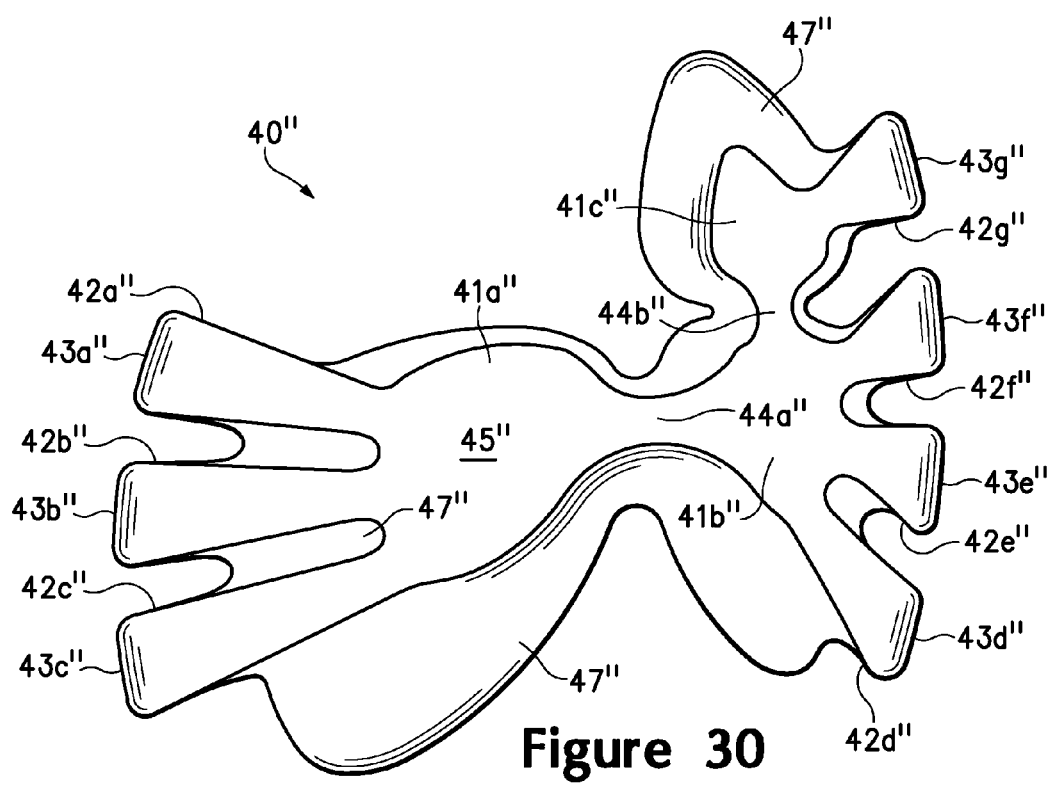
FIG. 30 is a top plan view of the third chamber.
Figure 31:
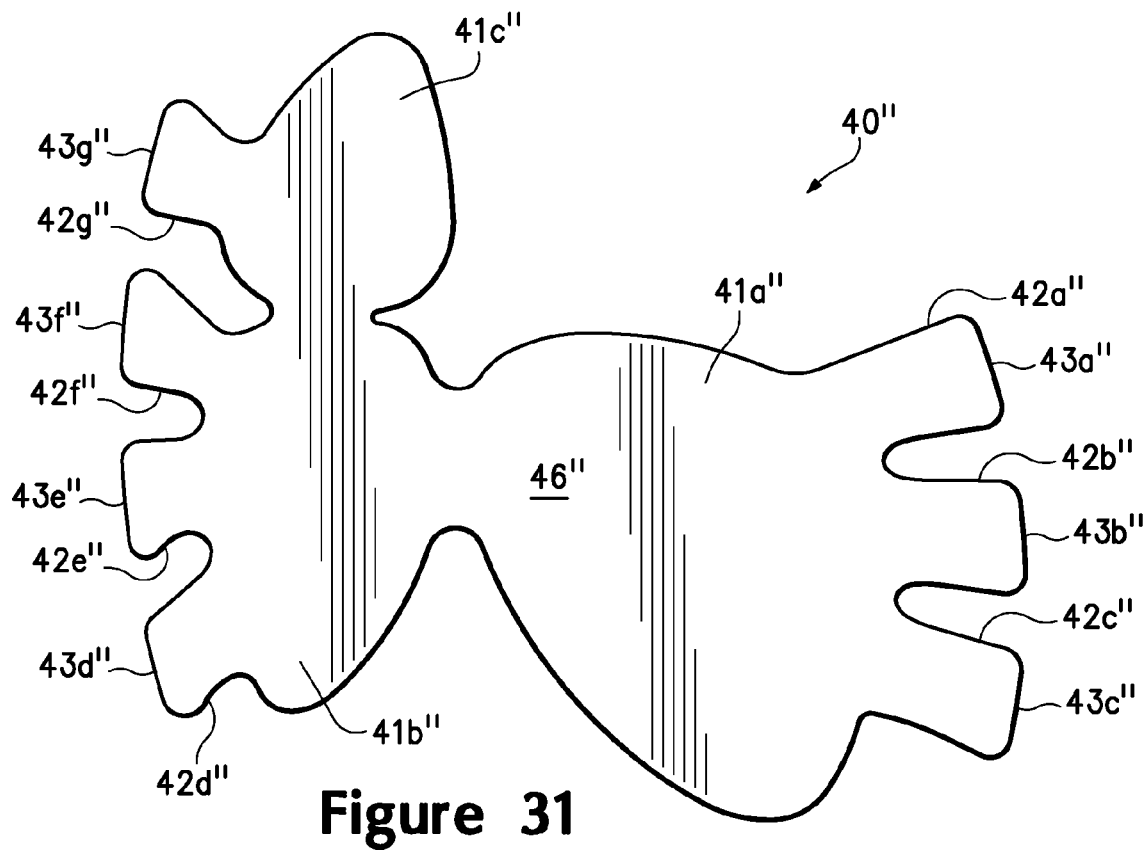
FIG. 31 is a bottom plan view of the third chamber.
Figure 32:
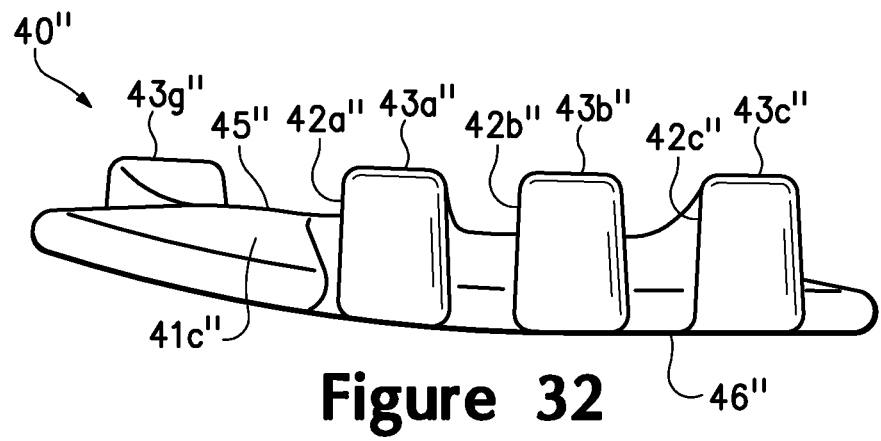
FIGS. 32 and 33 are elevational views of the third chamber.
Figure 33:
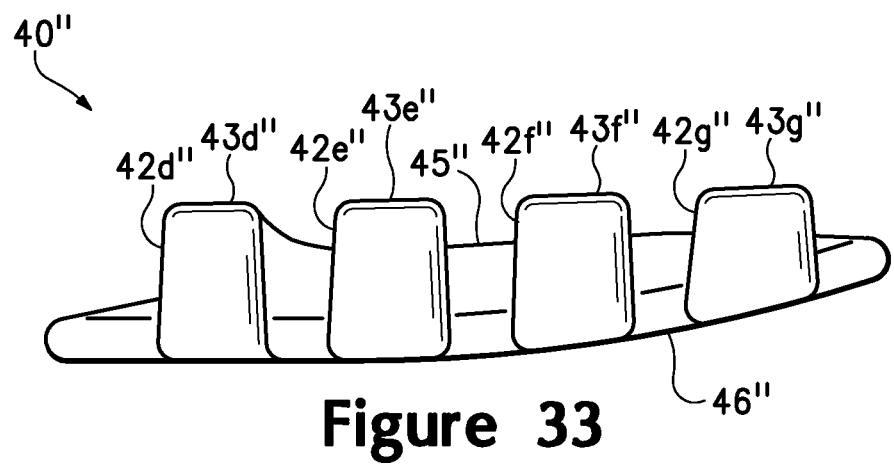

Another factor that affects the compressibility of chamber 40 and roll of the foot relates to the slope of sidewall 47". Referring to FIGS. 28-30, for example, the slope of sidewall 47" associated with first subchamber 41a" is different in forward and rear areas. In the rear area of first subchamber 41a" the slope of sidewall 47" is relatively shallow, whereas the slope of sidewall 47" is greater in the forward area of first subchamber 41a". The differences in slope affect the compressibility of first subchamber 41a" and the degree to which the foot rolls. More particularly, the shallower slope in the rear area of first subchamber 41a" facilitates compression and roll of the foot. As the foot rolls forward and toward the forward area of first subchamber 41a", the greater slope of sidewall 47" inhibits compression of first subchamber 41a" and slows the roll of the foot. That is, areas of first subchamber 41a" with a relatively shallow slope (i.e., the rear area) are more compressible than areas of first subchamber 41a" with a greater slope (i.e., the forward area).

Differences in slope of sidewall 47" are also present in second subchamber 41b" and third subchamber 41c". In second subchamber 41b", sidewall 47" has a relatively shallow slope in areas that are adjacent to first subchamber 41a" and a greater slope in areas adjacent lobes 42d"-42f. As with first subchamber 41a", areas of second subchamber 41b" with a relatively shallow slope are more compressible than areas of second subchamber 41b" with a greater slope. This facilitates roll of the foot toward second subchamber 41b", but limits further roll of the foot toward the medial portion of footwear 10'. Similarly, third subchamber 41c" has a configuration wherein sidewall 47" is relatively steep in areas adjacent to second subchamber 41b", but is more shallow in forward areas of third subchamber 41c", thereby facilitating pushing off.

As with chambers 40 and 40', chamber 40" and its arrangement in the foam material of midsole 31' produces a relatively large deflection for a given load during initial stages of compression when compared to some of the fluid-filled chambers discussed in the Background of the Invention section. As the compression of chamber 40" increases, however, the stiffness of chamber 40" increases in a corresponding manner due to the structure of midsole 31'. This effect is also the result of pressure ramping, the properties of the foam material in midsole 31', and film tensioning. Accordingly, the volume of chamber 40", the number and shape of lobes 42a"-42g", the slope of sidewall 47", the thickness of surfaces 45" and 46", the material utilized to form the exterior of chamber 40", and the position and orientation of chamber 40" within midsole 31' may be varied to modify the cushioning response. In addition, the properties of the foam material, including the amount of foam material and the hardness and thickness, may also be adjusted to modify the cushioning response. By varying these and other parameters, therefore, midsole 31' may be custom tailored to a specific individual or to provide a specific cushioning response during compression.

A variety of materials may be utilized to form chamber 40", including the polymeric materials that are conventionally utilized in forming the outer layers of fluid-filled chambers for footwear, as discussed in the Background of the Invention section. In contrast with a majority of the prior art chamber structures, however, the fluid within chamber 40" is at ambient pressure or at a pressure that is slightly elevated from ambient. Accordingly, the pressure of the fluid within chamber 40" may range from a gauge pressure of zero to over five pounds per square inch. Due to the relatively low pressure within chamber 40", the materials utilized to form first surface 45", second surface 46", and sidewall 47" need not provide the barrier characteristics that operate to retain the relatively high fluid pressures of prior art chambers. Accordingly, a wide range of polymeric materials such as thermoplastic urethane may be utilized to form first surface 45", second surface 46", and sidewall 47", and a variety of fluids such as air may be utilized within chamber 40". Furthermore, the wide range of polymeric materials may be selected based upon the engineering properties of the material, such as the dynamic modulus and loss tangent, rather than the ability of the material to prevent the diffusion of the fluid contained by chamber 40". When formed of thermoplastic polyurethane, first surface 45", second surface 46", and sidewall 47" may have a thickness of approximately 0.04 inches, but the thickness may range, for example, from 0.01 inches to 0.10 inches. Depending upon the materials utilized, thicknesses less than or exceeding this range may be utilized.

The relatively low pressure of the fluid within chamber 40" also provides another difference between chamber 40" and prior art chambers. The relatively high pressure in prior art chambers often requires the formation of internal connections between the polymer layers to prevent the chamber from expanding outward to a significant degree. That is, internal connections were utilized in prior art chambers to control overall thickness of the chambers. In contrast, chamber 40" does not have internal connections between first surface 45" and second surface 46".

Fourth Chamber

Figure 35:
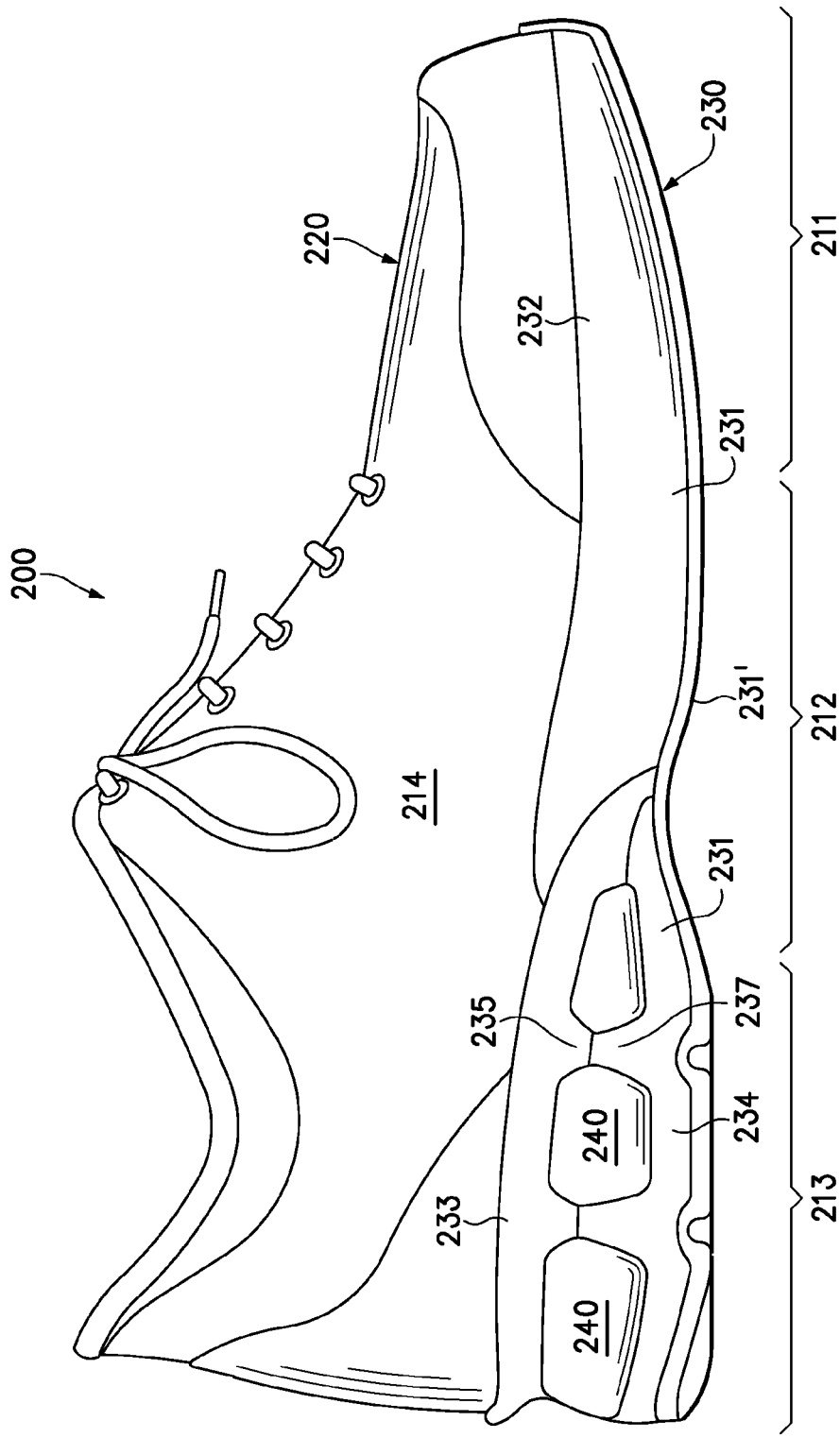
FIG. 35 is a lateral side elevational view of yet another article of footwear having a sole structure that incorporates a fourth chamber in accordance with the present invention.
Figure 36:
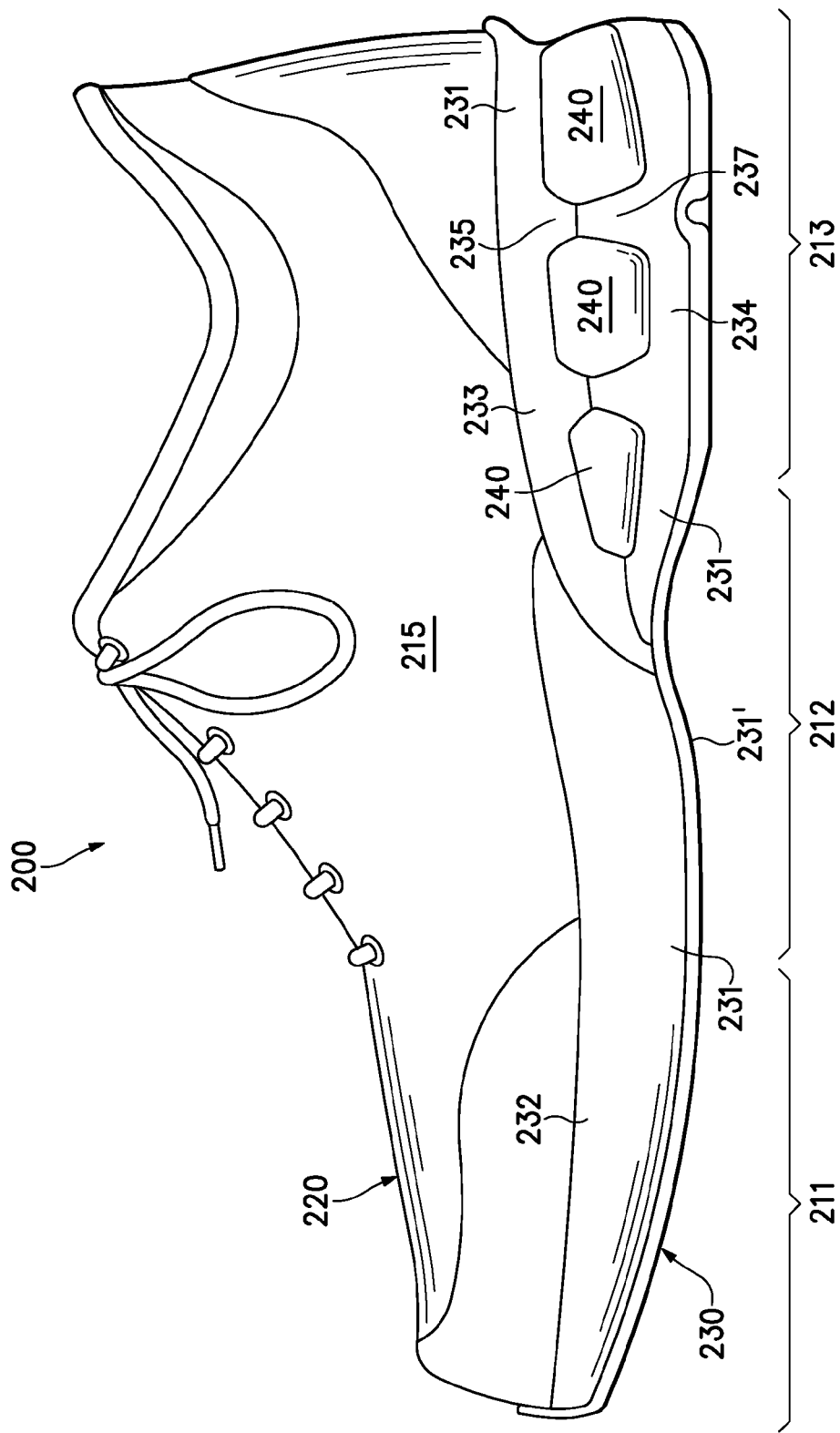
FIG. 36 is a medial side elevational view of the article of footwear depicted in FIG. 35.
Figure 37:
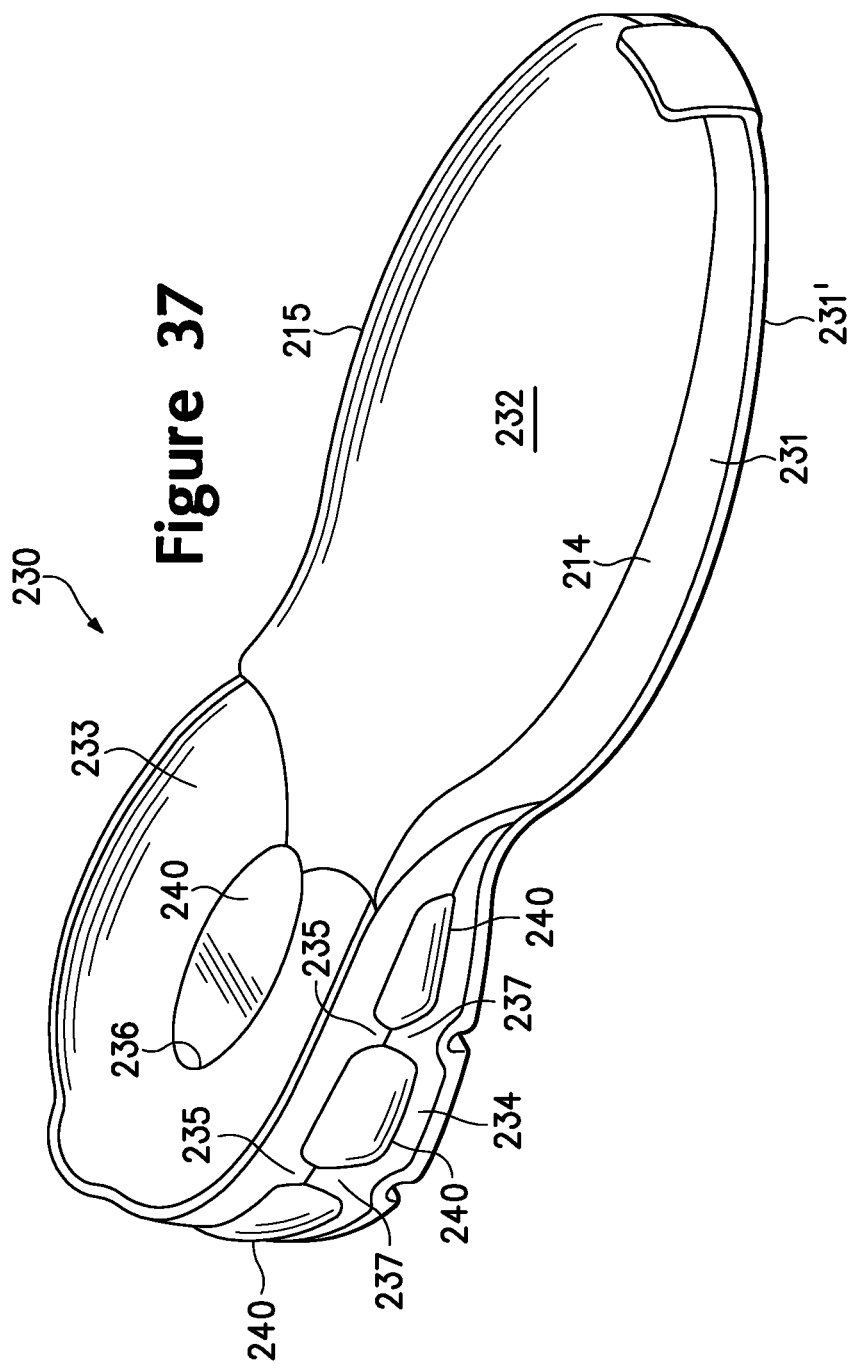
FIG. 37 is a perspective view of the sole structure.
Figure 38:
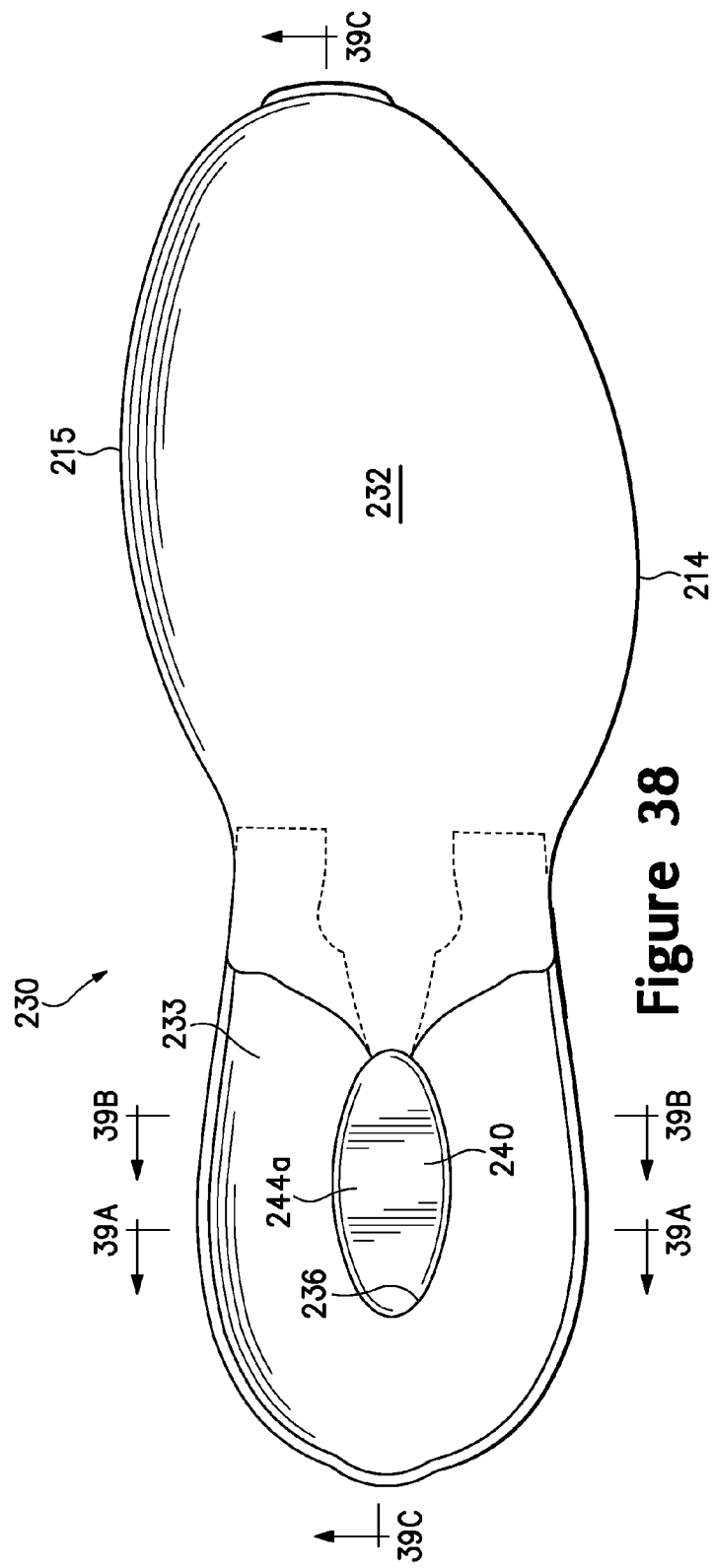
FIG. 38 is a top plan view of the sole structure.
Figure 40:
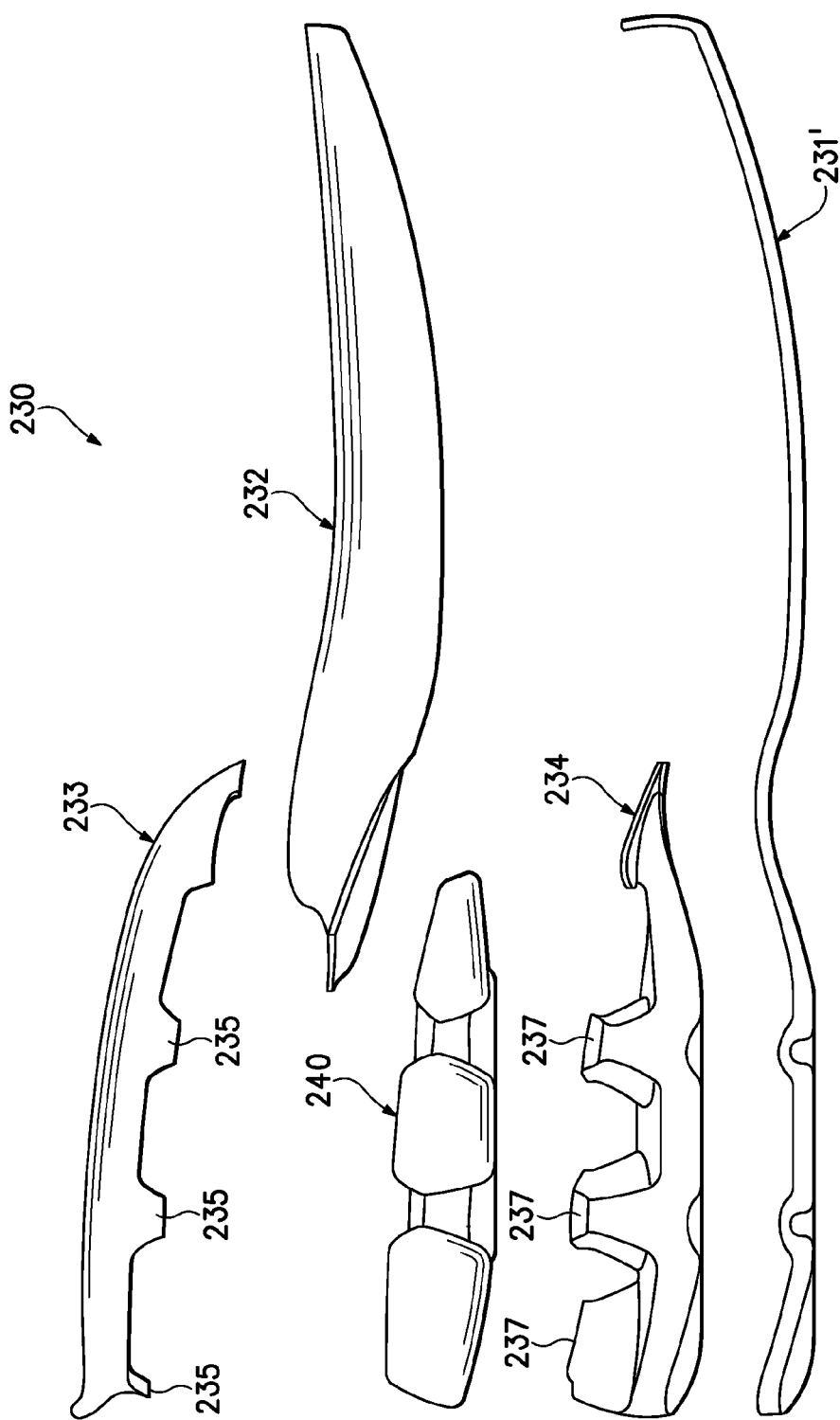
FIG. 40 is an exploded lateral side elevational view of the sole structure.
Figure 41:
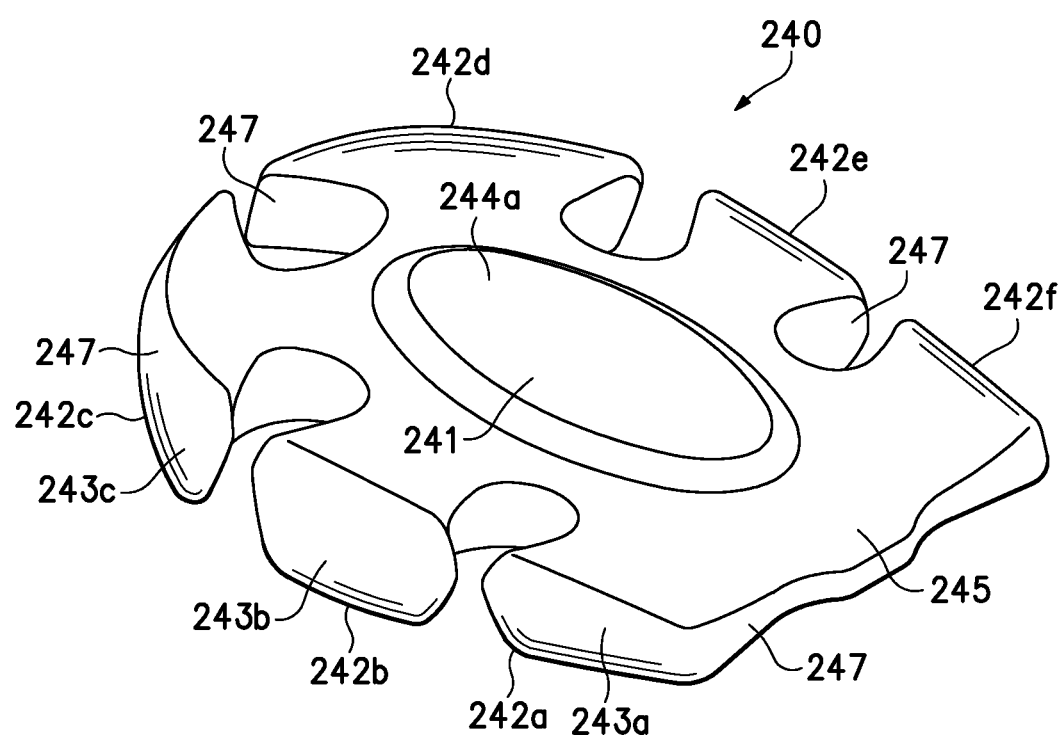
FIG. 41 is a perspective view of the fourth chamber.
Figure 42:
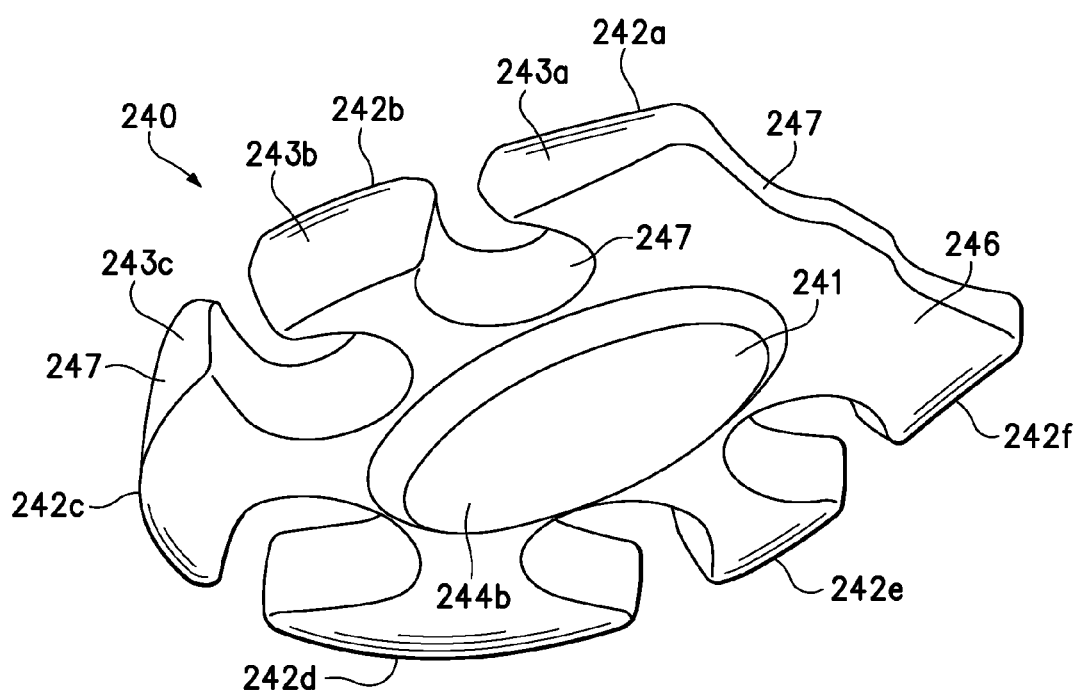
FIG. 42 is another perspective view of the fourth chamber.
Figure 43:
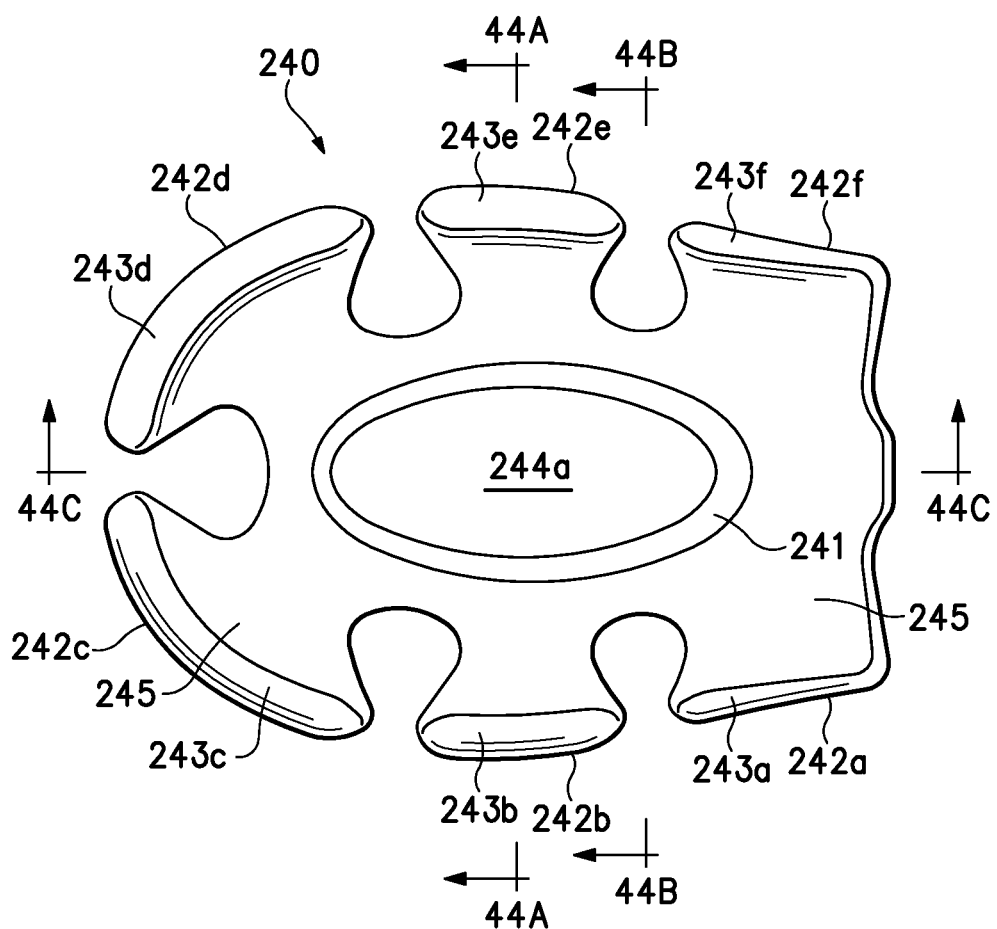
FIG. 43 is a top plan view of the fourth chamber.
Figure 44A:
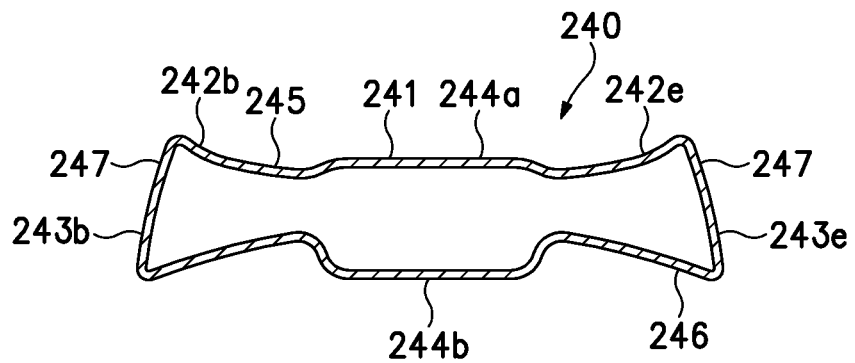
FIGS. 44A-44C are cross-sectional views of the fourth chamber, as defined by section lines 44A-44C in FIG. 42.
Figure 44B:
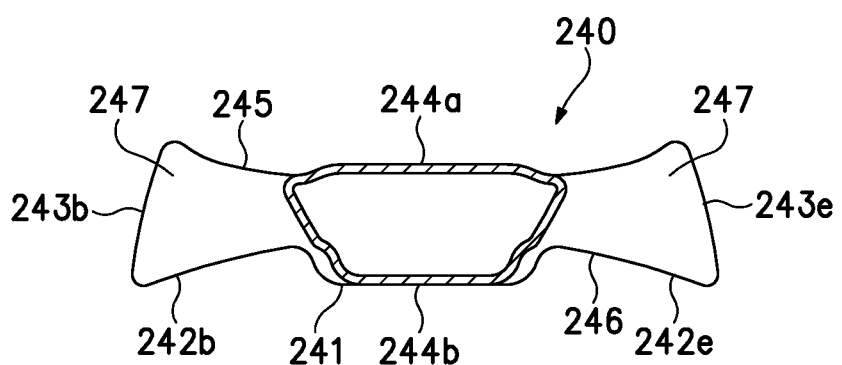
Figure 44C:
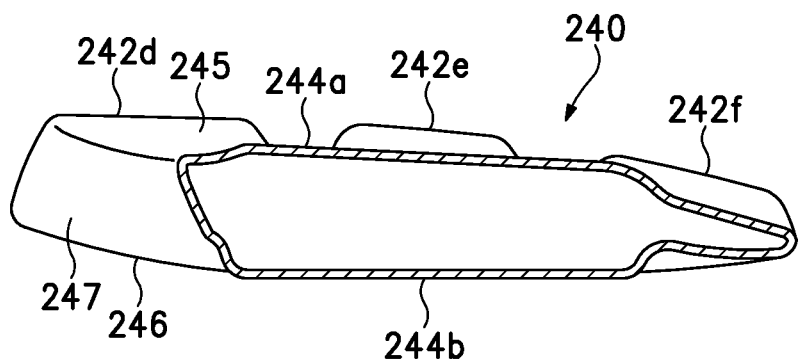
Figure 45:
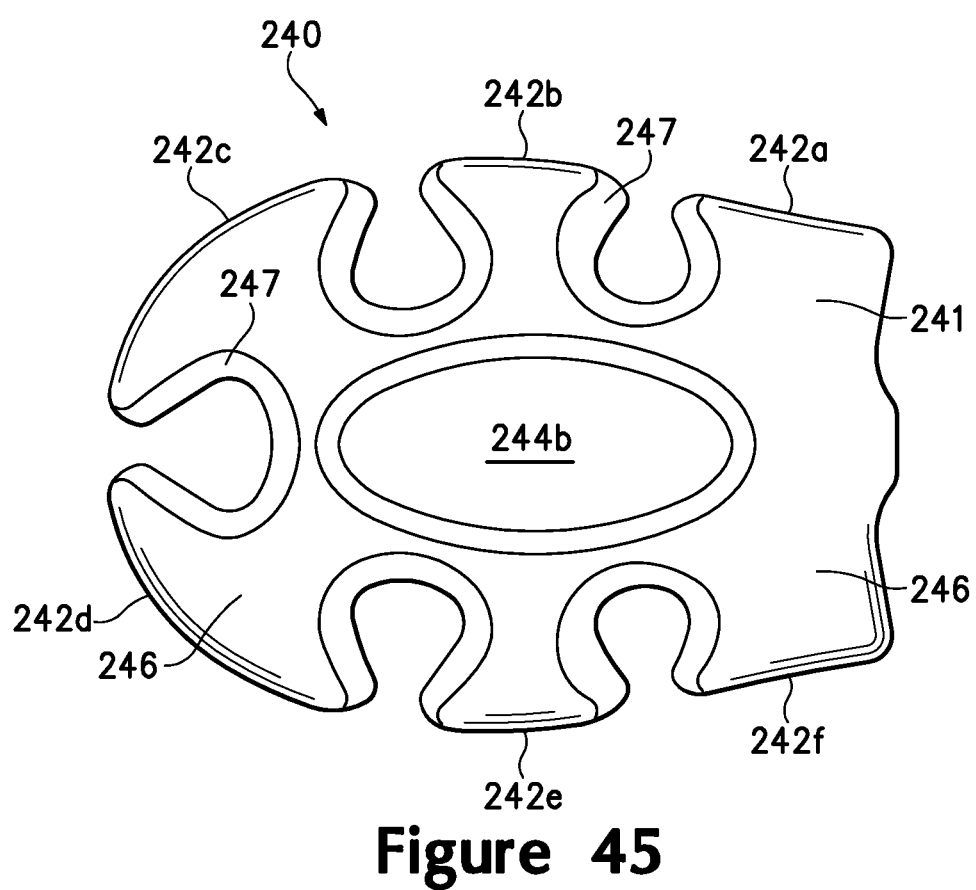
FIG. 45 is a bottom plan view of the fourth chamber.

Another article of footwear 200 is depicted in FIGS. 35 and 36 as having an upper 220 and a sole structure 230. For reference purposes, footwear 200 may be divided into three general regions: a forefoot region 211, a midfoot region 212, and a heel region 213, as depicted in FIGS. 35 and 36. Footwear 200 also includes a lateral side 214 and an opposite medial side 215. Forefoot region 211 generally includes portions of footwear 200 corresponding with the toes and the joints connecting the metatarsals with the phalanges. Midfoot region 212 generally includes portions of footwear 200 corresponding with the arch area of the foot, and heel region 213 corresponds with rear portions of the foot, including the calcaneus bone. Lateral side 214 and medial side 215 extend through each of regions 211-213 and correspond with opposite sides of footwear 200. Regions 211-213 and sides 214-215 are not intended to demarcate precise areas of footwear 200. Rather, regions 211-213 and sides 214-215 are intended to represent general areas of footwear 200 to aid in the following discussion. In addition to footwear 200 generally, regions 211-213 and sides 214-215 may also be applied to upper 220, sole structure 230, and individual elements thereof.

Upper 220 has a substantially conventional configuration and includes a plurality elements, such as textiles, foam, and leather materials, that are stitched or adhesively bonded together to form an interior void for securely and comfortably receiving the foot. In addition to the configuration depicted in the figures, upper 220 may have a variety of other conventional or non-conventional configurations within the scope of the invention. That is, the specific configuration of upper 220 may vary considerably. Sole structure 230, which is depicted individually in FIGS. 37-40, is positioned below upper 220 and includes two primary elements, a midsole 231 and an outsole 231'. Midsole 231 is secured to a lower surface of upper 220 through stitching or adhesive bonding, for example, and operates to attenuate forces as sole structure 230 contacts the ground. That is, midsole 231 is structured to provide the foot with cushioning during walking or running. Midsole 231 may also control foot motions, such as pronation, during walking and running. Outsole 231' is secured to a lower surface of midsole 231 and is formed of a durable, wear-resistant material that engages the ground and imparts traction. In addition, sole structure 230 may include an insole (not depicted), which is a thin cushioning member located within the void in upper 220 and adjacent to a plantar (i.e., lower) surface of the foot to enhance the comfort of footwear 200.

Midsole 231 includes a forward element 232, an upper heel element 233, a lower heel element 234, and a chamber 240 positioned between heel elements 233 and 234. Forward element 232 extends through each of regions 211 and 212 and is primarily formed of a polymer foam material, such as polyurethane or ethylvinylacetate, but may also be formed of other materials. The specific configuration of forward element 232 may vary significantly to include a variety of dimensions (e.g., length, width, thickness) and material properties (e.g., foam type and density). Forward element 232 may also encapsulate a fluid-filled chamber, such as chamber 40" or a variety of other conventional or non-conventional chambers. Although forward element 232 is depicted as extending between upper 220 and outsole 231', other elements (e.g., plates or moderators) may be utilized in conjunction with forward element 232.

Heel elements 233 and 234 are primarily located within heel region 213 and cooperatively shaped to receive chamber 240 and secure chamber 240 within sole structure 230. Upper heel element 233 is shaped to conform with the contours of an upper area of chamber 240 and extends over chamber 240 and along a portion of a side area of chamber 240. More particularly, upper heel element 233 includes five downwardly-extending projections 235 and defines an opening 236 that interfaces with portions of chamber 240, as described in greater detail below. Lower heel element 234 is also shaped to conform with the contours of a lower area of chamber 240 and extends under chamber 240 and along another portion of the side area of chamber 240. More particularly, lower heel element 234 includes five upwardly-extending projections 237 that extend into spaces in chamber 240 and contact ends of projections 235. The lengths of projections 235 are partially dependent upon the lengths of projections 237 and may vary. In some configurations of footwear 200, projections 235 and 237 may be shorter or longer than the configuration depicted in the figures. Together, however, projections 235 and 237 extend vertically along the side area of chamber 240. In other configurations, projections 235 and 237 may be absent such that substantially all of the side area of chamber 240 is exposed. The specific configurations of heel elements 233 and 234 will be more apparent with reference to FIGS. 38-40 and the following discussion.

Heel elements 233 and 234 may be formed from a variety of materials, including both foamed and non-foamed polymer materials. In one configuration, upper heel element 233 may be formed from a non-foamed polymer material that distributes downward forces from the foot to chamber 240, and lower heel element 233 may be formed from a foamed polymer material (e.g., polyurethane or ethylvinylacetate foam) that provides additional force attenuation. Examples of suitable non-foamed polymer materials includes polyester, thermoset urethane, thermoplastic urethane, various nylon formulations, rubber, or blends of these materials. In addition, upper heel element 233 may be formed from a high flex modulus polyether block amide, such as PEBAX, which is manufactured by the Atofina Company. Another suitable material for upper heel element 233 is a polybutylene terephthalate, such as HYTREL, which is manufactured by E.I. duPont de Nemours and Company. Composite materials may also be formed by incorporating glass fibers or carbon fibers, for example, into the polymer materials discussed above in order to enhance the strength of upper heel element 233.

In other configurations of sole structure 230, heel elements 233 and 234 may both be formed from a foamed polymer material with either the same or different densities. Midsole 231 may also be formed as a unitary (i.e., one piece) element that defines a void for receiving chamber 240. That is, rather than forming midsole 231 from three elements 232-234, a single midsole element may be utilized instead, with chamber 240 being at least partially encapsulated therein. Alternately, forward element 232 and lower heel element 234 may be formed as a unitary element. Accordingly, the specific configuration and materials selected for midsole 231 may vary significantly.

Chamber 240 has a configuration of a fluid-filled bladder with a central area 241 surrounded by six lobes 242a-242f, as depicted in FIGS. 41-45. Suitable materials for chamber 240 and the fluid within chamber 240 include any of the materials and fluids discussed above for prior art chambers or chambers 40, 40', and 40". Lobes 242a-242f extend radially outward from central area 241 and respectively have distal ends 243a-243f. Accordingly, lobes 242a-242f extend outward in different directions from a periphery of central area 241, and lobes 242a-242f define various spaces between each other. Central area 241 and lobes 242a-242f are formed from a first surface 245, an opposite second surface 246, and a sidewall 247 of chamber 240. Accordingly, surfaces 245 and 246 extend over opposite sides of each of central area 241 and lobes 242a-242f. First surface 245 has a generally concave configuration, as depicted in the cross-sections of FIGS. 44A-44C, and defines an elliptical protrusion 244a that extends outward from central area 241. Similarly, at least a periphery of second surface 246 has a generally concave configuration and defines an elliptical protrusion 244b that also extends outward from central area 241. Whereas protrusion 244a extends in an upward direction in footwear 200, protrusion 244b extends in a downward direction.

When chamber 240 is incorporated into footwear 200, protrusion 244a extends upward from first surface 245 and into opening 236 of upper heel element 233. That is, at least a portion of opening 236 has an elliptical shape that receives protrusion 244a when chamber 240 is incorporated into footwear 200. The thickness of upper heel element 233 and the height of protrusion 244a may be selected such that an upper surface of protrusion 244a is flush with an upper surface of upper heel element 233. A foot located within the void in upper 220 may be supported, therefore, by each of protrusion 244a and upper heel element 233. In some configurations, however, the upper surface of protrusion 244a may be above or below the upper surface of upper heel element 233. Although the foot may be supported by each of protrusion 244a and upper heel element 233, an insole or material elements from upper 220 may extend between the foot and midsole 231.

Distal ends 243a-243f extend to a sidewall of midsole 231 and are exposed at the sidewall when chamber 240 is incorporated into footwear 200. Accordingly, distal ends 243a-243f are visible from an exterior of footwear 200. In comparison with the dimensions of lobes 242a-242f adjacent to central area 241, distal ends 243a-243f generally have greater height and width dimensions. That is, lobes 242a-242f flare or otherwise expand outward adjacent to distal ends 243a-243f. When exposed at the sidewall of midsole 231, the greater dimensions increase the apparent size of chamber 240. That is, the relatively large size of distal ends 243a-243f provides an impression that chamber 240 has relatively large overall dimensions when incorporated into footwear 200.

Projections 235 and 237 extend into the spaces formed between lobes 242a-242f when chamber 240 is incorporated into footwear 200. More particularly, projections 235 extend downward from upper heel element 233 and into an upper portion of the spaces, and projections 237 extend upward from lower heel element 234 and into a lower portion of the spaces. End portions of projections 235 and 237 contact each other in the spaces and may be joined to each other. As depicted, projections 237 of lower heel element 234 extend further into the spaces than projections 235 of upper heel element 233. In a configuration wherein upper heel element 233 is formed from a non-foamed polymer material and lower heel element 234 is formed from a foamed polymer material, this configuration effectively forms foam columns that extend into the spaces between lobes 242a-242f. That is, forming lower heel element 234 from a foamed polymer material positions columns of a foam material within the spaces. Whereas a center of the foot is primarily supported by chamber 240, a periphery is at least partially supported by the polymer foam material (i.e., projections 237) of lower heel element 234.

The size and locations of projections 237 are determined by the configurations of lobes 242a-242f and the spaces between lobes 242a-242f. As discussed above, lobes 242a-242f flare outward adjacent to distal ends 243a-243f. In this configuration, a majority of the spaces between lobes 242a-242f are shifted inward from the periphery of chamber 240. A majority of the foam columns formed by projections 237 are also, therefore, shifted inward from the periphery of chamber 240. As a comparison, the spaces between lobes 42a'-42g' of chamber 40' flare outward, thereby placing a majority of the polymer foam material of midsole 31' adjacent to the periphery of midsole 31'.

Chamber 240 and its arrangement with midsole 231 produces a relatively large deflection for a given load during initial stages of compression when compared to the fluid-filled chambers discussed in the Background of the Invention section above. As the compression of chamber 240 increases, however, the stiffness of chamber 240 increases in a corresponding manner due to the structure of chamber 240 and the manner in which chamber 240 is incorporated into midsole 231. As with chambers 40 and 40' above, three phenomena operate simultaneously to produce this effect: (a) pressure ramping, (b) the properties of the foam material in midsole 231, and (c) film tensioning. Each of these phenomena will be described in greater detail below.

Pressure ramping is the increase in pressure within chamber 240 that occurs as a result of compressing chamber 240. In effect, chamber 240 has an initial pressure and initial volume when not being compressed within midsole 231. As midsole 231 is compressed, however, the effective volume of chamber 240 decreases, thereby increasing the pressure of the fluid within chamber 240. The increase in pressure operates to provide a portion of the cushioning response of midsole 231. That is, as the pressure increases, the stiffness of sole structure 230 increases in a corresponding manner. The volume of the fluid within chamber 240 has an effect upon pressure ramping. In general, the pressure within chamber 240 will increase more quickly for a given compressive force when chamber 240 has a lesser fluid volume, and the pressure within chamber 240 will increase more slowly for a similar compressive force when chamber 240 has a greater fluid volume. Both first surface 245 and second surface 246 have a concave configuration that effectively decreases the fluid volume of chamber 240. Accordingly, the pressure of chamber 240 will increase more quickly when a compressive force is applied than in a similar chamber that does not have concave surfaces. The degree of concavity in surfaces 245 and 246 may be used, therefore, to modify the degree of pressure increase for a given compressive force.

The properties of the foam material also affect the cushioning response of midsole 231. With regard to the configuration discussed above, the foam material in midsole 231 is concentrated at an area that is spaced inward from distal ends 243a-243f. A change in the number of lobes 242a-242f may be utilized, for example, to decrease the ratio of air to foam in peripheral portions of midsole 231. A change in the locations and dimensions of the spaces between lobes 242a-242f may also be utilized to affect the ratio of air to foam in peripheral portions of midsole 231. These changes in midsole 231 may be utilized to increase the overall stiffness of midsole 231 during compression. Accordingly, the geometry of the foam material and the corresponding geometry of chamber 240 have an effect upon the cushioning response.

Finally, the concept of film tensioning has an effect upon the cushioning response. This effect is best understood when compared to pressurized prior art chambers. In the prior art chambers, the pressure within the chambers places the outer layers in tension. As the prior art chambers are compressed, however, the tension in the outer layers is relieved or lessened. Accordingly, compression of the prior art chambers operates to lessen the tension in the outer layers. In contrast with the pressurized prior art chambers, the tension in first surface 245, which is generally concave, increases in response to compression due to further bending or stretching of first surface 245. This increase in tension contributes to the cushioning response discussed above.

Pressure ramping, the properties of the foam material, and film tensioning operate together to provide the cushioning response of sole structure 230. The specific effect that pressure ramping, the properties of the foam material, and film tensioning have upon the cushioning response varies based upon location with respect to chamber 240. At perimeter portions of chamber 240, which corresponds with the locations of distal ends 243a-243f, the properties of chamber 240 are largely responsible for determining the degree of stiffness in midsole 231. In areas corresponding with the spaces between lobes 242a-242f (i.e., an area spaced inward from the perimeter portions of chamber 240), the properties of the foam material of lower heel element 234 provides reduced compliance and, therefore, increases the corresponding stiffness. That is, the properties of chamber 240 and the foam material of lower heel element 234 cooperatively operate to determine the degree of stiffness in portions of midsole 231. As the location tends toward central area 241, the ratio of chamber 240 to the foam material increases to allow a relatively large deflection, and the dominant phenomena that attenuate forces and absorb energy are film tensioning and pressure ramping.

Based upon the considerations of pressure ramping, the properties of the foam material, and film tensioning, the stiffness of midsole 231 is modifiable to provide a desired degree of force attenuation. For example, the volume of chamber 240, the number and shape of lobes 242a-242f, the slope of sidewall 247, the thickness of surfaces 245 and 246, the material utilized to form the exterior of chamber 240, and the position and orientation of chamber 240 within midsole 231 may be varied to modify the cushioning response. In addition, the properties of the foam material, including the hardness and thickness, may also be adjusted to modify the cushioning response. By varying these and other parameters, therefore, midsole 231 may be custom tailored to a specific individual or to provide a specific cushioning response during compression.

Pressure ramping, the properties of the foam material, and film tensioning provide examples of characteristics that affect the cushioning response of midsole 231. Other factors may also have an effect upon the cushioning response. For example, the slope of sidewall 247 has an effect upon the stiffness of chamber 240. Whereas distal ends 243a-243f have a more vertical orientation, the portions of sidewall 247 within the spaces between lobes 242a-242f slope between first surface 245 and second surface 246. When compressed, the sloping surface collapses smoothly, whereas more vertical surfaces buckle and impart greater resistance to compression. Accordingly, the configuration of sidewall 247 ensures that interior portions of chamber 247 collapse more smoothly than peripheral portions.

As the size of footwear 200 increases, the overall size of chamber 240 and the mass of the individual wearing footwear 200 also increases. If, however, all dimensions of chamber 240 increase proportionally, the cushioning response of midsole 231 will vary to provide less stiffness for larger versions of footwear 200 and more stiffness for smaller versions of footwear 200. That is, merely proportionally changing the dimensions of chamber 240 does not provide a comparable cushioning response for footwear 200 as the size of footwear 200 changes. In order to provide a comparable cushioning response for footwear 200 as the size of footwear 200 changes, various dimensions of chamber 240 change at different rates as the overall dimensions of chamber 240 change, as discussed below.

Figure 46:
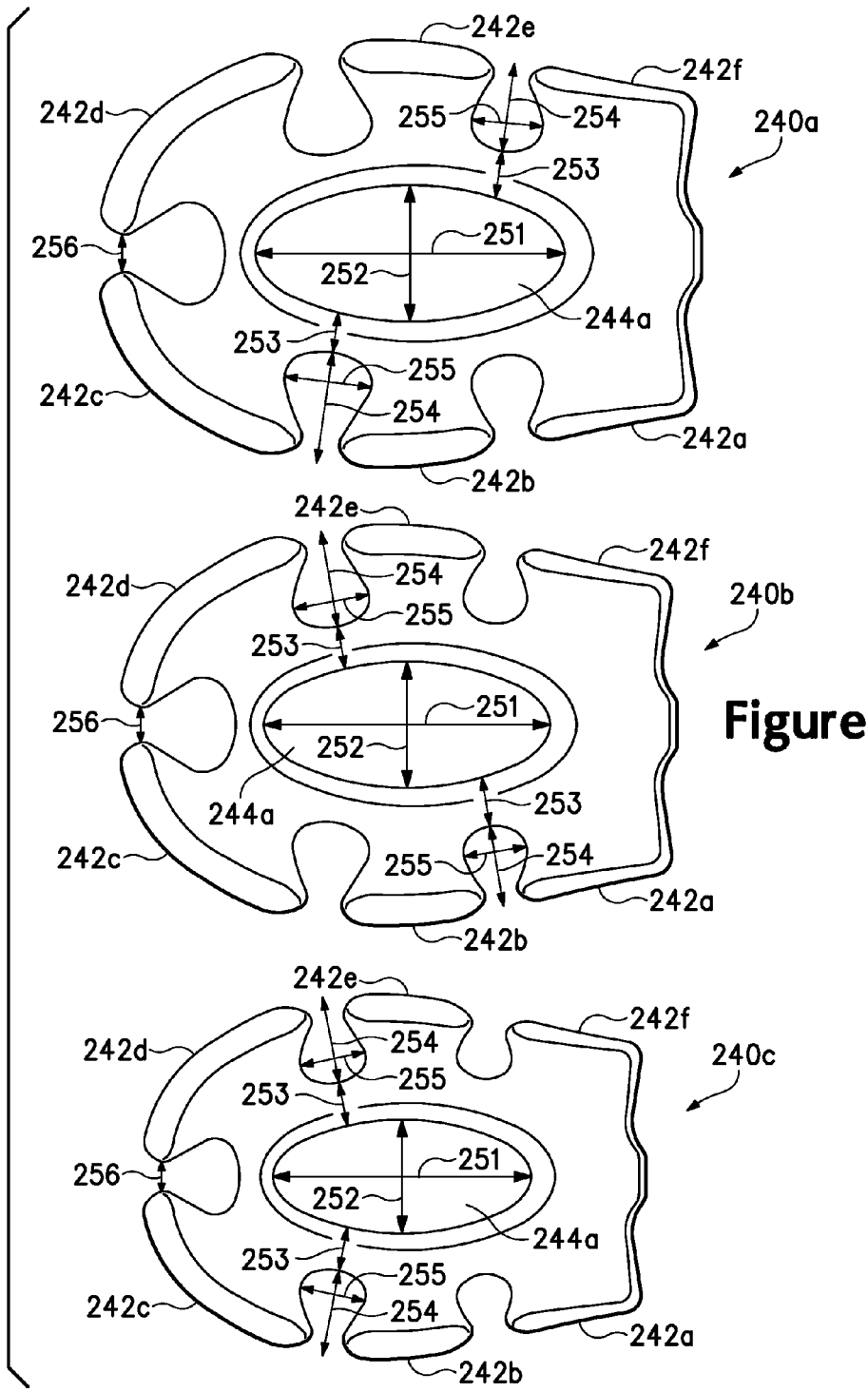
FIG. 46 depicts top plan views of three configurations of the fourth chamber.

With reference to FIG. 46, three chambers 240a-240c are depicted. Chamber 240a is dimensioned for a version of footwear 200 suitable for a men's size 12.5, chamber 240b is dimensioned for a version of footwear 200 suitable for a men's size 9.5, and chamber 240c is dimensioned for a version of footwear 200 suitable for a men's size 6.5. Each of chambers 240a-240c are depicted as having the following: (a) a dimension 251 that represents a length of protrusion 244a, (b) a dimension 252 that represents a width of protrusion 244a, (c) various dimensions 253 that represent a distance between protrusion 244a and the spaces between lobes 242a-242f, (d) various dimensions 254 that represent a maximum depth of the spaces between lobes 242a-242f, (e) various dimensions 255 that represent a maximum width of the spaces between lobes 242a-242f, and (f) a dimension 256 that represents a distance between lobes 242c and 242d.

In comparing dimensions 251 of chambers 240a-240c, the length of protrusion 244a changes in proportion to the change in overall length of chambers 240a-240c. That is, dimension 251 changes in direct proportion to the change in overall length of chambers 240a-240c. If, for example, a difference in overall length between chambers 240c and 240b is 30 percent, then the difference in dimensions 251 for chambers 240c and 240b would also be 30 percent. Similarly, if a difference in overall length between chambers 240b and 240a is 30 percent, then the difference in dimensions 251 for chambers 240b and 240a would also be 30 percent.

Whereas lengths of protrusions 244a (i.e., dimensions 251) change in proportion to the change in overall length, the widths of protrusions 244a (i.e., dimensions 252) change at one-third the proportional change in overall width. If, for example, a difference in overall width between chambers 240c and 240b is 30 percent, then the difference in dimensions 252 for chambers 240c and 240b would be 10 percent (i.e., one-third of 30 percent). Similarly, if a difference in overall width between chambers 240b and 240a is 30 percent, then the difference in dimensions 252 for chambers 240b and 240a would also be 10 percent. Accordingly, protrusion 244a of chamber 240a is more eccentric (i.e., elongate) than protrusions 244b and 240c.

Whereas dimensions 251 and 252 change between chambers 240a-240c, dimension 253 remains substantially constant. That is, the distances between protrusions 244a and the spaces between lobes 242a-242f are substantially the same for each of chambers 240a-240c. Accordingly, if dimension 253 is one centimeter for chamber 240a, then dimension 253 is also one centimeter for each of chambers 240b and 240c. By holding dimension 253 constant and only changing dimensions 252 by one-third the proportional change in overall width, the maximum depth of the spaces between lobes 242a-242f (i.e., dimension 254) increases as the size of chamber 240 increases. Accordingly, dimension 254 is larger for chamber 240b when compared to chamber 240c, and also larger for chamber 240a when compared to chamber 240b.

The change in the maximum width of the spaces between lobes 242a-242f (i.e., dimension 255) partially depends upon the size of footwear 200 that chamber 240 is intended to be used with. For sizes less than size 9.5 (i.e., smaller than chamber 240b), dimension 255 changes in proportion to the overall change in length and width of chamber 240. If, for example, a difference in size between chambers 240c and 240b is 30 percent, then the difference in dimensions 255 for chambers 240c and 240b would also be 30 percent. In contrast, for sizes greater than size 9.5 (i.e., larger than chamber 240b), dimension 255 changes at twice the rate of overall change in length and width of chamber 240. If, for example, a difference in size between chambers 240b and 240a is 30 percent, then the difference in dimensions 255 for chambers 240b and 240a would be 60 percent. Accordingly, the degree of change in dimension 255 primarily depends upon the size of chamber 240.

The distance between most of lobes 242a-242f change in proportion to the overall change in the size of chamber 240. The change in the distance between lobes 242c and 242d (i.e., dimension 256), however, also partially depends upon the size of footwear 200 that chamber 240 is intended to be used with. For sizes less than size 9.5 (i.e., smaller than chamber 240b), dimension 256 changes in proportion to the overall change in length and width of chamber 240. If, for example, a difference in size between chambers 240c and 240b is 30 percent, then the difference in dimensions 256 for chambers 240c and 240b would also be 30 percent. In contrast, for sizes greater than size 9.5 (i.e., larger than chamber 240b), dimension 256 changes at four times the rate of overall change in length and width of chamber 240. If, for example, a difference in size between chambers 240b and 240a is 30 percent, then the difference in dimensions 256 for chambers 240b and 240a would be 120 percent. Accordingly, the change in dimension 256 also depends upon the size of chamber 240.

Based upon the above discussion, different sizes of footwear 200 incorporate chambers 240 with different proportions. Although many features of chamber 240 (e.g., lobes, spaces, protrusions, concave surfaces, sloped sidewall) are present in chambers 240 for different sizes of footwear 200, the proportions of various features of chambers 240 may vary. This system by which dimensions 251-256 change as the size of chamber 240 changes has the effect of providing a comparable cushioning response for different sizes of footwear 200. Accordingly, individuals wearing footwear 200 may experience a comparable cushioning response, regardless of the size of footwear 200.

Figure 47:
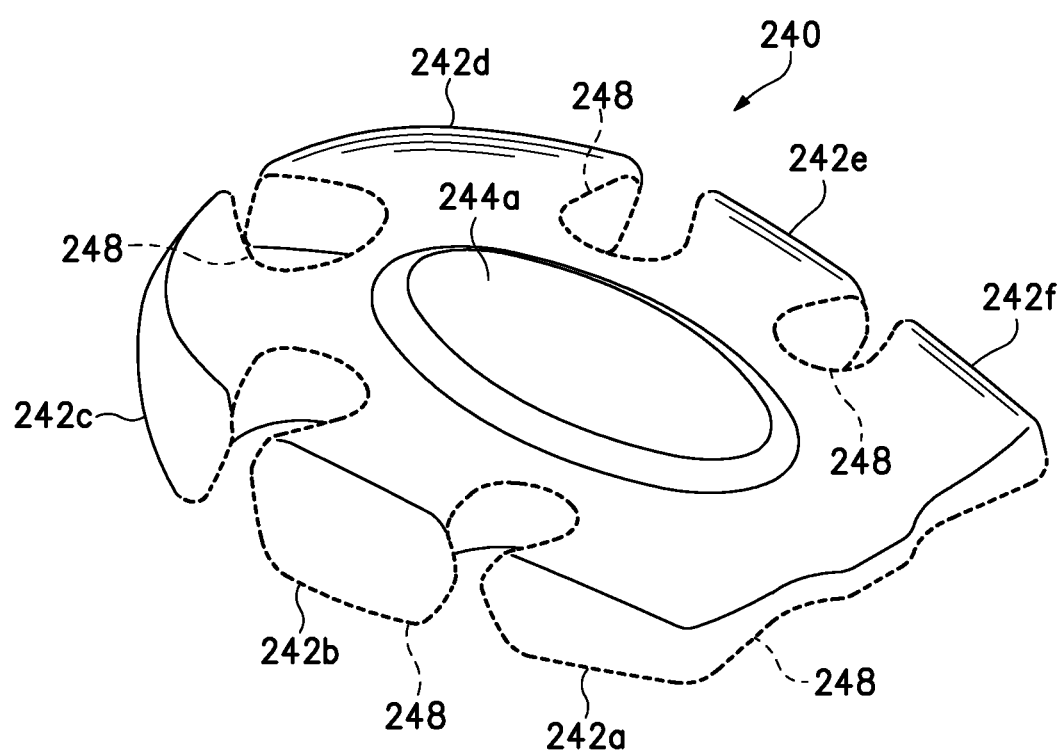
FIG. 47 is a perspective view of the fourth chamber that highlights a position of a parting line.

Chamber 240 may be formed using a mold that is structurally similar to mold 100, which is discussed above in relation to chamber 40'. The mold that is utilized to form chamber 240 may, therefore, include a bending zone and a forming zone that have different functions. The bending zone is responsible for bending a parison prior to bonding. The forming zone includes a central area, lobe areas, and sidewall areas that respectively form central area 241, lobes 242a-242f, and distal ends 243a-243f. The forming zone is responsible, therefore, for imparting the actual shape of chamber 240 to the parison. An advantage of bending sides of the parison relates to a position of a parting line 248 in chamber 240, as depicted in FIG. 47. Parting line 248 corresponds with the area where the opposite mold portions meet adjacent to bladder 240. With reference to FIG. 47, parting line 248 does not merely extend vertically across sidewall 247. Instead, parting line 248 follows a non-linear course having a wave-like pattern that extends around distal ends 243a-243f. More specifically, parting line 248 extends horizontally between sidewall 247 and first surface 245 at upper ends of distal ends 243a-243f. Parting line 248 then extends vertically across sidewall 247 along the sides of distal ends 243a-243f. Accordingly, at least a portion of parting line 247 extends between first surface 245 and second surface 246. Parting line 248 also extends horizontally between sidewall 247 and second surface 246 in areas between lobes 242a-242f. When incorporated into an article of footwear, as depicted in FIGS. 35 and 36, parting line 248 will generally not be visible or will at least be in a portion of chamber 240 that does not significantly obstruct visibility through distal ends 243a-243f. That is, parting line 248 may be positioned so to extend adjacent to distal ends 243a-243f. Parting line 248 is, therefore, not centered in sidewall 247.

In forming chamber 240 with a blow molding process, air may be utilized to induce sides of the parison to contact surfaces of the mold. In order to seal chamber 240, a pillow blowing process may be utilized, wherein a tube that is used to introduce air during the blow molding process is sealed to trap the air within chamber 240. Accordingly, chamber 240 may be sealed by closing the tube that introduces air in the blow molding process, and no separate inflation tube or inflation process is necessary.

Conclusion

Figure 48:
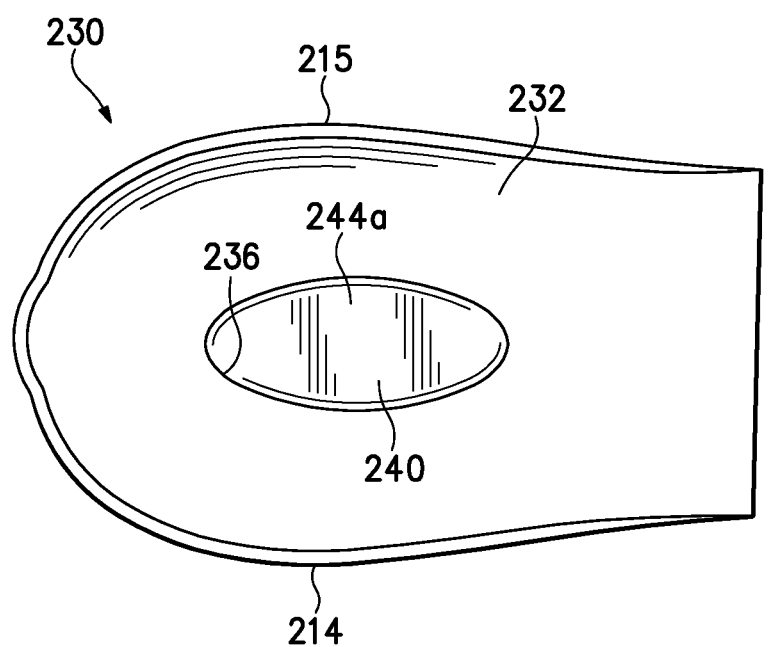
FIG. 48 is a top plan view of a portion of the sole structure and depicting an alternate configuration.
Figure 49A:
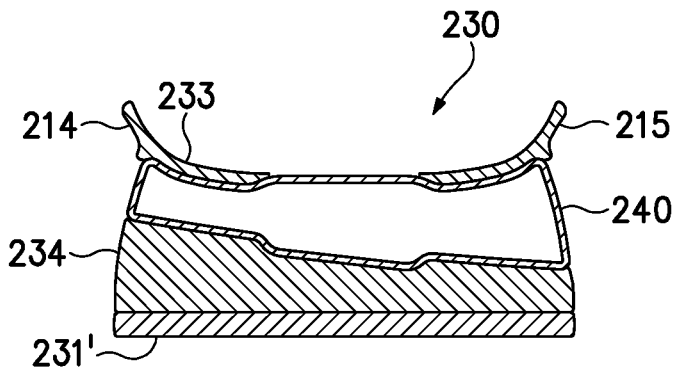
FIGS. 49A-49C are cross-sectional views corresponding with FIG. 39A and depicting alternate configurations of the sole structure.
Figure 49B:
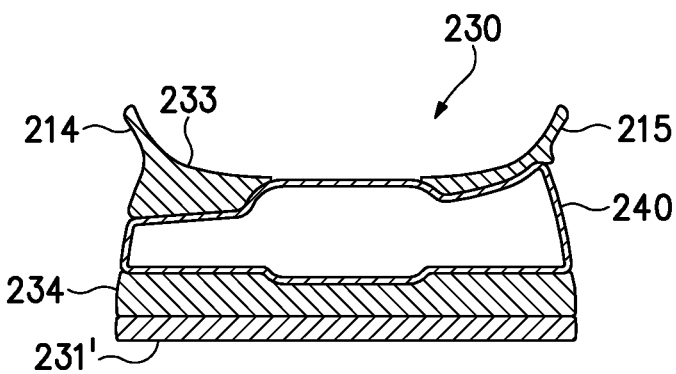
Figure 49C:
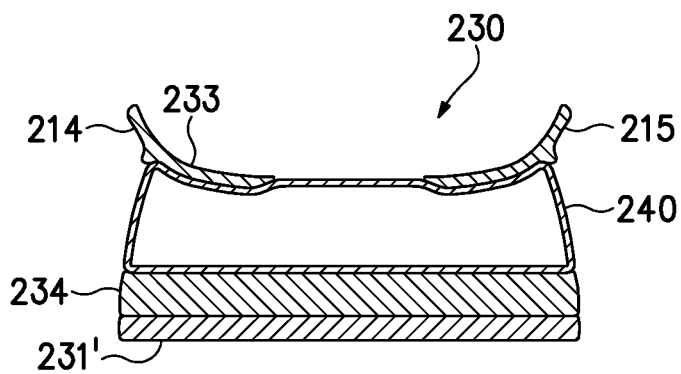
Figure 50A:
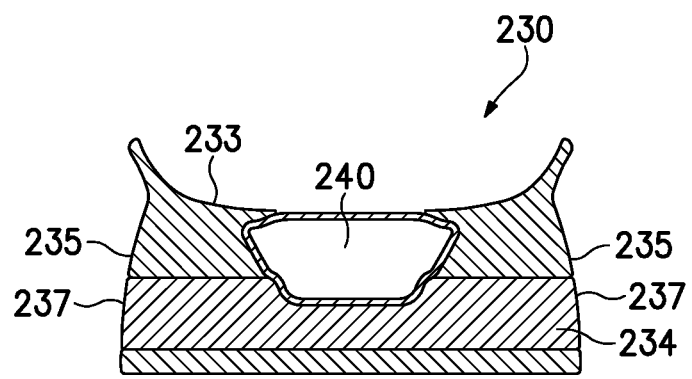
FIGS. 50A and 50B are cross-sectional views corresponding with FIG. 39B and depicting alternate configurations of the sole structure.
Figure 50B:
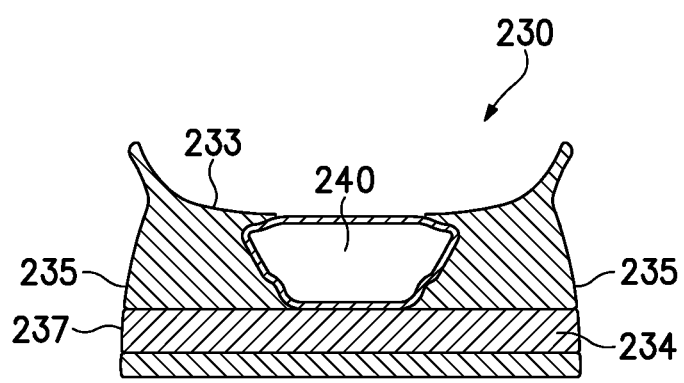
Figure 51A:
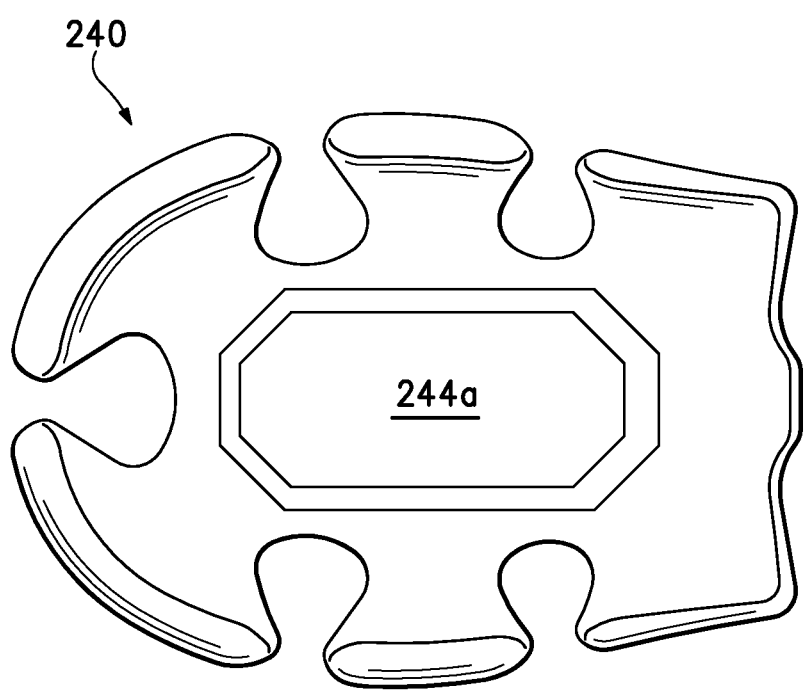
FIGS. 51A-51D are top plan views corresponding with FIG. 43 and depicting alternate configurations of the chamber.
Figure 51B:
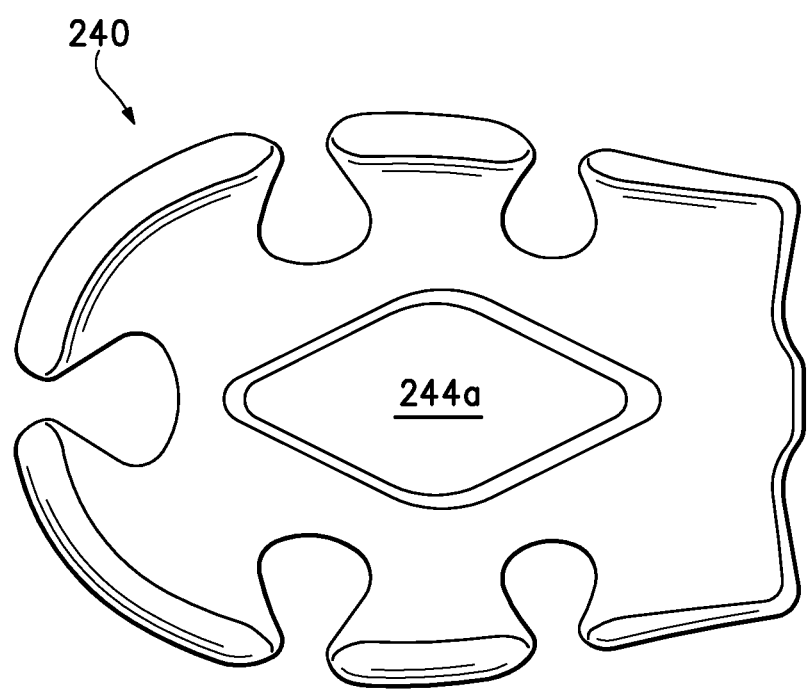
Figure 51C:
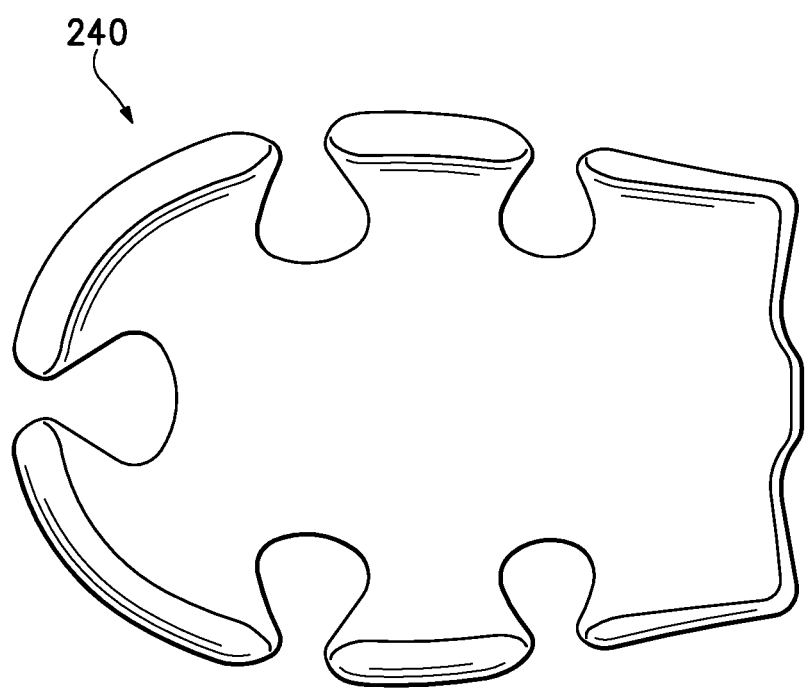
Figure 51D:
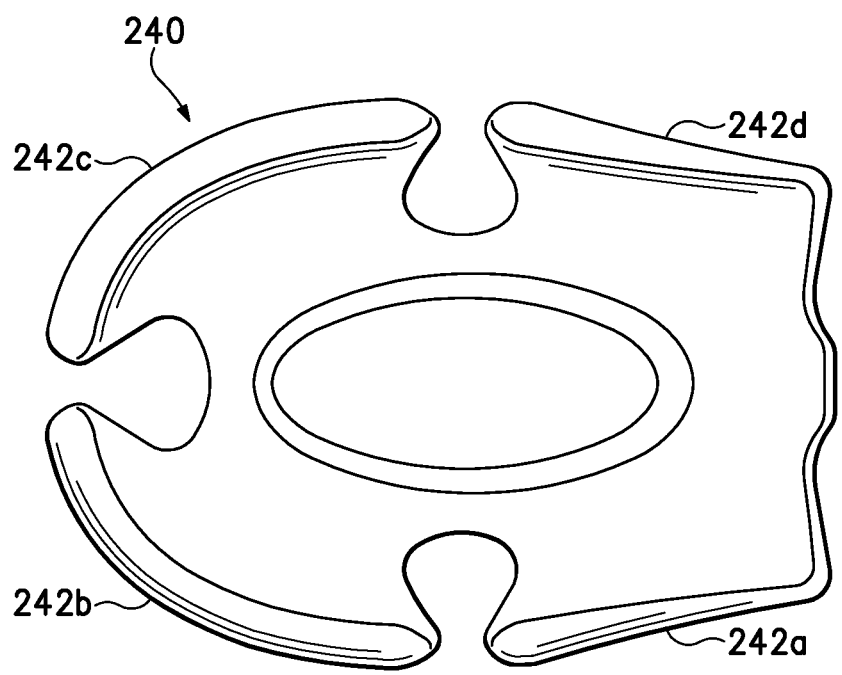

The configuration of sole structure 230 discussed above provides an example of the various configurations that components of sole structure 230, including elements 232-234 and chamber 240 may exhibit. Referring to FIG. 48, a top plan view of an alternate configuration of sole structure 230 is depicted. In comparison with the configuration of FIG. 38, upper heel element 233 forms an entirely elliptical opening 236. That is, opening 236 forms a closed aperture that extends through upper heel element 233. In order to control the degree of pronation that occurs during running, chamber 240 may be tapered between medial side 215 and lateral side 214, as depicted in FIGS. 49A and 49B. That is, medial side 215 may exhibit greater thickness than lateral side 214. As another variation, second surface 246 may have a planar or otherwise non-concave configuration, as depicted in FIG. 49C. The degree to which projections 237 extend upward may also vary. For example, projections 237 may only extend partially between surfaces 245 and 246, as depicted in FIGS. 50A and 50B. The shape of protrusion 244a may also vary to have an octagonal or diamond shaped configuration, as depicted in FIGS. 51A and 51B, or protrusion 244a may have a variety of other shapes, including round, triangular, rectangular, pentagonal, or a non-regular shape, for example. In some configurations, protrusion 244a may also be absent, as in FIG. 51C. Additionally, the number of lobes 242a-242f may vary, as depicted in FIG. 51D, wherein chamber 240 has four lobes 242a-242d. Accordingly, the configuration of sole structure 230 and various components thereof may vary significantly within the scope of the invention.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

The invention claimed is:

1. An article of footwear having an upper and a sole structure secured to the upper, the sole structure comprising:
   a chamber formed from a polymer material that encloses a fluid, the chamber having a central area and a plurality of lobes extending outward from the central area, the lobes being in fluid communication with the central area, the lobes having distal ends positioned opposite the central area, and the lobes defining spaces positioned between the lobes located adjacent to each other, the polymer material defining a parting line where opposite portions of the polymer material are bonded to each other, the parting line following a non-linear course that extends around the distal ends and adjacent to the distal ends; and
   a polymer foam material surrounding at least a portion of the chamber and extending into the spaces between the lobes, the polymer foam material defining a portion of a side surface of the sole structure, the distal ends of the lobes being exposed at the side surface and defining another portion of the side surface of the sole structure.

2. The article of footwear recited in claim 1, wherein the chamber includes at least five of the lobes.

3. The article of footwear recited in claim 1, wherein a distance across the spaces and between the lobes located adjacent to each other is greater proximal the central area than at the distal ends of the lobes.

4. The article of footwear recited in claim 1, wherein the lobes flare outward at the distal ends.

5. The article of footwear recited in claim 1, wherein the chamber has a first surface and an opposite second surface, and at least one of the first surface and the second surface has a curved configuration extending inward to define a concave surface of the chamber.

6. The article of footwear recited in claim 1, wherein the chamber has a first surface and an opposite second surface, and at least one of the first surface and the second surface has a protrusion extending outward from the central area.

7. The article of footwear recited in claim 6, wherein the protrusion is elliptical.

8. The article of footwear recited in claim 1, wherein the chamber has a first surface and an opposite second surface, the first surface having a curved configuration extending inward to define a concave surface of the chamber, and the first surface has a protrusion extending outward from the central area.

9. The article of footwear recited in claim 1, wherein a pressure of the fluid is in a range of zero to five pounds per square inch.

10. An article of footwear having an upper and a sole structure secured to the upper, the sole structure comprising:
    a chamber formed from a polymer material that encloses a fluid, the chamber having a first surface and an opposite second surface that define a central area and a plurality of lobes extending outward from the central area, the lobes being in fluid communication with the central area, the lobes having distal ends positioned opposite the central area, and the lobes defining spaces positioned between the lobes located adjacent to each other, the polymer material defining a parting line where opposite portions of the polymer material are bonded to each other, the parting line following a non-linear course that extends from the first surface to the second surface at the distal ends; and
    a polymer foam material surrounding at least a portion of the chamber and extending into the spaces between the lobes, the polymer foam material defining a portion of a side surface of the sole structure, the distal ends of the lobes being exposed at the side surface and defining another portion of the side surface of the sole structure.

11. The article of footwear recited in claim 10, wherein the chamber includes at least five of the lobes.

12. The article of footwear recited in claim 10, wherein a distance across the spaces and between the lobes located adjacent to each other is greater proximal the central area than at the distal ends of the lobes.

13. The article of footwear recited in claim 10, wherein the lobes flare outward at the distal ends.

14. The article of footwear recited in claim 10, wherein at least one of the first surface and the second surface has a curved configuration extending inward to define a concave surface of the chamber.

15. The article of footwear recited in claim 10, wherein at least one of the first surface and the second surface has a protrusion extending outward from the central area.

16. The article of footwear recited in claim 15, wherein the protrusion is elliptical.

17. The article of footwear recited in claim 10, wherein the first surface has a curved configuration extending inward to define a concave surface of the chamber, and the first surface has a protrusion extending outward from the central area.

18. The article of footwear recited in claim 10, wherein a pressure of the fluid is in a range of zero to five pounds per square inch.

* * * * *